United States Patent [19]
Kaye

[11] Patent Number: 5,564,282
[45] Date of Patent: Oct. 15, 1996

[54] VARIABLE CAPACITY STAGED COOLING DIRECT EXPANSION GEOTHERMAL HEAT PUMP

[75] Inventor: Glenn A. Kaye, Petitcodiac, Canada

[73] Assignee: Maritime Geothermal Ltd., Petitcodiac, Canada

[21] Appl. No.: 240,000

[22] Filed: May 9, 1994

Related U.S. Application Data

[63] Continuation-in-part of Ser. No. 53,050, Apr. 23, 1993, Pat. No. 5,313,804, and Ser. No. 139,200, Oct. 20, 1993, Pat. No. 5,388,419.

[51] Int. Cl.$^6$ .................................................. F25B 13/00
[52] U.S. Cl. .......................... 62/160; 62/199; 62/238.7; 62/324.4; 62/260; 62/196.4
[58] Field of Search .................................... 62/160, 196.1, 62/196.3, 196.4, 197, 199, 200, 210, 212, 222, 224, 225, 238.1, 238.6, 238.7, 260, 324.1, 324.4, 324.6; 165/29, 45; 237/2 B

[56] References Cited

U.S. PATENT DOCUMENTS

| | | | |
|---|---|---|---|
| 4,017,286 | 4/1977 | English et al. | 62/160 |
| 4,149,389 | 4/1979 | Hayes et al. | 62/79 |
| 4,327,560 | 5/1982 | Leon et al. | 62/260 |
| 4,375,831 | 3/1983 | Downing, Jr. | 165/48 R |
| 4,445,343 | 5/1984 | McCarty | 62/324.1 |
| 4,489,568 | 12/1984 | Shapess | 62/324.1 |
| 4,570,452 | 2/1986 | Bingham | 62/260 |
| 4,646,538 | 3/1987 | Blackshaw et al. | 62/238.7 |
| 4,753,285 | 6/1988 | Rawlings | 165/45 |
| 4,903,495 | 2/1990 | Howland et al. | 62/81 |
| 4,920,757 | 5/1990 | Gazes et al. | 62/181 |
| 5,025,634 | 6/1991 | Dressler | 62/260 X |
| 5,038,580 | 8/1991 | Hart | 62/324.6 |
| 5,136,855 | 8/1992 | Lenarduzzi | 62/260 X |
| 5,224,357 | 7/1993 | Galiyano et al. | 62/260 |
| 5,244,037 | 9/1993 | Warnke | 62/238.7 X |
| 5,372,016 | 12/1994 | Rawlings | 62/238.7 X |

FOREIGN PATENT DOCUMENTS

| | | |
|---|---|---|
| 499101 | 1/1954 | Canada. |
| 809880 | 4/1969 | Canada. |
| 821792 | 9/1969 | Canada. |
| 1003234 | 1/1977 | Canada. |
| 1014760 | 8/1977 | Canada. |
| 1043583 | 12/1978 | Canada. |
| 1044476 | 12/1978 | Canada. |
| 1284892 | 6/1991 | Canada. |

Primary Examiner—Harry B. Tanner

[57] ABSTRACT

A "DX" heat pump is provided herein which is based on the principle of providing optimal heat exchange in the heating mode through at least two, but up to five or more parallel ground loops, all but one of which respectively can be cut off from the system and evacuated of refrigerant in the cooling mode, and selectively reintroduced as required in the cooling mode. The loops are designed in terms of volume so that the refrigerant charge is correct in the heating mode when split in the selected number of loops and also correct in the cooling mode when one or more loops are used, whereby it/they contain the full system refrigerant charge. The headers are provided with solenoid valves which can be individually operated to provide a staged cooling system.

26 Claims, 15 Drawing Sheets

VARIABLE CAPACITY STAGED COOLING DIRECT EXPANSION GEOTHERMAL HEAT PUMP

RELATED INVENTIONS

This application is a continuation-in-part of application Ser. No. 08/053,050 filed Apr. 23, 1993, U.S. Pat. No. 5,313,804, and of application Ser. No. 08/139,200 filed Oct. 20, 1993, U.S. Pat. No. 5,388,419, the entire contents of both of which are incorporated by herein reference.

BACKGROUND OF THE INVENTION (a) Field of the Invention

This invention relates to a geothermal heat pump for residential or commercial use falling under the general category of what is known in the industry as a "direct expansion" heat pump, (hereinafter referred to as a "DX" heat pump).

(b) Description of the Prior Art

Conventional technology concerned with heat pumps relies upon the transfer of heat from the ground by means of a secondary working fluid, e.g., water, which is pumped to the geothermal unit located in the heated structure. The conventional heat pump has its own internal heat exchanger which extracts the heat (heating mode) from this water, which is then pumped back to the to be reheated.

Such geothermal heat exchange is an efficient and effective way of achieving heat exchange in heating and air conditioning systems, and especially heat pump type systems. Since the ground temperature is relative constant at about 48° F. at a depth below the frost line, the available heat is constant.

"DX" systems similarly use a ground coil system. However the working fluid is a refrigerant and the copper ground loop is the primary heat exchanger. A problem which has been associated with such systems is the means and manner in which the heat exchange coils, or outdoor coils, are placed into the ground to achieve geothermal heat exchange.

If the geothermal outdoor coils are placed into the ground in a vertical fashion, installation may be easily accomplished by drilling or boring holes into the ground, into which the vertical geothermal outdoor coils may be placed. The coils may quickly and easily be placed into the ground to a depth which is sufficient to overcome ground freezing problems associated with colder climates.

Heretofore, one reason why placing coils into the ground in a vertical fashion has not been workable was due to the fact that, when sufficient refrigerant was placed into the system to achieve maximum efficiency in both the heating and cooling cycles, the refrigerant, as it condensed in the ground coils, caused a liquid refrigerant build-up. The compressor was unable properly to move the refrigerant through the system when the liquid refrigerant settled within the ground coils, making the system unworkable. Damage to the compressor could occur when the compressor forced liquid refrigerant into the intake of the compressor, since compressors for such systems are designed for receiving and compressing gases.

Such problem associated with vertical outdoor geothermal coils was attempted to be solved by placing the coils into the ground in a horizontal fashion. Placing the coils into the ground in a horizontal fashion partially alleviated the problem of liquid refrigerant build-up. However, this technique required a vast amount of available ground to achieve the proper heat exchange, as well as the excavation of sufficient land to place enough ground coils to achieve sufficient heat exchange. In colder climates, this excavation must also be to a sufficient depth to place the coils for proper heat exchange. In short, placing the geothermal coils in a horizontal fashion was more difficult, expensive, and required much more available ground than does placing of the coils into vertical holes.

It has also been common practice to provide heat pump systems which included means for reversing the direction of flow of refrigerant from the compressor through two heat exchangers so that the functions of the heat exchangers were reversed. Thus, one of the heat exchangers was adapted to heat or cool the air of a room, for example, according to the direction of flow of refrigerant. When the direction of flow of refrigerant was reversed, it was necessary to alter the degree of restriction between the two heat exchangers to provide for proper operation of the system in the alternative function. Altering the degree of restriction relative to the direction of flow of refrigerant was necessary since a system optimized for cooling generally had insufficient restriction to provide optimum performance when operated to supply heat. That is, in a system optimized for cooling, the compressor normally circulated refrigerant through the evaporator faster than the surface could evaporate the refrigerant when the system was operated in the heating cycle. The compressor, in the heating cycle, then pumped unevaporated refrigerant and the system efficiency was low. To overcome this problem, variable restriction systems, using a "TX" or thermostatic expansion valve, have been employed in such heat pump systems. In many instances, two restrictors have been provided together with parallel valve systems, each of which was adapted to function in accordance with the direction of refrigerant flow.

A direct coupled heat pump was one that had its refrigerant evaporator/condenser in direct thermal contact with the from which heat was either extracted from in the heating mode or is introduced to in the cooling mode of operation. Many attempts have been made in the past to develop successful direct coupled heat pumps for residential and commercial uses. These attempts have failed adequately to meet a number of requirements associated with an economically and functionally viable system. Some of the shortcomings included: inadequate oil return to the compressor primarily in the heating mode; inadequate evaporator length and spacing for properly extracting heat from the resulting in low capacity and low efficiency of the systems; lack of a proper means to store additional refrigerant required during the cooling operation, but not needed during the heating mode; and lack of volume control of the compressor for providing the necessary increase in displacement during the heating operation over that displacement needed for the cooling operation. This lack of displacement control resulted in insufficient heating capacity during the coldest weather.

The patent literature is replete with proposed solutions. Thus U.S. Pat. No. 4,327,560 patented May 4, 1982 by H. I. Leon et al, provided an earth-embedded heat pump system for transferring heat from the earth to an earth conditioned space wherein the heat transfer fluid was circulated in a substantially closed loop through an coil. Sections of the coil were jacketed with one or more hermetically-sealed enclosures which were adapted to be charged with a composition which, upon crystallization, released latent heat. The transition temperature at which the latent heat was released and the rate at which the latent heat was released to the heat transfer fluid was said to stabilize its temperature within a range which provided for an inlet condition to a water-to-air heat pump which was favourable to a high heat output from the heat pump system per unit energy input.

In U.S. Pat. No. 4,437,583 patented Mar. 8, 1983 by J. E. Downy, Jr., a complete system was disclosed for providing space heating and cooling, for an indoor living space which brought the heat from the geothermal storage capacity, (the earth), to the indoor living space during the heating season and extracted heat from the indoor living space and absorbed the heat into storage during the cooling season. In the patented system, a relatively massive thermal storage unit was interposed between the geothermal storage capacity, (the earth), and the indoor living space environment which was to be heated or cooled. A working fluid, e.g., water, was circulated between the massive thermal storage unit, and the geothermal storage capacity, (the earth). A heat pump was operatively connected between the massive thermal storage unit and the indoor living space environment. In addition, the working fluid, was circulated between heat exchangers, one of which was located in the massive thermal storage unit in contact with the working fluid therein and the second of which was located in the indoor living space environment.

U.S. Pat. No. 4,445,343 patented May 1, 1984 by W. J. McCarty provided a heat pump system comprising a compressor and two heat exchangers connected in a refrigerating circuit. Such refrigerating circuit was provided with refrigerant flow restrictor between the heat exchangers. Such restrictor imparted relatively high restriction to the flow of refrigerant between the heat exchangers in one direction and a relatively lower restriction to the flow of refrigerant between the heat exchangers in the opposite direction.

U.S. Pat. No. 4,646,538 patented Mar. 3, 1987 by A. J. Blackshaw et al provided a heat pump system which included a refrigerant pressurizer whose high pressure outlet was connected to the input of a three-way valve. One output of the three-way valve was connected to the common input of a four-way valve. The common output of the four-way valve was connected to the suction side of the refrigerant pressurizer. One of the reversible outlet ports on the four-way valve was connected to a space heat exchanger while the other reversible outlet port on the four-way valve was connected to a source heat exchanger. The opposite sides of the space and source heat exchangers were connected to each other through a reversible expansion valve. The other output of the three-way valve was connected to an alternate heat exchanger. The other side of the alternate heat exchanger was connected to an alternate expansion valve. The other side of the alternate expansion valve was connected to the common point between the reversible expansion valve and the space heat exchanger through a check valve allowing refrigerant to flow from the alternate heat exchanger to the space heat exchanger through a check valve. The other side of the alternate expansion valve was also connected to the common point between the reversible expansion valve and the source heat exchanger so that refrigerant could flow from the alternate heat exchanger to the source heat exchanger through a check valve.

U.S. Pat. No. 4,920,757 patented May 1, 1990 by J. Gazes et al provided a geothermal heating and air conditioning system which included a compressor for compressing a refrigerant, and one or more indoor coils for heat exchange between the refrigerant and inside air. One or more outdoor coils was placed vertically below ground for heat exchange between the refrigerant and earth surrounding the outdoor coils. A condenser/receiver allowed the refrigerant to pass through the condenser/receiver in either direction, and was positioned between the indoor coil and the ground coils, allowing for heat exchange so as to control the state and temperature of the refrigerant. The condenser/receiver had sufficient volume capacity to accumulate liquid refrigerant to prevent liquid refrigerant from entering the compressor. A portion of the refrigerant travelling between the indoor coils and the outdoor coils was diverted to an inlet side of the compressor. A valve controlled a flow of refrigerant in response to refrigerant pressure on the inlet side of the compressor.

U.S. Pat. No. 5,038,580 patented Aug. 13, 1991 by D. P. Hart provided a heat pump system having a sub-surface heat exchanger which used a heat exchanging fluid existing in gaseous and liquid form. The heat pump system included a compressor for compressing the heat exchanging fluid. A four-way reversing valve for directing the flow of the heat exchanging fluid was functionally connected to the compressor. An indoor heat exchange coil, functionally connected to the four-way reversing valve, was provided for transferring heat to or from the interior of a building. An accumulator, also functionally connected to the four-way reversing valve, was provided for trapping and storing liquids within the apparatus. A plurality of sub-surface tapered heat exchanger tubes were functionally connected to the four-way reversing valve. A bi-directional balanced expansion valve was functionally connected to the sub-surface heat exchanger. A receiver for storing excess fluid was functionally connected to the expansion valve and to the indoor heat exchange coil.

SUMMARY OF THE INVENTION

Aims of the Invention

As is evident from the above discussion, the general refrigeration cycle of a "DX" heat pump is similar to a conventional water-to-air or water-to-water heat pump in that it includes a compressor, an expansion device, a reversing valve, and a refrigerant-to-air heat exchanger. The unit functions as both a heating and cooling device and also generates domestic hot water. The "DX" heat pumps differ from conventional geothermal liquid source heat pumps in that the heat exchanger which transfers heat to and from the is an external part of the unit and is embedded directly in the in either a horizontal or vertical configuration. A "DX" machine takes the heat exchanger directly to the source of heat (the earth) while a conventional unit with a self-contained heat exchanger relies on having a fluid containing heat pumped to it for extraction. The heat pump and exchanger comprise one integral unit.

In spite of these purported solutions to such problems, the art has not yet solved the problem of providing a "DX" geothermal heat pump which solves the engineering obstacles, and in particular, the refrigerant imbalance and oil return problems that have prevented the widespread general acceptance of this type of product in the industry. Widespread use of "DX" heat pumps has been hindered by several factors: vastly different demands put on the heat exchanger during heating and cooling modes; difficulty in maintaining oil return in the refrigeration system; difficulty in providing an easy-to-install system of heat exchanger loops; and refrigerant charges in the range of 10 times greater than a similar capacity conventional geothermal heat pump.

For heat to be absorbed from the ground, it is necessary to create a temperature differential (hereinafter referred to as "TD") between the ground and the refrigerant inside the heat exchanger. Heat is absorbed from the ground when the refrigerant undergoes a change of state from a liquid to a gas as result of exposure to the warm earth. It is important that the heat exchanger be as large as possible to maintain the smallest "TD" between the and the refrigerant. By maintaining the highest refrigerant temperature, the highest refrigerant pressure is also maintained in the exchanger or evaporator (as it is called during the heating mode of the heat pump). This insures that the compressor receives the most dense charge at its suction inlet and thus operates at the highest volumetric efficiency.

The inhibiting engineering factor in arbitrarily sizing the exchanger piping to any diameter and length is that a minimum velocity of the refrigerant gas must be maintained to entrain or sweep the compressor lubricating oil back to the machine at all times. Another factor which is important in "DX" heat pump systems is that whatever configuration of tubing underground that is used as an evaporator in the heating mode is typically used as a condenser in the cooling mode of the heat pump.

During the cooling cycle of a "DX" heat pump, the problem exists of a much smaller heat exchanger being required to reject heat to the earth. Typically the discharge gas temperature is from about 175° F. to about 200° F. and actual condensing temperature may be about 110° F. From an engineering standpoint, a large "TD" is encountered between the hot gas temperature and the earth. The temperature difference would indicate that only about 15 to 20% of the surface area would be required to handle this heat of rejection under such circumstances. When a typical system has been sized and charged with enough refrigerant to operate correctly in the heating mode and then is reversed to the cooling mode, the compressor will merely pump all the refrigerant to the coils where it will stay because the compressor is unable to create enough pressure to overcome the pressure drop in the liquid line, "TX" valve and internal evaporator. The refrigeration cycle is effectively stopped since the compressor will go into a vacuum position on the suction side and shut off on internal safety devices.

To solve this problem, it has been proposed by others to disable the heat exchange capabilities of the coil now operating as a condenser coil by filling it with refrigerant until it is approximately 75% full of liquid refrigerant. Under these circumstances, the compressor is able to build up enough discharge pressure to force liquid back to the evaporator and the refrigeration cycle can proceed. In solving the refrigerant flow problem in this manner, however, several very negative circumstances are created, namely: approximately three times as much refrigerant is required in the cooling mode as is required in the heating mode, i.e. typically about 50 to about 60 lbs for a well-designed 3–4 ton system; a large refrigerant storage tank (called a receiver) must be employed to store the refrigerant not used during the cooling mode; a similarly-sized accumulator must be installed to catch the inrush of liquid during the switch-over from cooling to heating so that the compressor will not be damaged; and the machine suffers very poor performance during switch-over from heating to cooling while the refrigerant is being positioned into or out of the receiver as required for the mode change.

Many of the above problems have been solved by the teaching of the above-identified patent application Ser. No. 08/053,050 filed Apr. 23, 1993, of which the present application is a continuation-in-part, which provided, in a broad generic mode, a loop system for use in combination with a "DX" heat pump system, the loop system comprising: three loops, a first loop including a dual purpose suction/hot gas line and a liquid line, and the second and the third loops each including a suction line and a liquid line, each loop being adapted to be buried underground in heat exchange relationship with the earth; a refrigerant vapor header provided with a check valve; means connecting the suction/hot gas line of the first loop to the suction header downstream of the check valve; means connecting the suction lines of each of the two other loops to the refrigerant vapor header upstream of the check valve; a refrigerant liquid line header provided with an electric solenoid valve; means connecting the liquid line of the first loop to the refrigerant liquid line header upstream of the electric solenoid valve; and means connecting the liquid lines of each of the other two loops to the refrigerant liquid line header downstream of the electric solenoid valve.

The above-identified patent application Ser. No. 08/053,050 filed Apr. 23, 1993 also provided the following teachings, the contents of which are herein incorporated by reference: a first mode of a first embodiment of a "DX" heat pump system in the heating mode; a second mode of a first embodiment of a "DX" heat pump system in the cooling mode; a first mode of a second embodiment of a capillary-balanced feed "DX" heat pump system in the heating mode; a second embodiment of a capillary-balanced-feed "DX" heat pump system in the cooling mode; a first mode of a third embodiment of an individual "TX"-valve metering "DX" heat pump system in the heating mode; a second mode of a individual "TX"-valve metering "DX" heat pump system in the cooling mode; a first method of operating a first mode of a "DX" heat pump system in the heating mode; a second method of operating a "DX" heat pump system in the cooling mode; a first method of operating a capillary-balanced-feed "DX" heat pump in the heating method; a second method of operating a capillary-balanced-feed "DX" heat pump in the cooling mode; a first method of operating an individual "TX"-valve metering "DX" heat pump in the heating mode; and a second method of operating an individual "TX" valve metering "DX" heat pump in the cooling mode.

The above-identified patent application Ser. No. 08/139,200 filed Oct. 20, 1993, of which the present application is a continuation-in-part, provided an improved "DX" heat pump for installation in various locations with diverse soil types using either vertical or horizontal evaporator/condenser coils in the earth, while having the heat pump operate as efficiently as possible both in the heating mode and in the cooling mode, in which a "TX" valve may be used for metering for staged cooling, by providing a "DX" heat pump system which was based on the principle of providing optimal heat exchange in the heating mode through three parallel loops, two of which could be cut off from the system and evacuated of refrigerant in the cooling mode. The loops were designed in terms of volume so that the refrigerant charge was correct in the heating mode when split in three loops and also was correct in the cooling mode when only one loop was used, but it contained the full system refrigerant charge. The loops were also provided with "TX" metering valves which could be individually operated to provide a staged cooling system.

The invention in the above-identified patent application Ser. No. 08/139,201 filed Oct. 20, 1993 also provided the following teachings, the contents of which are herein incorporated by reference: a loop system for use in combination with a "DX" heat pump system for a staged cooling "DX" geothermal heat pump; a staged cooling "DX" heat pump for use in such staged cooling "DX" heat pump system; a method of operating such "DX" geothermal heat pump in the heating mode; and a method of operating such staged cooling "DX" geothermal heat pump in the cooling mode.

Aims of the Invention

However, the systems of the two above-identified applications were applicable to only one size capacity of "DX"

heat pumps. Accordingly, it is an object to improve the invention in the two above-identified patent applications, namely, Ser. No. 08/053,050 filed Apr. 23, 1993 and Ser. No. 08/139,200 filed Oct. 20, 1993, by providing for the installation in various locations with diverse soil types using either vertical or horizontal evaporator/condenser coils in the earth, while having the heat pump operate efficiently as possible both in the heating mode or in the cooling mode, in which a "TX" valve would be used for metering for staged cooling and in which the capacity can be selected for 2, 3, 4, 5 or even more ton capacity direct expansion heat pump may be a staged cooling technique.

Statements of Invention

By its broadest embodiment, the present invention provides a loop system for use in combination with a direct expansion heat pump system, the loop system comprising: at least two loops, each of a first loop, and at least a second loop including a suction/hot gas line and a liquid line, each loop being adapted to be buried underground in heat exchange relationship with the earth; a refrigerant vapor header connected in series to each of the at least two suction/hot gas lines, the refrigerant vapor header being provided with a first solenoid valve positioned between the junction of the suction/hot gas line of the first loop with the refrigerant vapor header and the junction of the suction/hot gas line of the at least second loop with the refrigerant vapor header and at least a second solenoid valve positioned remote from the junction of the suction/hot gas line of the at least second loop with the refrigerant vapor header; a refrigerant liquid line header provided with a cooling thermostatic expansion valve, the refrigerant liquid line header further being provided with a first solenoid valve positioned between the junction of the liquid line of the first loop with the refrigerant liquid line header and the junction of the liquid line of the at least second loop with the refrigerant liquid line header; a first connecting line and at least a second connecting line connecting the cooling thermostatic expansion valve to an associated one of the liquid line of the first loop and the liquid line of the at least second loop; a first heating expansion valve operatively associated with the first connecting line and at least a second heating expansion valve operatively associated with the at least second connecting line; at least one solenoid valve operatively associated with the refrigerant liquid line header and also operatively associated with the at least second connecting line; and at least one pressure sensing device operatively associated with the refrigerant vapor header.

The present invention also provides a loop system for use in combination with a direct expansion heat pump system, the system comprising: two loops, each of a first loop, and a second loop including a suction/hot gas line and a liquid line, each loop being adapted to be buried underground in heat exchange relationship with the earth; a refrigerant vapor header connected in series to each of the two suction/hot gas lines, the refrigerant vapor header being provided with a first solenoid valve positioned between the junction of the suction/hot gas line of the first loop with the refrigerant vapor header and the junction of the suction/hot gas line of the second the loop with the refrigerant vapor header and a second solenoid valve positioned remote from the junction of the suction/hot gas line of the second loop with the refrigerant vapor header; a refrigerant liquid line header provided with a cooling thermostatic expansion valve, the refrigerant liquid line header further being provided with a first solenoid valve positioned between the junction of the liquid line of the first loop with the refrigerant liquid line header and the junction of the liquid line of the second loop with the refrigerant liquid line header; a first connecting line and a second connecting line connecting the cooling thermostatic expansion valve to an associated one of the liquid line of the first loop and the liquid line of the second loop, respectively; a first heating expansion valve operatively associated with the first connecting line and a second heating expansion valve operatively associated with the second connecting line; one solenoid valve operatively associated with the refrigerant liquid line header and also operatively associated with the second connecting line; and one pressure sensing device operatively associated with the refrigerant vapor header.

The present invention also provides a loop system for use in combination with a direct expansion heat pump system, the system comprising: three loops, each of a first loop, a second loop and a third loop including a suction/hot gas line and a liquid line, each loop being adapted to be buried underground in heat exchange relationship with the earth; a refrigerant vapor header connected in series to each of the three suction/hot gas lines, the refrigerant vapor header being provided with a first solenoid valve positioned between the junction of the suction/hot gas line of the first loop with the refrigerant vapor header and the junction of the suction/hot gas line of the second the loop with the refrigerant vapor header, a second solenoid valve positioned between the junction of the suction/hot gas line of the second loop with the refrigerant vapor header and the junction of the suction/hot gas line of the third loop with the refrigerant vapor header and a third solenoid valve situated remote from the junction of the suction/hot gas line of the third loop with the refrigerant vapor header; a refrigerant liquid line header provided with a cooling thermostatic expansion valve, the refrigerant liquid line header further being provided with a first solenoid valve positioned between the junction of the liquid line of the first loop with the refrigerant liquid line header and the junction of the liquid line of the second loop with the refrigerant liquid line header, and a second solenoid valve positioned between the junction of the liquid line of the second loop with the refrigerant liquid line header and the junction of the liquid line of the third loop with the refrigerant liquid line header; a first connecting line, a second connecting line and a third connecting line connecting the cooling thermostatic expansion valve to an associated one of the liquid line of the first loop, the liquid line of the second loop, and the liquid line of the third loop, respectively; a first heating expansion valve operatively associated with the first connecting line, a second heating expansion valve operatively associated with the second connecting line, and a third heating expansion valve operatively associated with the third connecting line; a first solenoid valve operatively associated with the refrigerant liquid line header and also operatively associated with the second connecting line, and a second solenoid valve operatively associated with the refrigerant liquid line header and also operatively associated with the third connecting line; and two pressure sensing devices, each being operatively associated with the refrigerant vapor header.

The present invention also provides a loop system for use in combination with a direct expansion heat pump system, the system comprising: four loops, each of a first loop, a second loop, a third loop and a fourth loop including a suction/hot gas line and a liquid line, each loop being adapted to be buried underground in heat exchange relationship with the earth; a refrigerant vapor header connected in series to each of the four suction/hot gas lines, the refrigerant vapor header being provided with a first solenoid valve positioned between the junction of the suction/hot gas line of the first loop with the refrigerant vapor header and the junction of the suction/hot gas line of second loop with the refrigerant vapor header, a second solenoid valve positioned between the junction of the suction/hot gas line of the second loop with the refrigerant vapor header and the junction of the suction/hot gas line of the third loop with the refrigerant vapor header, a third solenoid valve positioned between the junction of the suction/hot gas line of the third loop with the refrigerant vapor header and the junction of the suction/hot gas line of the fourth loop with the refrigerant vapor header, and a fourth solenoid valve situated remote from the junction of the suction/hot gas line of the fourth loop with the refrigerant vapor header; a refrigerant liquid line header provided with a cooling thermostatic expansion valve, the refrigerant liquid line header further being provided with a first solenoid valve positioned between the junction of the liquid line of the first loop with the refrigerant liquid line header and the junction of the liquid line of the second loop with the refrigerant liquid line header, a second solenoid valve positioned between the junction of the liquid line of the second loop with the refrigerant liquid line header and the junction of the liquid line of the third loop with the refrigerant liquid line header, and a third solenoid valve positioned between the junction of the liquid line of the third loop with the refrigerant liquid line header and the junction of the liquid line of the fourth loop with the refrigerant liquid line header; a first connecting line, a second connecting line, a third connecting line and a fourth connecting line connecting the cooling thermostatic expansion valve to an associated one of the liquid line of the first loop, the liquid line of the second loop, the liquid line of the third loop and the liquid line of the fourth loop, respectively; a first heating expansion valve operatively associated with the first connecting line, a second heating expansion valve operatively associated with the second connecting line, a third heating expansion valve operatively associated with the third connecting line and a fourth heating expansion valve operatively associated with the fourth connecting line; a first solenoid valve operatively associated with the refrigerant liquid line header and also operatively associated with the second connecting line, a second solenoid valve operatively associated with the refrigerant liquid line header and also operatively associated with the third connecting line, and a third solenoid valve operatively associated with the refrigerant liquid line header and also operatively associated with the fourth connecting line; and three pressure sensing devices, each being operatively associated with the refrigerant vapor header.

The present invention also provides a loop system for use in combination with a direct expansion heat pump system, the system comprising: five loops, each of a first loop, a second loop, a third loop, a fourth loop and a fifth loop including a suction/hot gas line and a liquid line, each loop being adapted to be buried underground in heat exchange relationship with the earth; a refrigerant vapor header connected in series to each of the five suction/hot gas lines, the refrigerant vapor header being provided with a first solenoid valve positioned between the junction of the suction/hot gas line of the first loop with the refrigerant vapor header and the junction of the suction/hot gas line of the second loop with the refrigerant vapor header, a second solenoid valve positioned between the junction of the suction/hot gas line of the second loop with the refrigerant vapor header and the junction of the suction/hot gas line of the third loop with the refrigerant vapor header, a third solenoid valve positioned between the junction of the suction/hot gas line of the third loop with the refrigerant vapor header and the junction of the suction/hot gas line of the fourth loop with the refrigerant vapor header, a fourth solenoid valve positioned between the junction of the suction/hot gas line of the fourth loop with the refrigerant vapor header and the junction of the suction/hot gas line of the fifth loop with the refrigerant vapor header, and a fifth solenoid valve situated remote from the junction of the suction/hot gas line of the fifth loop with the refrigerant vapor header; a refrigerant liquid line header provided with a cooling thermostatic expansion valve; a first connecting line, a second connecting line, a third connecting line, a fourth connecting line connecting line and a fifth connecting line connecting the cooling thermostatic expansion valve to an associated one of the liquid line of the first loop, the liquid line of the second loop, the liquid line of the third loop, the liquid line of the fourth loop and the liquid line of the fifth loop, respectively; a first heating expansion valve operatively associated with the first connecting line, a second heating expansion valve operatively associated with the second connecting line, a third heating expansion valve operatively associated with the third connecting line, a fourth heating expansion valve operatively associated with the fourth connecting line and a fifth heating expansion valve operatively associated with the fifth connecting line; a first solenoid valve operatively associated with the refrigerant liquid line header and also operatively associated with the second connecting line, a second solenoid valve operatively associated with the refrigerant liquid line header and also operatively associated with the third connecting line, a third solenoid valve operatively associated with the refrigerant liquid line header and also operatively associated with the fourth connecting line and a fourth solenoid valve operatively associated with the refrigerant liquid line header and also operatively associated with the fifth connecting line; and four pressure sensing devices, each being operatively associated with the refrigerant vapor header.

The present invention also provides a staged cooling, direct expansion heat pump comprising: at least two loops, each of a first loop, and at least a second loop including a suction/hot gas line and a liquid line, each loop being adapted to be buried underground in heat exchange relationship with the earth; a refrigerant vapor header connected in series to each of the at least two suction/hot gas lines, the refrigerant vapor header being provided with a first solenoid valve positioned between the junction of the suction/hot gas line of the first loop with the refrigerant vapor header and the junction of the suction/hot gas line of the at least second loop with the refrigerant vapor header and at least a second solenoid valve positioned remote from the junction of the suction/hot gas line of the at least second loop with the refrigerant vapor header; a refrigerant liquid line header provided with a cooling thermostatic expansion valve, the refrigerant liquid line header further being provided with a first solenoid valve positioned between the junction of the liquid line of the first loop with the refrigerant liquid line header and the junction of the liquid line of the at least second loop with the refrigerant liquid line header, the cooling thermostatic expansion valve being adapted to provide refrigerant metering in the cooling mode, the cooling thermostatic expansion valve having one inlet, one outlet, an equalization port, and a gas-filled controlling bulb; a first connecting line and at least a second connecting line connecting the cooling thermostatic expansion valve to an associated one of the liquid line of the first loop and the liquid line of the at least second loop; a first heating expansion valve operatively associated with the first connecting line and at least a second heating expansion valve operatively associated with the at least second connecting line, and each heating expansion valves being adapted to provide refrigerant metering in the heating mode, each valve having one inlet, and one outlet, an equalization port, and a gas-filled controlling bulb; capillary line means for providing a capillary tube by-pass around the cooling thermostatic expansion valve; capillary line means for providing a capillary tube bypass around the inlet and the outlet of each of the first and at least the second heating expansion valves; at least one pressure sensing device operatively associated with the refrigerant vapor header; an accumulator having an inlet and an outlet; a suction line having an inlet connected to the accumulator and an outlet; a scavenger line interconnecting the refrigerant vapor header and the accumulator; equalization tube means interconnecting the cooling thermostatic expansion valve, the first heating thermostatic expansion valve, the at least second heating thermostatic expansion valve and the scavenger line; capillary line means for placing a controlling bulb of the first heating expansion valve in thermal contact with the suction/hot gas line of the first loop a short distance from the connection of the suction/hot gas line to the refrigerant vapor header; capillary line means for placing a controlling bulb of the at least second heating expansion valve into thermal contact with the suction/hot gas line of the at least second loop a short distance from the connection of the suction/hot gas line to the refrigerant vapor header; an air/refrigerant heat exchanger coil having two access ports; a reversing valve having two inlets and two outlets; line means connecting a port of the air/refrigerant heat exchanger coil to the refrigerant liquid line header; line means connecting a port of the air/refrigerant heat exchanger coil to the reversing valve; line means connecting the outlet of the compressor to an inlet of the reversing valve; line means connecting the outlet of the accumulator to the inlet of the compressor; line means connected between the reversing valve and the inlet of the accumulator; line means connected between the reversing valve and the refrigerant vapor header; and capillary line means for placing a controlling bulb of the cooling thermostatic expansion valve in thermal contact with the line means connecting a port of the air/refrigerant heat exchanger to the reversing valve.

The present invention also provides a staged cooling, direct expansion heat pump comprising: two loops, each of a first loop and a second loop including a suction/hot gas line and a liquid line, each loop being adapted to be buried underground in heat exchange relationship with the earth; a refrigerant vapor header connected in series to each of the two suction/hot gas lines, the refrigerant vapor header being provided with a first solenoid valve positioned between the junction of the suction/hot gas line of the first loop with the refrigerant vapor header and the junction of the suction/hot gas line of the second loop with the refrigerant vapor header and a second solenoid valve positioned remote from the junction of the suction/hot gas line of the second loop with the refrigerant vapor header; a refrigerant liquid line header provided with a cooling thermostatic expansion valve, the refrigerant liquid line header further being provided with a first solenoid valve positioned between the junction of the liquid line of the first loop with the refrigerant liquid line header and the junction of the liquid line of the second loop with the refrigerant liquid line header, the cooling thermostatic expansion valve being adapted to provide refrigerant metering in the cooling mode, the cooling thermostatic expansion valve having one inlet, one outlet, an equalization port, and a gas-filled controlling bulb; a first connecting line and a second connecting line connecting the cooling thermostatic expansion valve to an associated one of the liquid line of the first loop and the liquid line of the second loop, respectively; a first heating expansion valve operatively associated with the first connecting line and a second heating expansion valve operatively associated with the second connecting line, and each heating expansion valves being adapted to provide refrigerant metering in the heating mode, each valve having one inlet, and one outlet, an equalization port, and a gas-filled controlling bulb; capillary line means for providing a capillary tube by-pass around the cooling thermostatic expansion valve; capillary line means for providing a capillary tube bypass around the inlet and the outlet of each of the first and a the second heating expansion valves; one pressure sensing device operatively associated with the refrigerant vapor header; an accumulator having an inlet and an outlet; a suction line having an inlet connected to the accumulator and an outlet; a scavenger line interconnecting the refrigerant vapor header and the accumulator; equalization tube means interconnecting the cooling thermostatic expansion valve, the first heating thermostatic expansion valve, the second heating thermostatic expansion valve and the scavenger line; capillary line means for placing a controlling bulb of the first heating expansion valve in thermal contact with the suction/hot gas line of the first loop a short distance from the connection of the suction/hot gas line to the refrigerant vapor header; capillary line means for placing a controlling bulb of the second heating expansion valve into thermal contact with the suction/hot gas line of the second loop a short distance from the connection of the suction/hot gas line to the refrigerant vapor header; an air/refrigerant heat exchanger coil having two access ports; a reversing valve having two inlets and two outlets; line means connecting a port of the air/refrigerant heat exchanger coil to the refrigerant liquid line header; line means connecting a port of the air/refrigerant heat exchanger coil to the reversing valve; line means connecting the outlet of the compressor to an inlet of the reversing valve; line means connecting the outlet of the accumulator to the inlet of the compressor; line means connected between the reversing valve and the inlet of the accumulator; line means connected between the reversing valve and the refrigerant vapor header; and capillary line means for placing a controlling bulb of the cooling thermostatic expansion valve in thermal contact with the line means connecting a port of the air/refrigerant heat exchanger to the reversing valve.

The present invention also provides a staged cooling, direct expansion heat pump comprising: three loops, each of a first loop, a second loop and a third loop including a suction/hot gas line and a liquid line, each loop being adapted to be buried underground in heat exchange relationship with the earth; a refrigerant vapor header connected in series to each of the three suction/hot gas lines, the refrigerant vapor header being provided with a first solenoid valve positioned between the junction of the suction/hot gas line of the first loop with the refrigerant vapor header and the junction of the suction/hot gas line of the second loop with the refrigerant vapor header, a second solenoid valve positioned between the junction of the suction/hot gas line of the second loop with the refrigerant vapor header and the junction of the suction/hot gas line of the third loop with the refrigerant vapor header and a third solenoid valve situated remote from the junction of the suction/hot gas line of the third loop with the refrigerant vapor header; a refrigerant liquid line header provided with a cooling thermostatic expansion valve, the refrigerant liquid line header further being provided with a first solenoid valve positioned between the junction of the liquid line of the first loop with the refrigerant liquid line header and the junction of the liquid line of the second loop with the refrigerant liquid line header, and a second solenoid valve positioned between the junction of the liquid line of the second loop with the refrigerant liquid line header and the junction of the liquid line of the third loop with the refrigerant liquid line header, the cooling thermostatic expansion valve being adapted to provide refrigerant metering in the cooling mode, the cooling thermostatic expansion valve having one inlet, one outlet, an equalization port, and a gas-filled controlling bulb; a first connecting line, a second connecting line and a third connecting line connecting the cooling thermostatic expansion valve to an associated one of the liquid line of the first loop, the liquid line of the second loop, and the liquid line of the third loop, respectively; a first heating expansion valve operatively associated with the first connecting line, a second heating expansion valve operatively associated with the second connecting line, and a third heating expansion valve operatively associated with the third connecting line, and each heating expansion valve being adapted to provide refrigerant metering in the heating mode, each valve having one inlet, and one outlet, an equalization port, and a gas-filled controlling bulb; capillary line means for providing a capillary tube by-pass around the cooling thermostatic expansion valve; capillary line means for providing a capillary tube bypass around the inlet and the outlet of each of the first, the second and the third heating expansion valves; two pressure sensing devices, each being operatively associated with the refrigerant vapor header; an accumulator having an inlet and an outlet; a suction pump having an inlet connected to the accumulator and an outlet; a scavenger line interconnecting the refrigerant vapor header and the accumulator; equalization tube means interconnecting the cooling thermostatic expansion valve, the first heating thermostatic expansion valve, the second heating thermostatic expansion valve, the third thermostatic expansion valve and the scavenger line; capillary line means for placing a controlling bulb of the first heating expansion valve in thermal contact with the suction/hot gas line of the first loop a short distance from the connection of the suction/hot gas line to the refrigerant vapor header; capillary line means for placing a controlling bulb of the second heating expansion valve into thermal contact with the suction/hot gas line of the second loop a short distance from the connection of the suction/hot gas line to the refrigerant vapor header; capillary line means for placing a controlling bulb of the third heating expansion valve into thermal contact with the suction/hot gas line of the third loop a short distance from the connection of the suction/hot gas line to the refrigerant vapor header; an air/refrigerant heat exchanger coil having two access ports; a reversing valve having two inlets and two outlets; line means connecting a port of the air/refrigerant heat exchanger coil to the refrigerant liquid line header; line means connecting a port of the air/refrigerant heat exchanger coil to the reversing valve; line means connecting the outlet of the compressor to an inlet of the reversing valve; line means connecting the outlet of the accumulator to the inlet of the compressor; line means connected between the reversing valve and the inlet of the accumulator; line means connected between the reversing valve and the refrigerant vapor header; and capillary line means for placing a controlling bulb of the cooling thermostatic expansion valve in thermal contact with the line means connecting a port of the air/refrigerant heat exchanger to the reversing valve.

The present invention also provides a staged cooling, direct expansion heat pump comprising: four loops, each of a first loop, a second loop, a third loop and a fourth loop including a suction/hot gas line and a liquid line, each loop being adapted to be buried underground in heat exchange relationship with the earth; a refrigerant vapor header connected in series to each of the four suction/hot gas lines, the refrigerant vapor header being provided with a first solenoid valve positioned between the junction of the suction/hot gas line of the first loop with the refrigerant vapor header and the junction of the suction/hot gas line of the second loop with the refrigerant vapor header, a second solenoid valve positioned between the junction of the suction/hot gas line of the second loop with the refrigerant vapor header and the junction of the suction/hot gas line of the third loop with the refrigerant vapor header, a third solenoid valve positioned between the junction of the suction/hot gas line of the third loop with the refrigerant vapor header and the junction of the suction/hot gas line of the fourth loop with the refrigerant vapor header, and a fourth solenoid valve situated remote from the junction of the suction/hot gas line of the fourth loop with the refrigerant vapor header; a refrigerant liquid line header provided with a cooling thermostatic expansion valve, the refrigerant liquid line header further being provided with a first solenoid valve positioned between the junction of the liquid line of the first loop with the refrigerant liquid line header and the junction of the liquid line of the second loop with the refrigerant liquid line header, a second solenoid valve positioned between the junction of the liquid line of the second loop with the refrigerant liquid line header and the junction of the liquid line of the third loop with the refrigerant liquid line header, and a third solenoid valve positioned between the junction of the liquid line of the third loop with the refrigerant liquid line header and the junction of the liquid line of the fourth loop with the refrigerant liquid line header, the cooling thermostatic expansion valve being adapted to provide refrigerant metering in the cooling mode; the cooling thermostatic expansion valve having one inlet, one outlet, an equalization port, and a gas-filled controlling bulb; a first connecting line, a second connecting line, a third connecting line and a fourth connecting line connecting the cooling thermostatic expansion valve to an associated one of the liquid line of the first loop, the liquid line of the second loop, the liquid line of the third loop and the liquid line of the fourth loop, respectively; a first heating expansion valve operatively associated with the first connecting line, a second heating expansion valve operatively associated with the second connecting line, a third heating expansion valve operatively associated with the third connecting line and a fourth heating expansion valve operatively associated with the fourth connecting line, and each heating expansion valve being adapted to provide refrigerant metering in the heating mode, each valve having one inlet, and one outlet, an equalization port, and a gas-filled controlling bulb; capillary line means for providing a capillary tube by-pass around the cooling thermostatic expansion valve; capillary line means for providing a capillary tube bypass around the inlet and the outlet of each of the first, the second, the third and the fourth heating expansion valves; three pressure sensing devices, each being operatively associated with the refrigerant vapor header; an accumulator having an inlet and an outlet; a suction line having an inlet connected to the accumulator and an outlet; a scavenger line interconnecting the refrigerant vapor header and the accumulator; equalization tube means interconnecting the cooling thermostatic expansion valve, the first heating thermostatic expansion valve, the second heating thermostatic expansion valve and the scavenger line; capillary line means for placing a controlling bulb of the first heating expansion valve in thermal contact with the suction/hot gas line of the first loop a short distance from the connection of the suction/hot gas line to the refrigerant vapor header; capillary line means for placing a controlling bulb of the second heating expansion valve into thermal contact with the suction/hot gas line of the second loop a short distance from the connection of the suction/hot gas line to the refrigerant vapor header; capillary line means for placing a controlling bulb of the third heating expansion valve into thermal contact with the suction/hot gas line of the third loop a short distance from the connection of the suction/hot gas line to the refrigerant vapor header; capillary line means for placing a controlling bulb of the fourth heating expansion valve into thermal contact with the suction/hot gas line of the fourth loop a short distance from the connection of the suction/hot gas line to the refrigerant vapor header; an air/refrigerant heat exchanger coil having two access ports; a reversing valve having two inlets and two outlets; line means connecting a port of the air/refrigerant heat exchanger coil to the refrigerant liquid line header; line means connecting a port of the air/refrigerant heat exchanger coil to the reversing valve; line means connecting the outlet of the compressor to an inlet of the reversing valve; line means connecting the outlet of the accumulator to the inlet of the compressor; line means connected between the reversing valve and the inlet of the accumulator; line means connected between the reversing valve and the refrigerant vapor header; and capillary line means for placing a controlling bulb of the cooling thermostatic expansion valve in thermal contact with the line means connecting a port of the air/refrigerant heat exchanger to the reversing valve.

The present invention also provides a staged cooling, direct expansion heat pump comprising: five loops, each of a first loop, a second loop, a third loop, a fourth loop and a fifth loop including a suction/hot gas line and a liquid line, each loop being adapted to be buried underground in heat exchange relationship with the earth; a refrigerant vapor header connected in series to each of the five suction/hot gas lines, the refrigerant vapor header being provided with a first solenoid valve positioned between the junction of the suction/hot gas line of the first loop with the refrigerant vapor header and the junction of the suction/hot gas line of the second loop with the refrigerant vapor header, a second solenoid valve positioned between the junction of the suction/hot gas line of the second loop with the refrigerant vapor header, and the junction of the suction/hot gas line of the third loop with the refrigerant vapor header, a third solenoid valve positioned between the junction of the suction/hot gas line of the third loop with the refrigerant vapor header and the junction of the suction/hot gas line of the fourth loop with the refrigerant vapor header, a fourth solenoid valve positioned between the junction of the suction/hot gas line of the fourth loop with the refrigerant vapor header and the junction of the suction/hot gas line of the fifth loop with the refrigerant vapor header, and a fifth solenoid valve situated remote from the junction of the suction/hot gas line of the fifth loop with the refrigerant vapor header; a refrigerant liquid line header provided with a cooling thermostatic expansion valve, the refrigerant liquid line header further being provided with a first solenoid valve positioned between the junction of the liquid line of the first loop with the refrigerant liquid line header and the junction of the liquid line of the second loop with the refrigerant liquid line header, a second solenoid valve positioned between the junction of the liquid line of the second loop with the refrigerant liquid line header and the junction of the liquid line of the third loop with the refrigerant liquid line header, a third solenoid valve positioned between the junction of the liquid line of the third loop with the refrigerant liquid line header and the junction of the liquid line of the fourth loop with the refrigerant liquid line header, and a fourth solenoid valve positioned between the junction of the liquid line of the fourth loop with the refrigerant liquid line header and the junction of the liquid line of the fifth loop with the refrigerant liquid line header, the cooling thermostatic expansion valve being adapted to provide refrigerant metering in the cooling mode, the cooling thermostatic expansion valve having one inlet, one outlet, an equalization port, and a gas-filled controlling bulb; a first connecting line, a second connecting line, a third connecting line, a fourth connecting line connecting line and a fifth connecting line connecting the cooling thermostatic expansion valve to an associated one of the liquid line of the first loop, the liquid line of the second loop, the liquid line of the third loop, the liquid line of the fourth loop, and the liquid line of the fifth loop, respectively; a first heating expansion valve operatively associated with the first connecting line, a second heating expansion valve operatively associated with the second connecting line, a third heating expansion valve operatively associated with the third connecting line, a fourth heating expansion valve operatively associated with the fourth connecting line and a fifth heating expansion valve operatively associated with the fifth connecting line, and each heating expansion valve being adapted to provide refrigerant metering in the heating mode, each valve having one inlet, and one outlet, an equalization port, and a gas-filled controlling bulb; capillary line means for providing a capillary tube by-pass around the cooling thermostatic expansion valve; capillary line means for providing a capillary tube bypass around the inlet and the outlet of each of the first, the second, the third, the fourth and the fifth heating expansion valves; four pressure sensing devices, each being operatively associated with the refrigerant vapor header; an accumulator having an inlet and an outlet; a suction pump having an inlet connected to the accumulator and an outlet; a scavenger line interconnecting the refrigerant vapor header and the accumulator; equalization tube means interconnecting the cooling thermostatic expansion valve, the first heating thermostatic expansion valve, the second heating thermostatic expansion valve and the scavenger line; capillary line means for placing a controlling bulb of the first heating expansion valve in thermal contact with the suction/hot gas line of the first loop a short distance from the connection of the suction/hot gas line to the refrigerant vapor header; capillary line means for placing a controlling bulb of the second heating expansion valve into thermal contact with the suction/hot gas line of the second loop a short distance from the connection of the suction/hot gas line to the refrigerant vapor header; capillary line means for placing a controlling bulb of the third heating expansion valve into thermal contact with the suction/hot gas line of the third loop a short distance from the connection of the suction/hot gas line to the refrigerant vapor header; capillary line means for placing a controlling bulb of the fourth heating expansion valve into thermal contact with the suction/hot gas line of the fourth loop a short distance from the connection of the suction/hot gas line to the refrigerant vapor header; capillary line means for placing a controlling bulb of the fifth heating expansion valve into thermal contact with the suction/hot gas line of the fifth loop a short distance from the connection of the suction/hot gas line to the refrigerant vapor header; an air/refrigerant heat exchanger coil having two access ports; a reversing valve having two inlets and two outlets; line means connecting a port of the air/refrigerant heat exchanger coil to the refrigerant liquid line header; line means connecting a port of the air/refrigerant heat exchanger coil to the reversing valve; line means connecting the outlet of the compressor to an inlet of the reversing valve; line means connecting the outlet of the accumulator to the inlet of the compressor; line means connected between the reversing valve and the inlet of the accumulator; line means connected between the reversing valve and the refrigerant vapor header; and capillary line means for placing a controlling bulb of the cooling thermostatic expansion valve in thermal contact with the line means connecting a port of the air/refrigerant heat exchanger to the reversing valve.

The present invention also provides a method for operating the direct expansion valve heat pump system described hereinabove in a heating mode, the method comprising the steps to be described in detail hereinafter with reference to FIG. 11.

The present invention also provides a method of operating the staged direct expansion heat pump system described hereinabove in a cooling mode, the method comprising the steps of carrying out the staged compressor steps of the two specific stages to be described in detail hereinafter with reference to FIG. 12.

The present invention also provides a method for operating the direct expansion valve heat pump system described hereinabove in a heating mode, the method comprising the steps to be described in detail hereinafter with reference to FIG. 11.

The present invention also provides a method of operating the direct expansion heat pump system described hereinabove in a cooling mode, the method comprising the steps of carrying out the staged compressor steps of the two specific stages to be described in detail hereinafter with reference to FIG. 12.

The present invention also provides a method for operating the direct expansion valve heat pump system described hereinabove in a heating mode, the method comprising the steps to be described in detail hereinafter with reference to FIG. 9.

The present invention also provides a method of operating the direct expansion heat pump system described hereinabove in a cooling mode, the method comprising the steps of carrying out the staged compressor steps of the three stages to be described in detail hereinafter with reference to FIG. 10.

The present invention also provides a method for operating the direct expansion valve heat pump system described hereinabove in a heating mode, the method comprising the steps to be described in detail hereinafter with reference to FIG. 13.

The present invention also provides a method of operating the direct expansion heat pump system described hereinabove in a cooling mode, the method comprising the steps of carrying out the staged compressor steps of the four stages to be described in detail hereinafter with reference to FIG. 14.

The present invention also provides a method for operating the direct expansion valve heat pump system described hereinabove in a heating mode, the method comprising the steps to be described in detail hereinafter with reference to FIG. 15.

The present invention also provides a method of operating the direct expansion heat pump system described hereinabove in a cooling mode, the method comprising the steps of carrying out the staged compressor steps of the five stages to be described in detail hereinafter with reference to FIG. 16.

Other Features of the Invention

By one feature of such loop systems, the system includes an accumulator, and a scavenging line connected between the refrigerant vapor header and the accumulator.

By one feature of such loop system, the system includes a compressor connected to the accumulator, the compressor being selectively connected to the refrigerant liquid line header or to the refrigerant vapor header.

By one feature of such loop systems, the system includes a reversing valve, which is selectively actuatable to effect the selected connection of the compressor to the refrigerant liquid line header and to the refrigerant vapor header.

By one feature of such loop systems, the system includes an air/refrigerant heat exchanger coil interposed between the refrigerant liquid line header and the refrigerant vapor header.

BRIEF DESCRIPTION OF THE DRAWINGS

In the accompanying drawings.

DESCRIPTION OF EMBODIMENTS OF THE INVENTION

Figure 1:
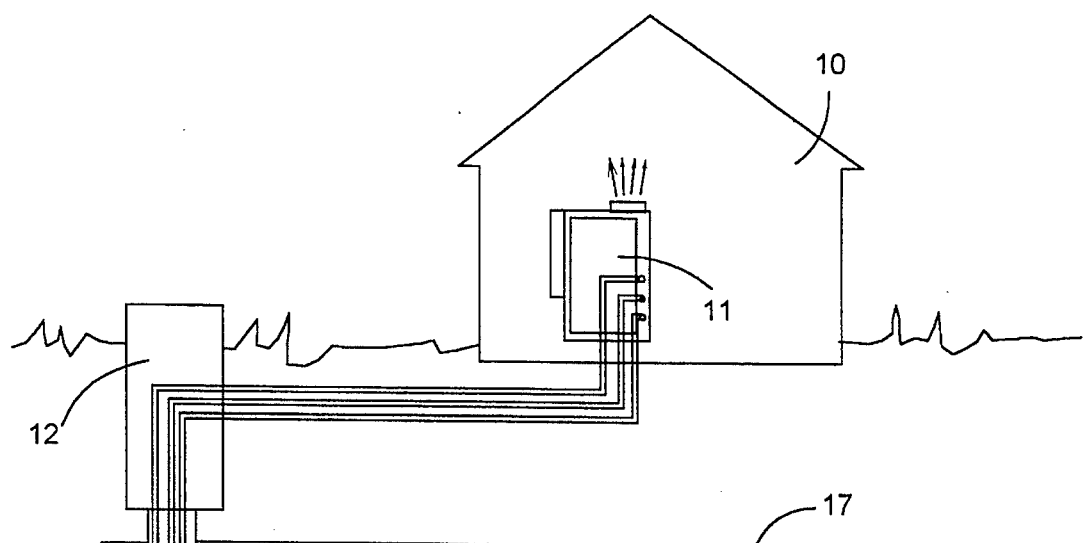
FIG. 1 is a schematic illustration of a vertical installation heat exchanger adaptable for the invention in the above-identified parent application Ser. No. 08/053,050 filed Apr. 23, 1993 for the present invention.

Description of FIG. 1

As seen in FIG. 1, a house 10 to be heated and/or cooled includes a heat pump 11 and an access manhole cabinet 12. The system includes three loops 13, 14 and 15 disposed in a vertical borehole 16, well below the water table 17.

FIG. 1 shows a typical vertical 6" borehole with a 3 U-tube configuration. Liquid lines are ⅜" OD. Suction/hot gas lines are ⅝" OD. Natural convection is obtained in the well by drilling to a depth of about 300 ft. and allowing the cold water to set up a thermocline during the winter months.

Figure 2:
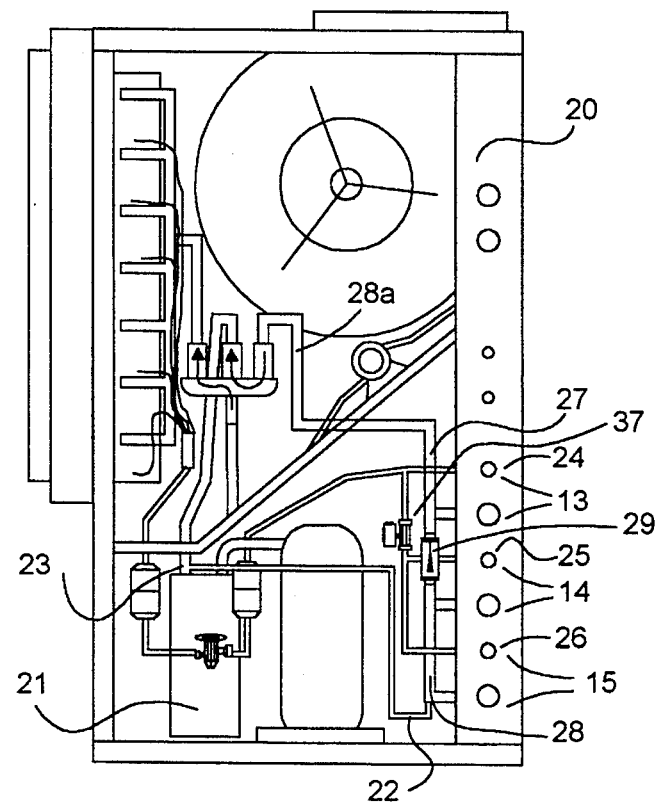
FIG. 2 is a schematic illustration of a cabinet component layout "DX"-to-air adaptable for the invention in the above-identified parent application Ser. No. 08/053,050 filed Apr. 23, 1993 for the present invention.

Description of FIG. 2

The cabinet seen in FIG. 2 includes a main cabinet 20 within which is mounted an accumulator 21 which supplies a source of the refrigerant a portion of which is received by way of scavenger line 22 to the inlet 23 of the accumulator 21. The refrigerant is supplied to lines 24, 25 and 26 leading to three loops 13, 14 and 15, respectively. The main return line 27 goes to the reversing valve suction inlet port 28a.

Figure 3:
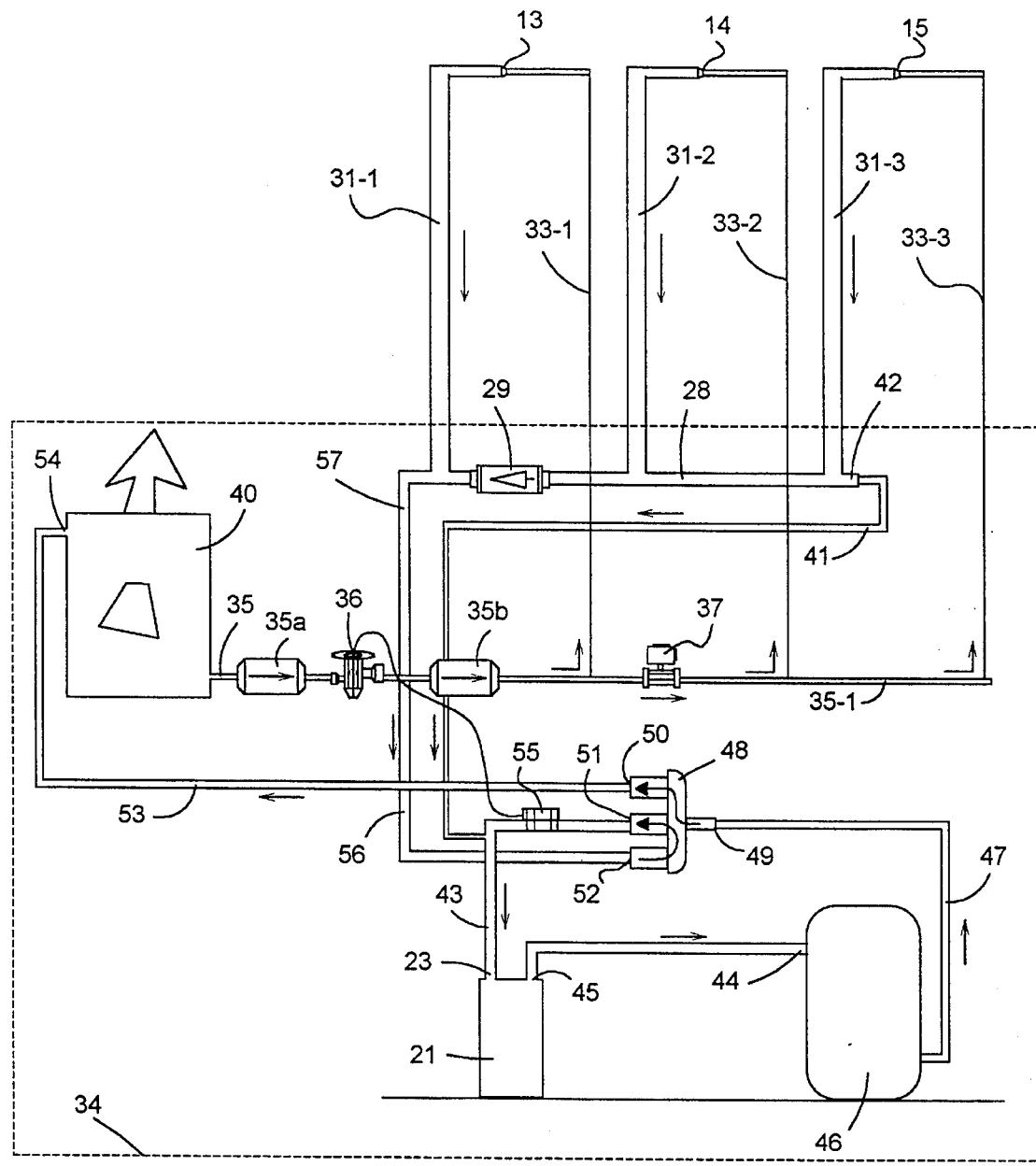
FIG. 3 is a schematic representation of one embodiment of a "DX" system of the invention in the above-identified parent application Ser. No. 08/053,050 filed Apr. 23, 1993 in the heating mode.
Figure 4:
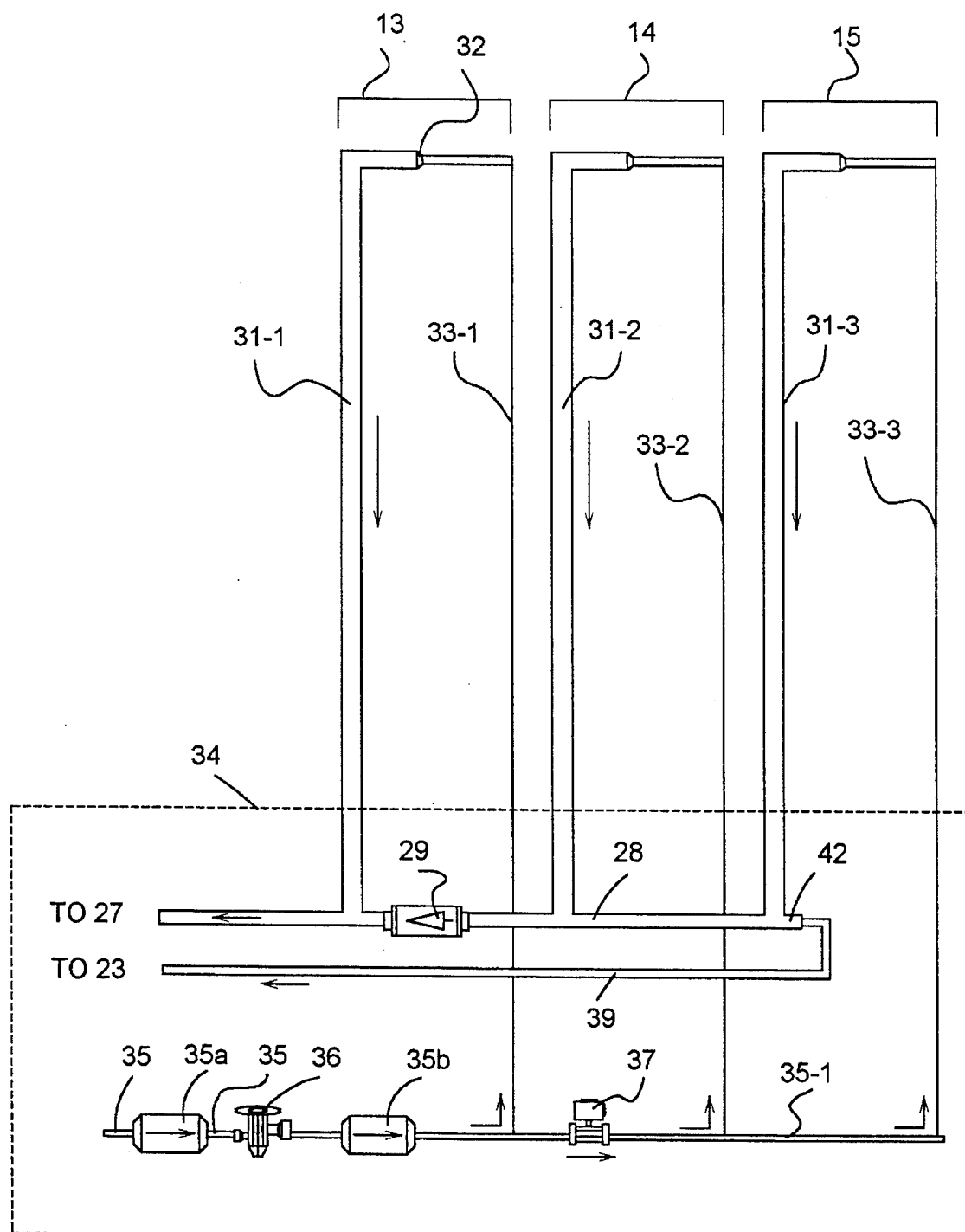
FIG. 4 is a schematic illustration of the "DX" system multiple loop configuration of FIG. 3, i.e., the invention in the above-identified parent application Ser. No. 08/053,050 filed Apr. 23, 1993 in the heating mode.

Description of FIGS. 3 and 4

FIGS. 3 and 4 show one embodiment of the "DX" system of the invention provided in the above-identified patent application Ser. No. 08/053,050 filed Apr. 23, 1993, in its heating mode. In its physical construction, the "DX" system multi-loop configuration shown in FIG. 3 includes, as a core, the construction to be described hereinafter in FIG. 4. As seen in FIG. 3, the liquid line 35 is connected to an air condenser 40. An outflow line 41 is connected between the downstream end 42 of suction hot gas header 28 and the line 43 connected to the inlet 23 of the accumulator 21. The outlet line 45 of the accumulator 21 is connected to the inlet 44 of a compressor 46, where the outlet line 47 therefrom is connected to the inlet port 49 of a reversing valve 48. Reversing valve 48 has three outlet ports 50, 51 and 52. Inlet/outlet port 50 is connected by line 53 to the inlet 54 of the air condenser 40. Outlet port 51 is connected to the inlet line 43 connected to accumulator 21. A temperature indicating bulb 55 is provided, bulb 55 controlling thermostatic expansion valve 36. Inlet/outlet port 52 is connected, via line 56 to the downstream end 57 of refrigerant vapor header 28.

The core of the multi-loop system is shown in more detail in FIG. 4. It is noted that each of the three loops 13, 14 and 15 includes a suction gas line, i.e. 31-1, 31-2, 31-3 (respectively), which may be copper tubing of ⅝" outside diameter connected by, e.g., a silver-soldered joint 32 to a respective downflow liquid refrigerant line, i.e. 33-1, 33-2, 33-3, which may be copper tubing of ⅜" outside diameter. The underground piping 31-1, 31-2, 31-3 and 33-1, 33-2, 33-3 are each of sufficient length to provide for proper heat exchange with the for a given compressor size and conditions.

The broken line 34 represents the "DX" heat pump cabinet shown in FIG. 2. Within the "DX" heat pump cabinet is the refrigerant vapor header 28, which leads to the main line 27 leading to the suction inlet port 28a of the reversing valve in the heating mode. Each of the suction gas lines 31-1, 31-2, 31-3 is connected thereto. It is noted that refrigerant vapor header 28 is fitted with a check valve 29. It is also to be observed that refrigerant vapor lines 31-2 and 31-3 are connected to suction header 28 upstream of check valve 29 and that suction gas line 33-1 is connected to refrigerant vapor header 28 downstream of check valve 29. The purpose of this configuration will be explained hereinafter. A scavenger line 39 leads from refrigerant vapor header 28 upstream of check valve 29 to the inlet 23 of the accumulator 21.

A main liquid refrigerant line 35 leads, via a first reversible filter drier 35a, a thermostatic expansion valve 36, a second reversible filter drier 35b, and an electric solenoid valve 37 to liquid refrigerant vapor header 35-1 and to the liquid refrigerant lines 33-1, 33-2 and 33-3 of loops 13, 14 and 15. It is also to be observed that liquid refrigerant lines 33-2 and 33-3 are connected to liquid refrigerant vapor header 35-1 downstream of electric solenoid valve 37, and that liquid refrigerant line 33-1 is connected to liquid refrigerant vapor header 35-1 upstream of electric solenoid valve 35. The purpose of this configuration will be explained hereinafter in the description of the operation of the system.

Figure 5:
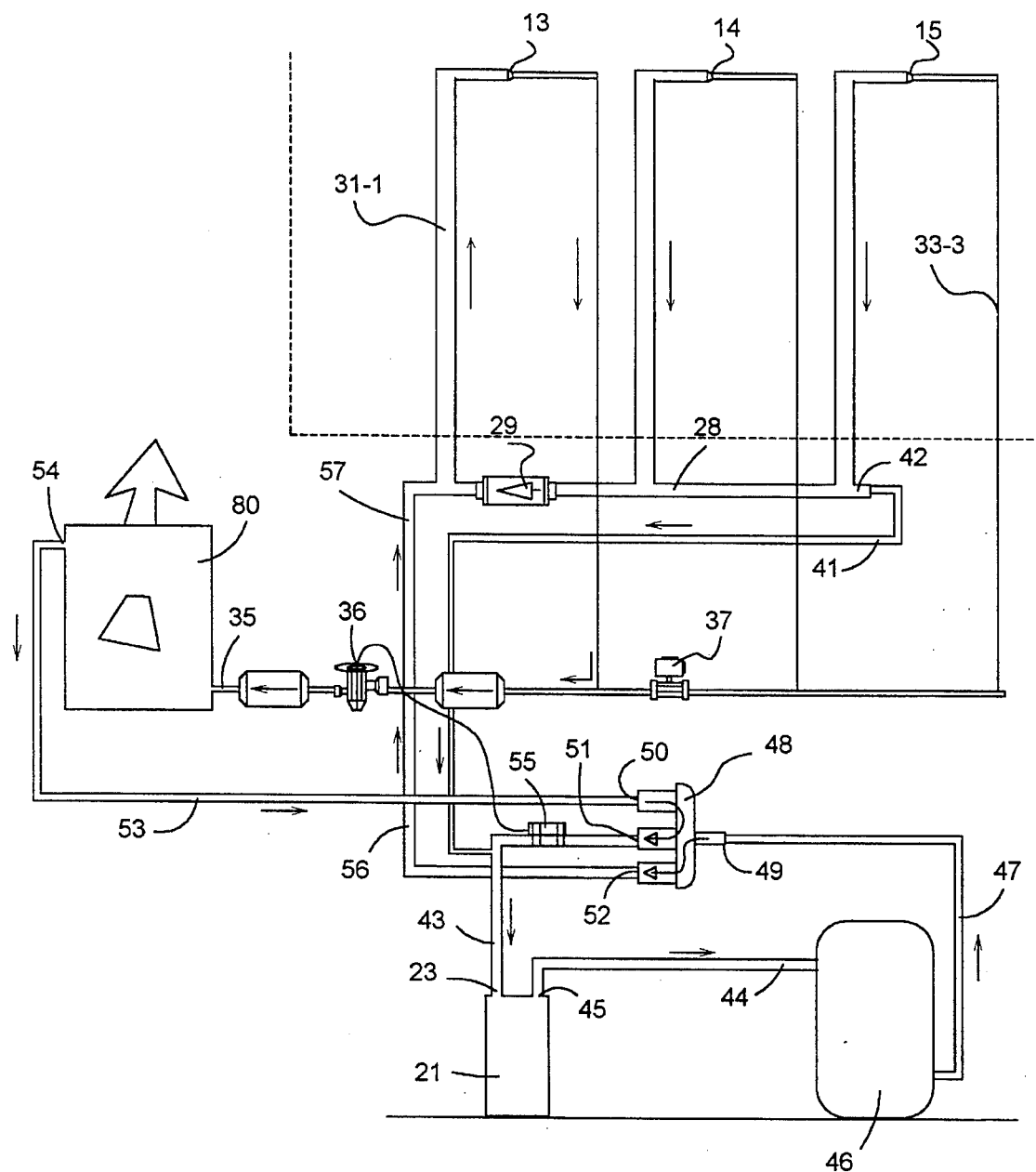
FIG. 5 is a schematic representation of one embodiment of a "DX" system of the invention in the above-identified parent application Ser. No. 08/053,050 filed Apr. 23, 1993 in the cooling mode.
Figure 6:
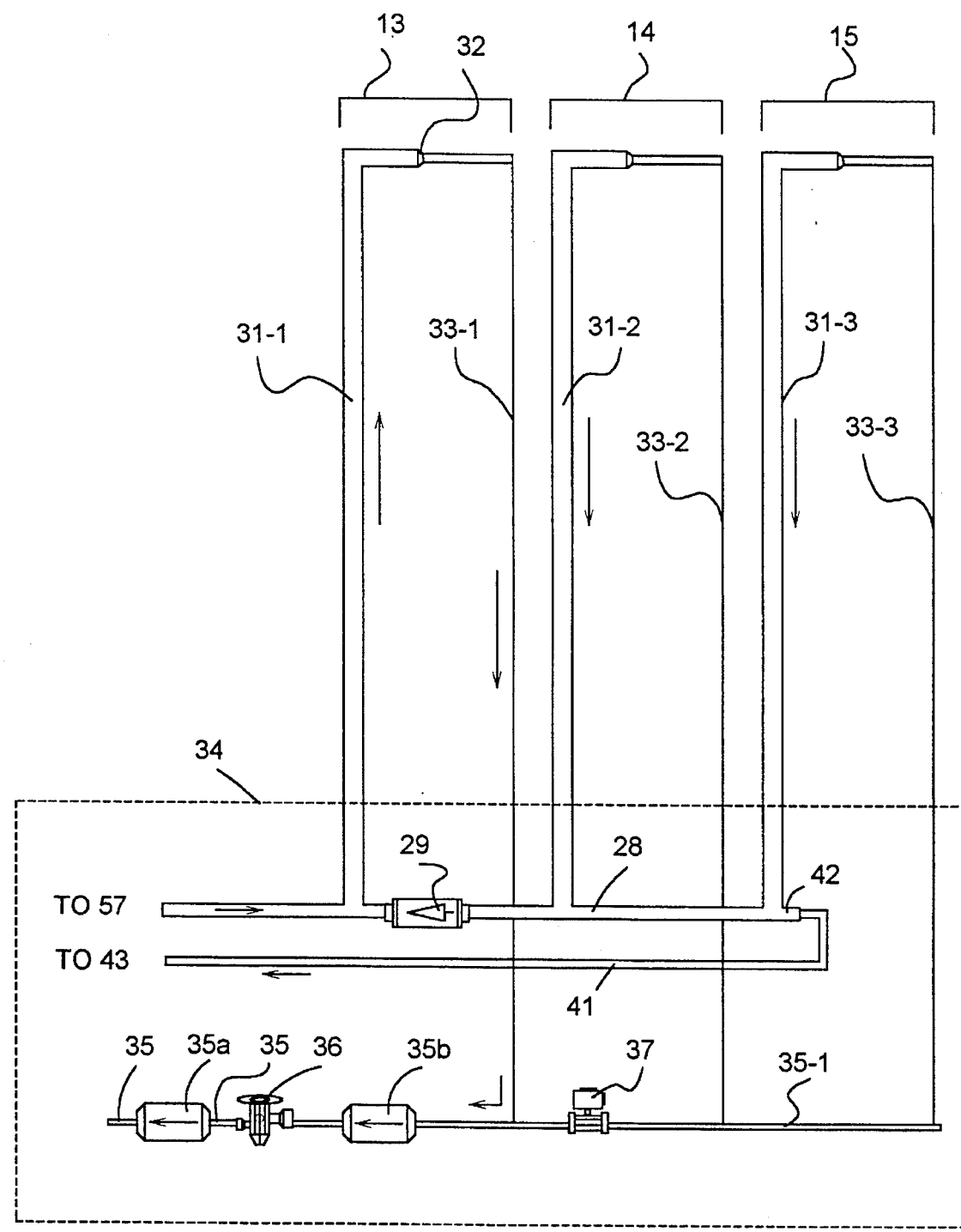
FIG. 6 is a schematic illustration of the "DX" system multiple loop configuration of FIG. 5, i.e., the invention in the above-identified parent application Ser. No. 08/053,050 filed Apr. 23, 1993 in the cooling mode.

Description of FIGS. 5 and 6

FIGS. 5 and 6 show the embodiment of the "DX" system of the invention provided in the above-identified patent application Ser. No. 08/053,050 filed Apr. 23, 1993, shown in FIGS. 3 and 4 in the cooling mode.

As seen in FIG. 5, in its physical construction, the "DX" system multi-loop configuration includes, as a core, the construction previously described for FIG. 4. However, in its cooling mode, it is seen that the liquid line 35 is connected to an air evaporator 80. An outflow line 41 is connected between the upstream end 42 of refrigerant vapor header 28 and the line 43 connected to the inlet 23 of the accumulator 21. The outlet line 45 of the accumulator 21 is connected to the inlet 44 of a compressor 46, where the outlet line 47 therefrom is connected to the inlet port 49 of a reversing valve 48. Reversing valve 48 has three outlet ports 50, 51 and 52. Inlet/outlet port 50 is connected, by line 53 to the inlet 54 of the air condenser 80. Outlet port 51 is connected to the inlet line 43 connected to accumulator 21. A temperature indicating bulb 55 is provided, bulb 55 controlling thermostatic expansion valve 36. Inlet/outlet port 52 is connected, via line 56 to the downstream end 57 of refrigerant vapor header 28. The purpose of this configuration will be explained hereinafter in the description of the operation of the system.

Figure 7:
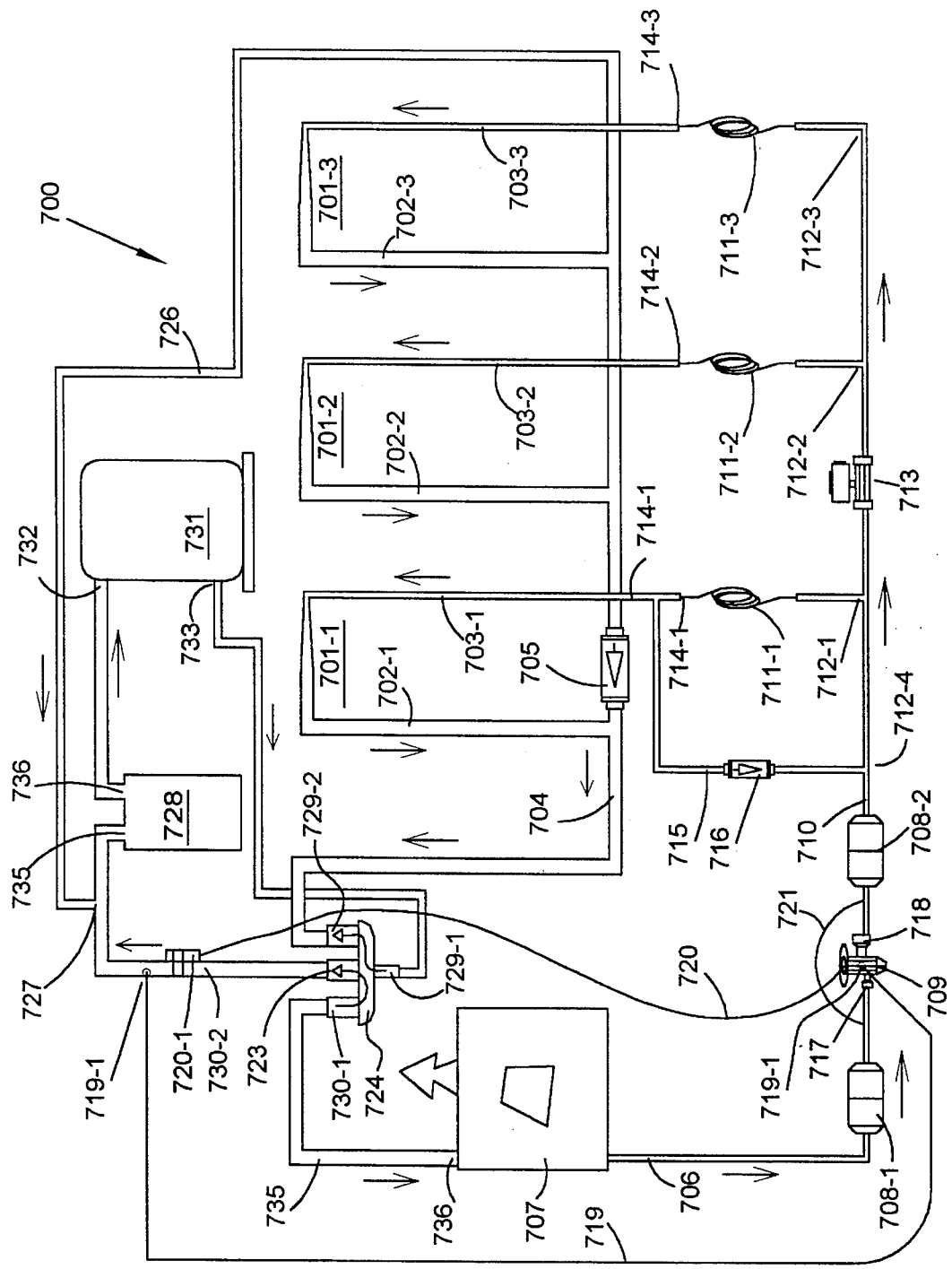
FIG. 7 is a schematic representation of another embodiment of the invention in the above-identified parent application Ser. No. 08/053,050 filed Apr. 23, 1993, i.e., a capillary-balanced feed, in the heating mode.
Figure 8:
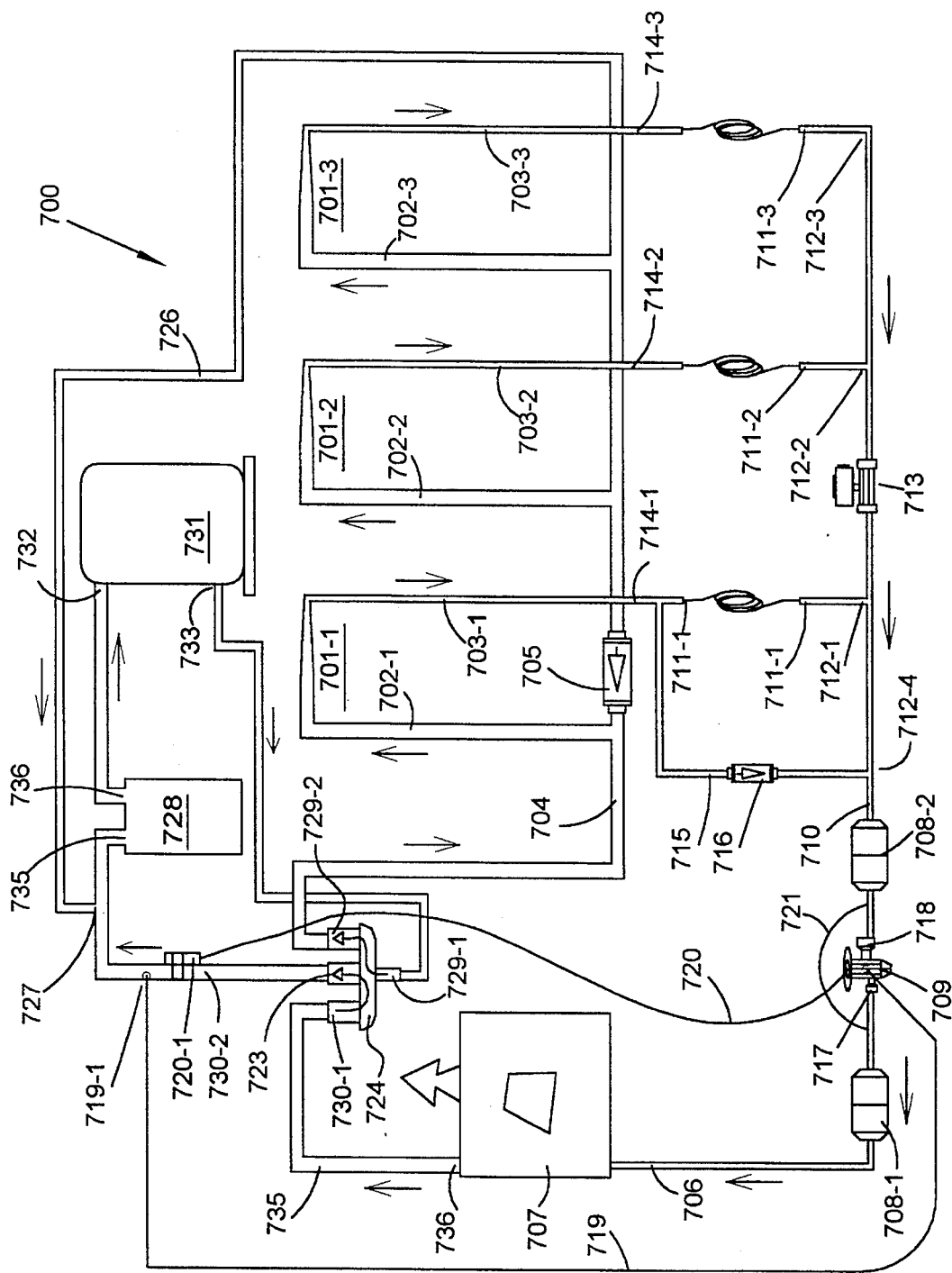
FIG. 8 is a schematic representation of another embodiment of the invention in the above-identified parent application Ser. No. 08/053,050 filed Apr. 23, 1993, i.e., a capillary-balanced feed, in the cooling mode.

Description of FIGS. 7 and 8

FIGS. 7 and 8 show another embodiment of the invention provided in the above-identified patent application Ser. No.

08/053,050 filed Apr. 23, 1993, namely a capillary-balanced feed system, FIG. 7 showing the configurations in the heating mode, and FIG. 8 showing the configurations in the cooling mode.

As seen in FIGS. 7 and 8, the system 700 includes three loops. A first loop 701-1 includes a dual purpose refrigerant vapor line 702-1 and a liquid line 703-1. The second loop 701-2 and third loop 701-3 are operationally idle during the cooling mode. These loops include a suction line 702-2, 703-2 respectively, and a liquid line 703-2, 703-3 respectively. Each loop 701-1, 701-2 and 701-3 is adapted to be buried underground in heat exchange relationship with the. A refrigerant vapor header 704 is provided with a check valve 705.

The refrigerant vapor line 702-1 of the first loop 701-1 is connected to the refrigerant vapor header 704 downstream of the check valve 705. The suction lines 702-2, 703-2 of each of the other two loops 701-2, 701-3 respectively, are connected to the refrigerant vapor header 704 upstream of the check valve 705. A liquid line 706 leads from an air condenser 707 through a first reversible filter-drier 708-1, a "TX" valve 709 and a second reversible filter-drier 708-2 to a refrigerant liquid line header 710.

A first capillary tube 711-1 has inlet 712-1 connected to refrigerant liquid line header 710 upstream of a normally open electric solenoid valve 713. The outlet 714-1 of first capillary tube 711-1 is connected to the liquid line 703-1 of first loop 701-1. A second capillary tube 711-2 has its inlet 712-2 connected to refrigerant liquid line header 710 downstream of valve 713 and has its outlet 714-2 connected to liquid line 703-2 of second loop 701-2. A third capillary tube 711-3 has its inlet 712-3 connected to refrigerant liquid line header 710 downstream of both inlet 712-2 and valve 713 and has its outlet 714-3 connected to liquid line 703-3 of third loop 701-3. A bypass line 715 has its outlet 712-4 at the refrigerant liquid line header 710 and has its inlet connected to liquid line 703-1 and first capillary tube 711-1. Bypass line 715 is also provided with a check valve 716. Thus, three capillary tubes 711-1, 711-2, 711-3, are installed as restriction devices to provide balanced refrigerant metering in the heating mode.

The "TX" valve 709 is connected to act as the primary refrigerant metering device. Valve 709 has one inlet 717, one outlet 718, one equalizer tube 719 leading to an equalization port 719-1 and one gas-filled line 720 leading to a gas-filled controlling bulb 720-1. A capillary tube bypass 721 is installed between the inlet 717 and the outlet 718 of the thermostatic expansion valve 709. The equalizer tube 719 of the thermostatic expansion valve 709 is connected to the common suction outlet 723 of the reversing valve 724. The controlling bulb or sensing bulb 725 of the thermostatic expansion valve 709, is placed in thermal contact with the common suction outlet 723 of the reversing valve 724. A scavenging line 726 is connected between the refrigerant vapor header 704 upstream of the check valve 705 and the inlet 727 of an accumulator 728. The reversing valve 724, has two inlets 729-1, 729-2 and two outlets 730-1, 730-2. A compressor 731 having a suction inlet 732 and a discharge outlet 733 is provided, the discharge outlet 733 being connected to the refrigerant vapor inlet 729-1 of the reversing valve 724.

The accumulator 728 has an inlet 735 and an outlet 736, the outlet 736 being connected to the inlet 732 of the compressor 731. The refrigerant vapor outlet 730-1 of the reversing valve 724 is connected by a refrigerant vapor line 735 to the inlet 736 of the air condenser 707. The common suction outlet 723 of the reversing valve 724 is connected to the inlet 735 of the accumulator 728, and the suction inlet 729-2 of the reversing valve 724 is connected to the refrigerant vapor header 704 downstream of the check valve 705.

Figure 9:
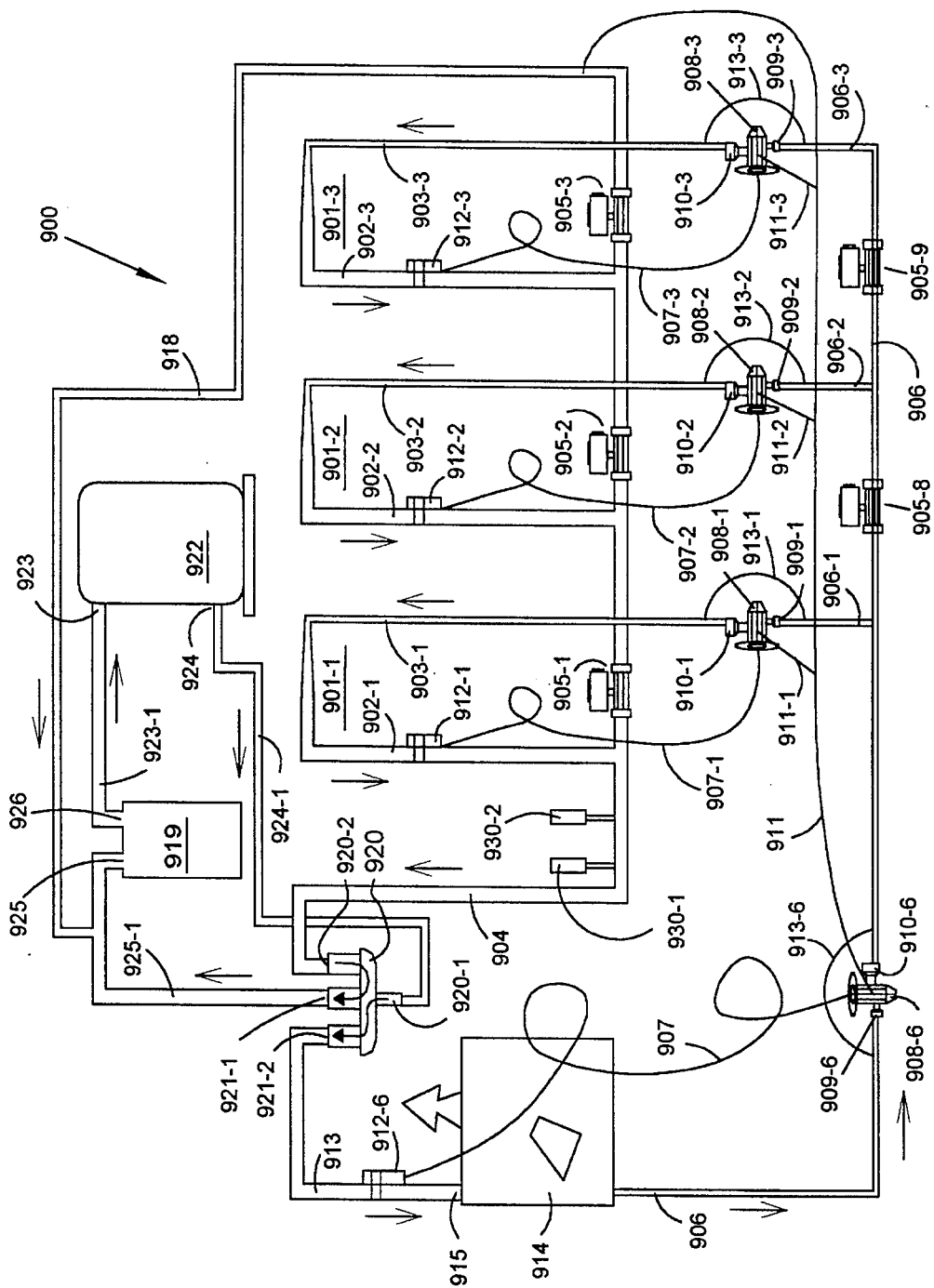
FIG. 9 is a schematic representation of one embodiment of the present invention, i.e., a 3 ton/3 loop system, using individual "TX" valve metering for staged heating, in the heating mode with all circuits active.
Figure 10:
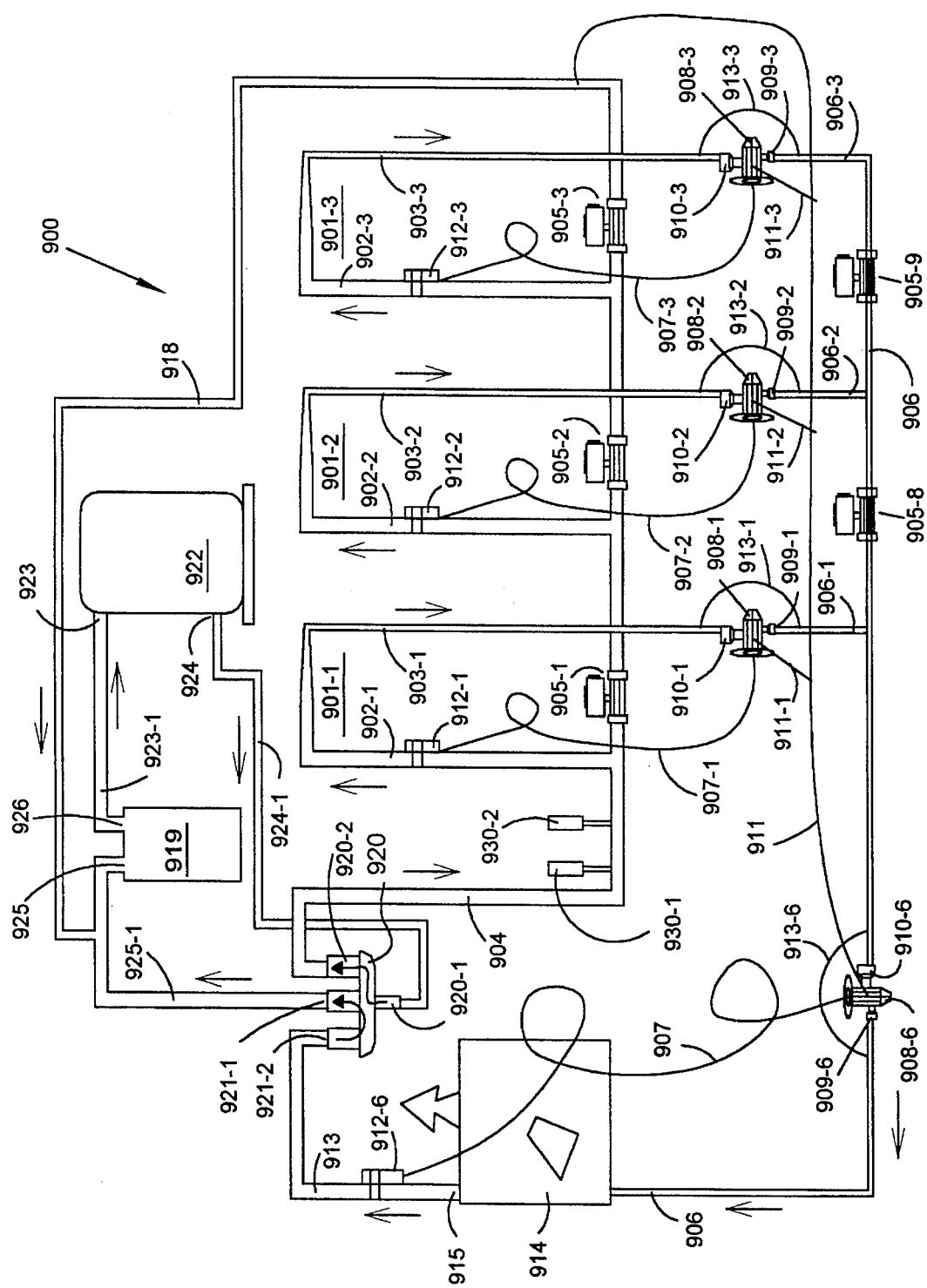
FIG. 10 is a schematic representation of the embodiment of the present invention shown in FIG. 9, i.e., a 3 ton/3 loop system, using individual "TX" valve metering for staged cooling, in the cooling mode.

Description of FIGS. 9 and 10

FIGS. 9 and 10 show one preferred embodiment of the present invention, i.e., a 3 ton/3 loop system which uses using individual "TX" valve metering for the heating mode and employs a staged condenser cooling mode, FIG. 9 being the configuration for the heating mode and FIG. 10 being the configuration for the cooling mode.

As seen in FIGS. 9 and 10, the system 900 includes three ground loops, namely a first loop 901-1 including a refrigerant vapor suction/hot gas line 902-1 and a liquid line 903-1, as well as a second loop 901-2 and a third loop 901-3, each such second and third loop including a suction/hot gas line 902-2, 902-3 and a liquid line 903-2, 903-3, respectively. Each loop 901-1, 901-2, 901-3 is adapted to be buried underground in heat exchange relationship with the earth. A refrigerant vapor header 904 is provided with a first pressure sensing device 930-1 and with a second pressure sensing device 930-2. In addition, the refrigerant vapor header 904 is provided with three solenoid valves 905-1, 905-2, 905-3. The refrigerant vapor line 902-1 of the first loop 901-1 is connected to the refrigerant vapor header 904 upstream of the first solenoid valve 905-1. The refrigerant vapor line 902-2 of the second loop 901-2 is connected to the refrigerant vapor header 904 upstream of the second solenoid valve 905-2. Similarly, the refrigerant vapor line 902-3 of the third loop 901-3 is connected to the refrigerant vapor header 904 upstream of the third solenoid valve 905-3.

The refrigerant liquid line header 906 is provided with a cooling "TX" valve 908-6. Cooling "TX" valve 908-6 has one inlet 909-6 and one outlet 910-6, an equalizer line 911 leading from an equalizer port, and a connection 907 to a gas-filled controlling bulb 912-6. A capillary tube bypass 913-6 is installed to bypass the inlet 909-6 and the outlet 910-6 of the cooling "TX" valve 908-6. Three heating "TX" valves, namely, 908-1, 908-2, 908-3 are installed in liquid lines 906-1, 906-2, 906-3, respectively, and provide refrigerant metering in the heating mode. Each "TX" valve 908-1, 908-2, 908-3 has one inlet 909-1, 909-2, 909-3, respectively, and one outlet 910-1, 910-2, 910-3, a heating equalizer line 911-1, 911-2, 911-3, leading to a respective equalizer port, and a connection 907-1, 907-2, 907-3 to a gas-filled controlling bulb 912-1, 912-2, 912-3, respectively. A capillary tube bypass 913-1, 913-2, 913-3 is installed in lines 906-1, 906-2, 906-3, respectively, bypassing the inlet 909-1, 909-2, 909-3, and the outlet 910-1, 910-2, 910-3, of each of the heating "TX" valves 908-1, 908-2, 908-3, respectively,. The inlet 909-1 of the first heating "TX" valve 908-1 is connected by liquid line 906-1 to the refrigerant liquid line header 906 downstream of the cooling "TX" valve 908-6. The outlet 910-1 of that "TX" valve 908-1 is connected to the liquid line 903-1 of the first loop 901-1. The equalizer line 911-1 from its associated equalization port of that "TX" valve 908-1 is connected to the equalization port of cooling "TX" valve 908-6 via line 911. The controlling bulb 912-1 connected to that "TX" valve 908-1 is placed in thermal contact with the refrigerant vapor line 902-1 of the first loop 901-1 a short distance from its connection to refrigerant vapor header 904.

Similarly, the inlet 909-2 of the second heating "TX" valve 908-2 is connected by liquid line 906-2 to the refrigerant liquid line header 906 downstream of the solenoid valve 905-8, and upstream of the solenoid valve 905-9. The outlet 910-2 of that "TX" valve 908-2 is connected to the liquid line 903-2 of the second loop 901-2. The equalizer line 911-2 from its associated equalization port of that "TX" valve 908-2 is connected to the equalization port of cooling "TX" valve 908-6 via line 911. The controlling bulb 912-2 connected to that "TX" valve 908-2 is placed in thermal contact with the refrigerant vapor line 902-2 of the second loop 901-2 a short distance from its connection to refrigerant vapor header 904.

Also, similarly, the inlet 909-3 of the third heating "TX" valve 908-3 is connected by liquid line 906-3 to the refrigerant liquid line header 906 downstream of the solenoid valve 905-9. The outlet 910-3 of that "TX" valve 908-3 is connected to the liquid line 903-3 of the third loop 901-3. The equalizer line 911-3 from its associated equalization port of that "TX" valve 908-3 is connected to the equalization port of cooling "TX" valve 908-6 via line 911. The controlling bulb 912-3 connected to that "TX" valve 908-3 is placed in thermal contact with the refrigerant vapor line 902-3 of the third loop 901-3 a short distance from its connection to refrigerant vapor header 904.

Line 906-2 leading from liquid line 906 to the liquid line 903-2 of the second loop 901-2 is connected to a fourth solenoid valve 905-8, and similarly, line 906-3 leading from liquid line 906 to the liquid line 903-3 of the third loop 901-3 is connected to a fifth solenoid valve 905-9.

As seen in FIGS. 9 and 10, and as previously described, cooling "TX" valve 908-6 provides refrigerant metering in the cooling mode (shown explicitly in FIG. 10). As previously described, cooling "TX" valve 908-6 has one inlet 909-6 and one outlet 910-6, a cooling equalizer line 911 leading to a cooling equalization port and a line 907-6 connected to a gas-filled controlling bulb 912-6. All equalizer lines 911-1, 911-2, 911-3, 911-4 are interconnected by means of cooling equalizer line 911. The controller bulb 912-6 connected to the cooling "TX" valve 908-6 is placed in thermal contact with the refrigerant vapor line 913 of the refrigerant/air heat exchanger coil 914 a short distance from the outlet 915 of the refrigerant/air heat exchanger coil 914. A scavenging line 918 is connected between the refrigerant vapor header 904 downstream of the third solenoid valve 905-3 and upstream of an accumulator 919. Cooling equalizer line 911 is also connected to scavenger line 918. A compressor 922 in the system has a suction inlet 923 and a discharge outlet 924. A reversing valve 920 is connected between outlet line 924-1 of compressor 922 and inlet line 925-1 of accumulator 919, reversing valve 920 having two inlets 920-1, 920-2 and two outlets 921, 921-2. The discharge outlet 924 to line 924-1 is connected to the hot gas inlet 920-1 of the reversing valve 920. The accumulator 919 in the system has an inlet 925 connected to line 925-1 and an outlet 926 leading to line 923-1. The outlet 926 is connected to the suction inlet 927 of the compressor 922 via line 923-1. The hot gas outlet 921-2 of the reversing valve 920 is connected to the inlet 915 of the air coil 914 by line 913. The common suction outlet 921-1 of the reversing valve 920 is connected to the inlet 925 of the accumulator 919 via line 925-1. The suction inlet 920-2 of the reversing valve 920 is connected to the refrigerant vapor header 904 downstream of the first solenoid valve 905-1. cl Description of FIGS. 11 and 12

Figure 11:
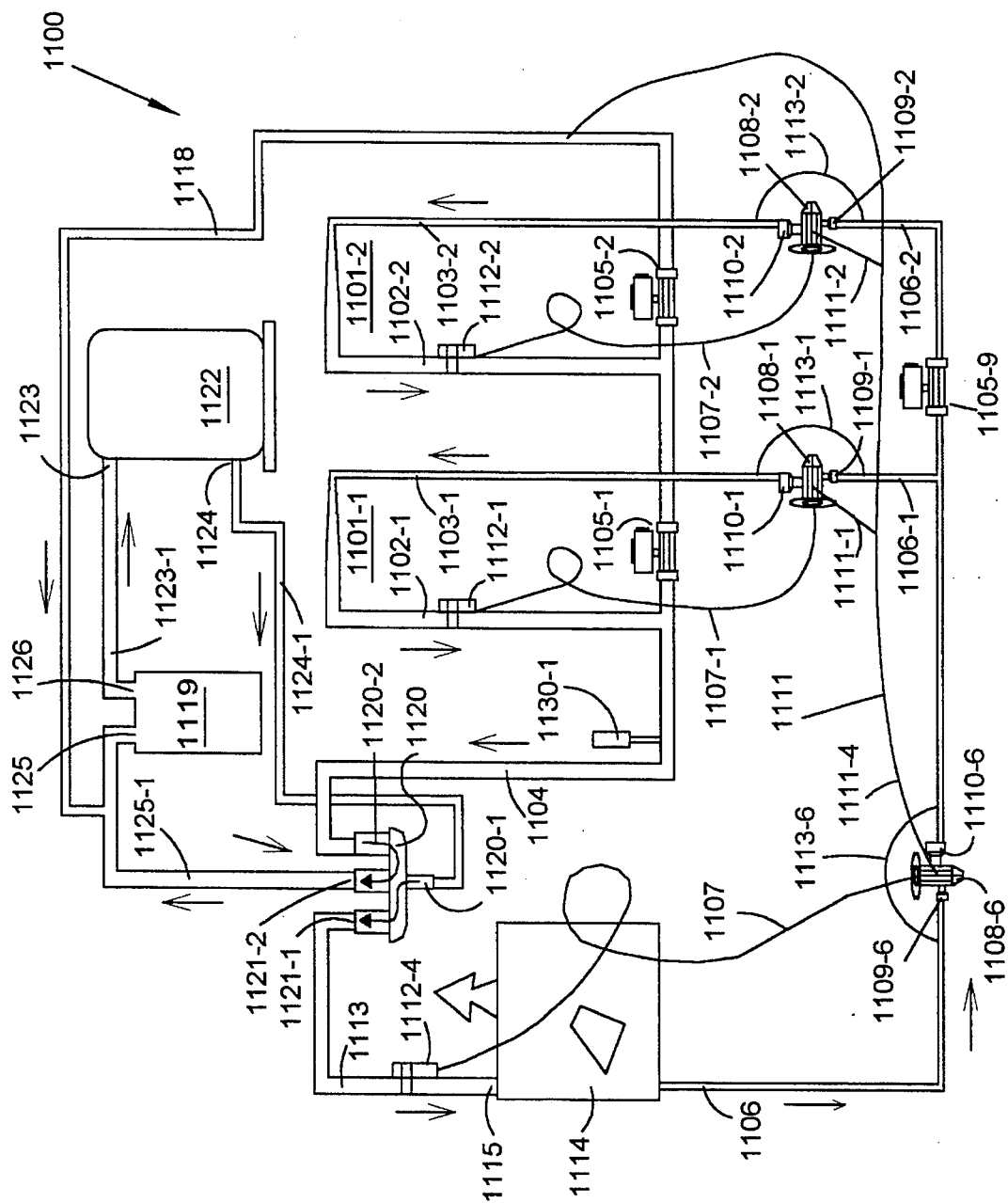
FIG. 11 is a schematic representation of an embodiment of the present invention, i.e., a 2 ton/2 loop system, using individual "TX" valve metering for staged heating, with all circuits active in the heating mode.
Figure 12:
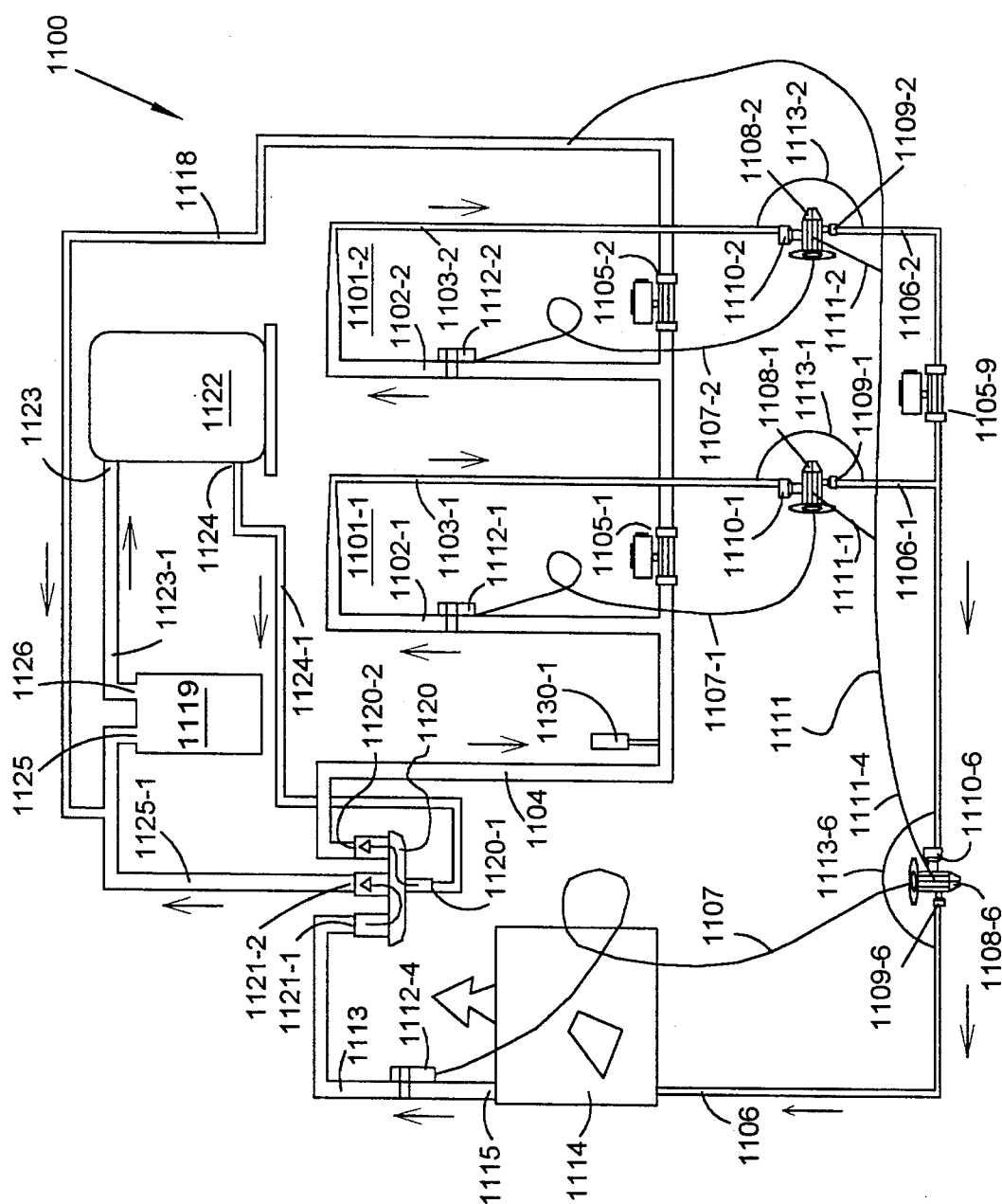
FIG. 12 is a schematic representation of the embodiment of the present invention shown in FIG. 11, i.e., a 2 ton/2 loop system, using individual "TX" valve metering, for staged cooling, in the cooling mode.

FIGS. 11 and 12 show another embodiment of the present invention, i.e., a 2 ton/2 loop system, which uses individual "TX" valve metering for the heating mode and employs a staged condenser cooling mode, FIG. 11 being the configuration for the heating mode and FIG. 12 being the configuration for the cooling mode.

As seen in FIGS. 11 and 12, the system 1100 includes two ground loops, namely a first loop 1101-1 including a refrigerant vapor suction/hot gas line 1102-1 and a liquid line 1103-1, and a second loop 1101-2 such loop including a suction/hot gas line 1102-2, and a liquid line 1103-2. Each loop 1101-1 and 1101-2 is adapted to be buried underground in heat exchange relationship with the earth. A refrigerant vapor header 1104 is provided with a pressure sensing device 1130-1. In addition, the refrigerant vapor header 1104 is provided with two solenoid valves 1105-1 and 1105-2. The refrigerant vapor line 1102-1 of the first loop 1001-1 is connected to the refrigerant vapor header 1104 upstream of the first solenoid valve 1105-1. The refrigerant vapor line 1102-2 of the second loop 1101-2 is connected to the refrigerant vapor header 1104 upstream of the second solenoid valve 1105-2.

The refrigerant liquid line header 1106 is provided with a cooling thermostatic expansion valve ("TX" valve) 1108-6. Cooling "TX" valve 1108-6 has one inlet 1109-6 and one outlet 1110-6, an equalizer line 1111 leading from an equalizer port, and a connection 1107 to a gas-filled controlling bulb 1112-4. A capillary tube bypass 1113-6 is installed to bypass the inlet 1109-6 and the outlet 1110-6 of the cooling "TX" valve 1108-6.

Two heating "TX" valves, namely, 1108-1 and 1108-2, are installed in liquid lines 1006-1, 1006-2, respectively, and provide refrigerant metering in the heating mode, each "TX" valve 1108-1, 1108-2, having one inlet 1109-1, 1109-2, one outlet 1110-1, 1110-2, a heating equalizer line 1111-1, 1111-2, leading to a respective equalizer port, and a connection 1107-1, 1107-2 to a gas-filled controlling bulb 1112-1, 1112-2, respectively. A capillary tube bypass 1113-1, 1113-2, is installed in lines 1006-1, 1006-2, bypassing the inlet 1109-1, 1109-2, and the outlet 1110-1, 1110-2, of each of the heating "TX" valves 1108-1, 1108-2, respectively. The inlet 1109-1 of the first heating "TX" valve 1108-1 is connected by liquid line 1106-1 to the refrigerant liquid line header 1106 downstream of the cooling "TX" valve 1108-6. The outlet 1110-1 of that "TX" valve 1108-1 is connected to the liquid line 1003-1 of the first loop 1101-1. The equalizer line 1111-1 from its associated equalization port of that "TX" valve 1108-1 is connected to the equalization port of cooling "TX" valve 1008-6 via line 1111. The controlling bulb 1112-1 connected to that "TX" valve 1108-1 is placed in thermal contact with the refrigerant vapor line 1102-1 of the first loop 1101-1 a short distance from its connection to refrigerant vapor header 1104.

Similarly, the inlet 1109-2 of the second heating "TX" valve 1108-2 is connected by liquid line 1106-2 to the refrigerant liquid line header 1106 downstream of the solenoid valve 1105-9. The outlet 1110-2 of that "TX" valve 1108-2 is connected to the liquid line 1103-2 of the second loop 1001-2. The equalizer line 1111-2 from its associated equalization port of that "TX" valve 1108-2 is connected to the equalization port of cooling "TX" valve 1108-6 via line 1111. The controlling bulb 1112-2 connected to that "TX" valve 1108-2 is placed in thermal contact with the refrigerant vapor line 1102-2 of the second loop 1101-2 a short distance from its connection to refrigerant vapor header 1104.

Line 1106-2 leading from liquid line 1106 to the liquid line 1103-2 of the second loop 1101-2 is fitted with a third solenoid valve 1105-9.

As seen in FIGS. 11 and 12, and as previously described, cooling "TX" valve 1108-6 provides refrigerant metering in the cooling mode (shown explicitly in FIG. 11). As previously described, cooling "TX" valve 1108-6 has one inlet 1109-6 and one outlet 1110-6, a cooling equalizer line 1111-4 leading to a cooling equalization port and a line 1107-6 connected to a gas-filled controlling bulb 1112-6. Equalizer lines 1111-1, 1011-2, are interconnected by means of equalizer line 1111. The controller bulb 1112-4 connected to the cooling "TX" valve 1108-6 is placed in thermal contact with the refrigerant vapor line 1113 of the refrigerant/air heat exchanger coil 1114 a short distance from the outlet 1115 of the refrigerant/air heat exchanger coil 1114.

A scavenging line 1118 is connected between the refrigerant vapor header 1104 downstream of the second solenoid valve 1105-2 and upstream of an accumulator 1119. Cooling equalizer line 1111 is also connected to scavenger line 1118. A compressor 1122 in the system has a suction inlet 1123 and a discharge outlet 1124. A reversing valve 1120 is connected between outlet line 1124-1 of compressor 1122 and inlet line 1125-1 of accumulator 1119, reversing valve 1120 having two inlets 1120-1,1120-2 and two outlets 1121-1,1121-2. The discharge outlet 1124 to line 1124-1 is connected to the hot gas inlet 1120-1 of the reversing valve 1120. The accumulator 1119 in the system has an inlet 1125 connected to line 1125-1 and an outlet 1126 leading to line 1123-1. The outlet 1126 is connected to the suction inlet 1127 of the compressor 1122 via line 1123-1. The hot gas outlet 1121-1 of the reversing valve 1120 is connected to the inlet 1115 of the air coil 1014 by line 1113. The common suction outlet 1121-2 of the reversing valve 1120 is connected to the inlet 1125 of the accumulator 1119 via line 1125-1. The suction inlet 1120-2 of the reversing valve 1120 is connected to the refrigerant vapor header 1104 downstream of the first solenoid valve 1105-1.

Figure 13:
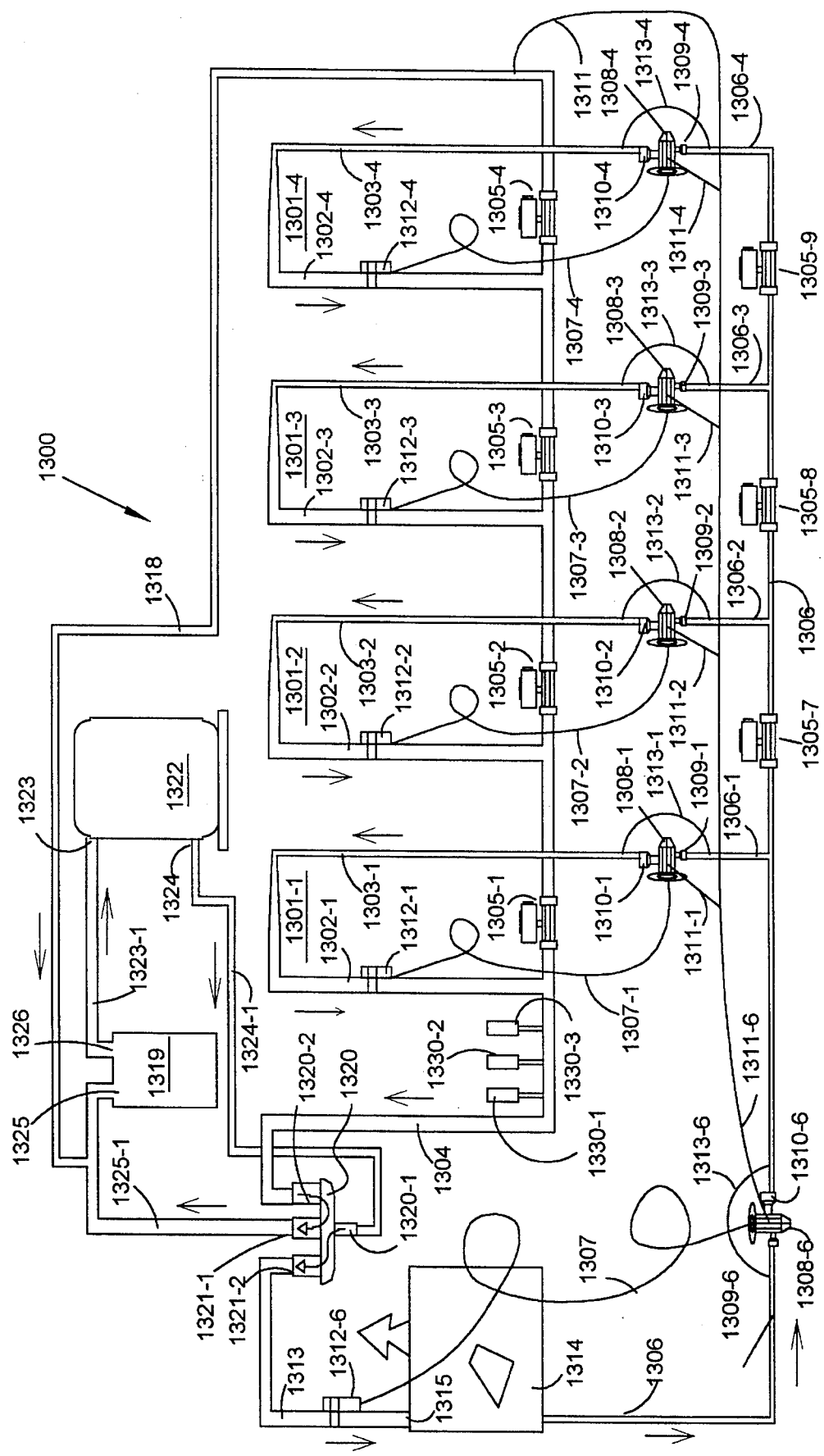
FIG. 13 is a schematic representation of an embodiment of the present invention, i.e., a 4 ton/4 loop system, using individual "TX" valve metering, for staged heating, with all circuits active in the heating mode.
Figure 14:
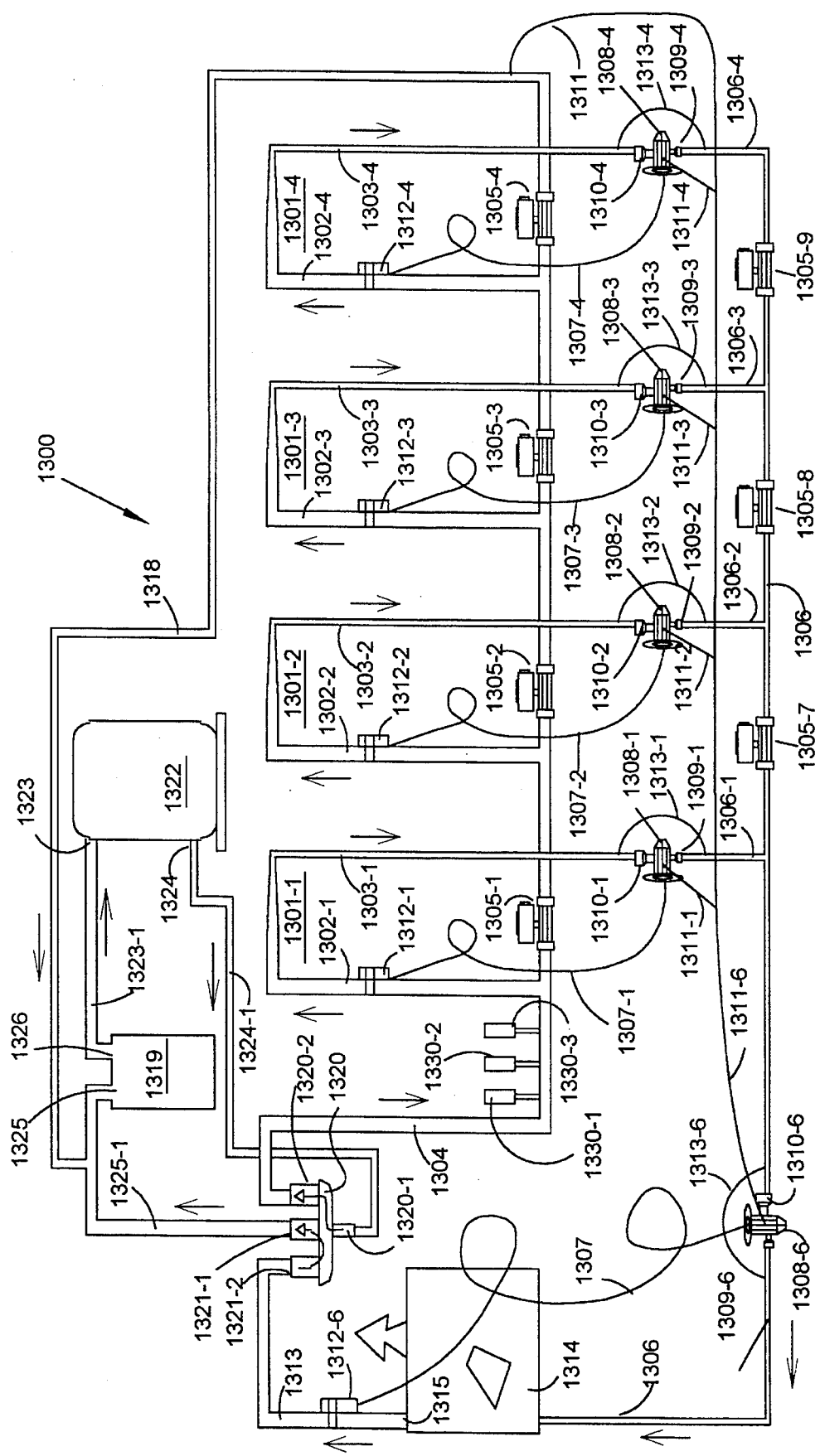
FIG. 14 is a schematic representation of the embodiment of the present invention shown in FIG. 13, i.e., a 4 ton/4 loop system, using individual "TX" valve metering, for staged cooling, in the cooling mode.

Description of FIGS. 13 and 14

FIGS. 13 and 14 show yet another preferred embodiment of the present invention, i.e., a 4ton/4 loop system, which uses individual "TX" valve metering in the heating mode and employs a staged condenser cooling mode, FIG. 13 being the configuration for the heating mode and FIG. 14 being the configuration for the cooling mode.

As seen in FIGS. 13 and 14, the system 1300 includes four ground loops, namely a first loop 1301-1 including a refrigerant vapor suction/hot gas line 1302-1 and a liquid line 1303-1, a second loop 1301-2, a third loop 1301-3 and a fourth loop 1301-4, each such second, third and fourth loop including a suction/hot gas line 1302-2, 1302-3, 1302-4 and a liquid line 1303-2, 1303-3, 1303-4 respectively. Each loop 1301-1, 1301-2, 1301-3, 1301-4 is adapted to be buried underground in heat exchange relationship with the earth. A refrigerant vapor header 1304 is provided with a first pressure sensing device 1330-1 and with a second pressure sensing device 1330-2, and with a third pressure sensing device 1330-3 upstream of solenoid valve 1305-1. In addition, the refrigerant vapor header 1304 is provided with four solenoid valves 1305-1, 1305-2, 1305-3, 1305-4. The refrigerant vapor line 1302-1 of the first loop 1301-1 is connected to the refrigerant vapor header 1304 upstream of the first solenoid valve 1305-1. The refrigerant vapor line 1302-2 of the second loop 1301-2 is connected to the refrigerant vapor header 1304 upstream of the second solenoid valve 1305-2. Similarly, the refrigerant vapor line 1302-3 of the third loop 1301-3 is connected to the refrigerant vapor header 1304 upstream of the third solenoid valve 1305-3, and further similarly, the refrigerant vapor line 1302-4 of the fourth loop 1301-4 is connected to the refrigerant vapor header 1304 upstream of the fourth solenoid valve 1305-4.

The refrigerant liquid line header 1306 is provided with a cooling "TX" valve 1308-6. Cooling "TX" valve 1308-6 has one inlet 1309-6 and one outlet 1310-6, an equalizer line 1311-6 leading from an equalizer port, and a connection 1307-6 to a gas-filled controlling bulb 1312-6. A capillary tube bypass 1313-4 bypasses the inlet 1309-6 and the outlet 1310-6 of the cooling "TX" valve 1308-6.

Four heating "TX" valves, namely, 1308-1, 1308-2, 1308-3, 1308-4 are installed in liquid lines 1306-1, 1306-2, 1306-3, 1306-4, respectively, and provide refrigerant metering in the heating mode, each "TX" valve 1308-1, 1308-2, 1308-3 and 1308-4 having one inlet 1309-1, 1309-2, 1309-3, 1309-4, one outlet 1310-1, 1310-2, 1310-3, 1310-4, a heating equalizer line 1311-1, 1311-2, 1311-3, 1311-4, leading to a respective equalizer port, and a connection 1307-1, 1307-2, 1307-3, 1307-4 to a gas-filled controlling bulb 1312-1, 1312-2, 1312-3, 1312-4 respectively. A capillary tube bypass 1313-1, 1313-2, 1313-3, 1313-4 bypasses lines 1306-1, 1306-2, 1306-3, 1306-4, between the inlet 1309-1, 1309-2, 1309-3, 1309-4, and the outlet 1310-1, 1310-2, 1310-3, 1310-4, of each of the heating "TX" valves 1308-1, 1308-2, 1308-3 and 1308-4, respectively. The inlet 1309-1 of the first heating "TX" valve 1308-1 is connected by liquid line 1306-1 to the refrigerant liquid line header 1306 downstream of the cooling "TX" valve 1308-6. The outlet 1310-1 of that "TX" valve 1308-1 is connected to the liquid line 1303-1 of the first loop 1301-1. The equalizer line 1311-1 from its associated equalization port of that "TX" valve 1308-1 is connected to the equalization port of cooling "TX" valve 1308-6 via line 1311. The controlling bulb 1312-1 connected to that "TX" valve 1308-1 is placed in thermal contact with the refrigerant vapor line 1302-1 of the first loop 1301-1 a short distance from its connection to refrigerant vapor header 1304.

Similarly, the inlet 1309-2 of the second heating "TX" valve 1308-2 is connected by liquid line 1306-2 to the refrigerant liquid line header 1306 downstream of the solenoid valve 1305-7. The outlet 1310-2 of that "TX" valve 1308-2 is connected to the liquid line 1303-2 of the second loop 1301-2. The equalizer line 1311-2 from its associated equalization port of that "TX" valve 1308-2 is connected to the equalization port of cooling "TX" valve 1308-6 via line 1311. The controlling bulb 1312-2 connected to that "TX" valve 1308-2 is placed in thermal contact with the refrigerant vapor line 1302-2 of the second loop 1301-2 a short distance from its connection to refrigerant vapor header 1304.

Also, similarly, the inlet 1309-3 of the third heating "TX" valve 1308-3 is connected by liquid line 1306-3 to the refrigerant liquid line header 1306 downstream of the solenoid valve 1305-8. The outlet 1310-3 of that "TX" valve 1308-3 is connected to the liquid line 1303-3 of the third loop 1301-3. The equalizer line 1311-3 from its associated equalization port of that "TX" valve 1308-3 is connected to the equalization port of cooling "TX" valve 1308-6 via line 1311. The controlling bulb 1312-3 connected to that "TX" valve 1308-3 is placed in thermal contact with the refrigerant vapor line 1302-3 of the third loop 1301-3 a short distance from its connection to refrigerant vapor header 1304.

Still further, similarly, the inlet 1309-4 of the fourth heating "TX" valve 1308-4 is connected by liquid line 1306-4 to the refrigerant liquid line header 1306 downstream of the solenoid valve 1305-9. The outlet 1310-4 of that "TX" valve 1308-4 is connected to the liquid line 1303-4 of the fourth loop 1301-4. The equalizer line 1311-4 from its associated equalization port of that "TX" valve 1308-4 is connected to the equalization port of cooling "TX" valve 1308-6 via line 1311. The controlling bulb 1312-4 connected to that "TX" valve 1308-4 is placed in thermal contact with the refrigerant vapor line 1302-4 of the fourth loop 1301-4 a short distance from its connection to refrigerant vapor header 1304.

Line 1306-2 leading from liquid line 1306 to the liquid line 1303-2 of the second loop 1301-2 is connected to a fifth solenoid valve 1305-7. Similarly, line 1306-3 leading from liquid line 1306 to the liquid line 1303-3 of the third loop 1301-3 is connected to a sixth solenoid valve 1305-8. Finally, similarly, line 1306-4 leading from liquid line 1306 to the liquid line 1303-4 of the fourth loop 1301-4 is connected to a seventh solenoid valve 1305-9.

As seen in FIGS. 13 and 14, and as previously described, cooling "TX" valve 1308-6 provides refrigerant metering in the cooling mode (shown explicitly in FIG. 13). As previously described, cooling "TX" valve 1308-6 has one inlet 1309-5 and one outlet 1310-5, a cooling equalizer line 1311-6 leading to a cooling equalization port and a line 1307-6 connected to a gas-filled controlling bulb 1312-6. All equalizer lines 1311-1, 1311-2, 1311-3, 1311-4, 1311-6 are interconnected by means of cooling equalizer line 1311. The controller bulb 1312-6 connected to the cooling "TX" valve 1308-6 is placed in thermal contact with the refrigerant vapor line 1313 of the refrigerant/air heat exchanger coil 1314 a short distance from the outlet 1315 of the refrigerant/air heat exchanger coil 1314.

A scavenging line 1318 is connected between the refrigerant vapor header 1304 downstream of the fourth solenoid valve 1305-4 and upstream of an accumulator 1319. Cooling equalizer line 1311 is also connected to scavenger line 1318. A compressor 1322 in the system has a suction inlet 1323 and a discharge outlet 1324. A reversing valve 1320 is connected between outlet line 1324-1 of compressor 1322 and inlet line 1325-1 of accumulator 1319, reversing valve 1320 having two inlets 1320-1, 1320-2 and two outlets 1321-1, 1321-2. The discharge outlet 1324 to line 1324-1 is connected to the hot gas inlet 1320-1 of the reversing valve 1320. The accumulator 1319 in the system has an inlet 1325 connected to line 1325-1 and an outlet 1326 leading to line 1323-1. The outlet 1326 is connected to the suction inlet 1323 of the compressor 1322 via line 1323-1. The hot gas outlet 1321-2 of the reversing valve 1320 is connected to the inlet 1315 of the air coil 1314 by line 1313. The common suction outlet 1321-1 of the reversing valve 1320 is connected to the inlet 1325 of the accumulator 1319 via line 1325-1. The suction inlet 1320-2 of the reversing valve 1320 is connected to the refrigerant vapor header 1304 downstream of the first solenoid valve 1305-1.

Figure 15:
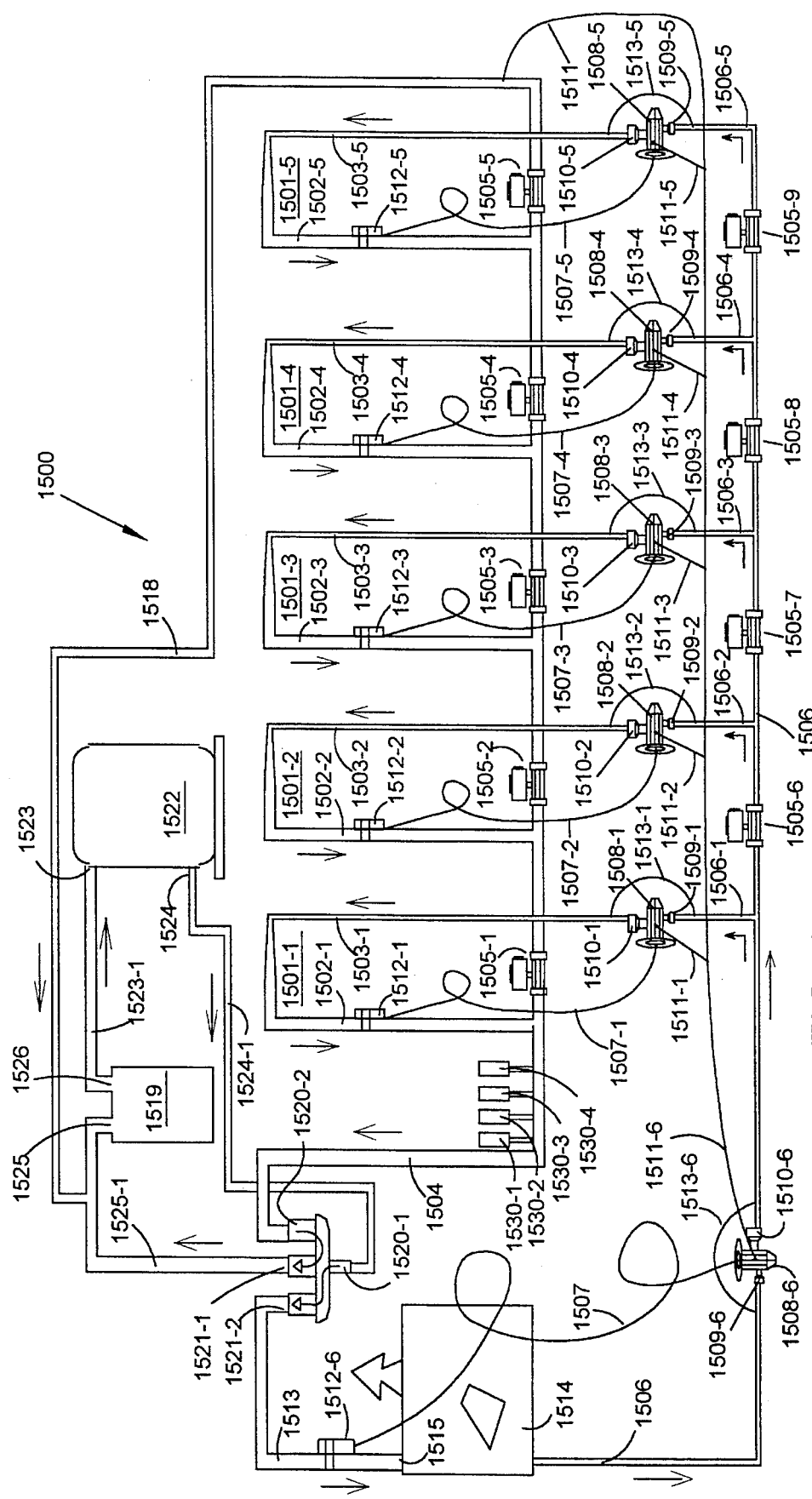
FIG. 15 is a schematic representation of an embodiment of the present invention, i.e., a 5 ton/5 loop system using individual "TX" valve metering for staged heating, with all circuits active in the heating mode.
Figure 16:
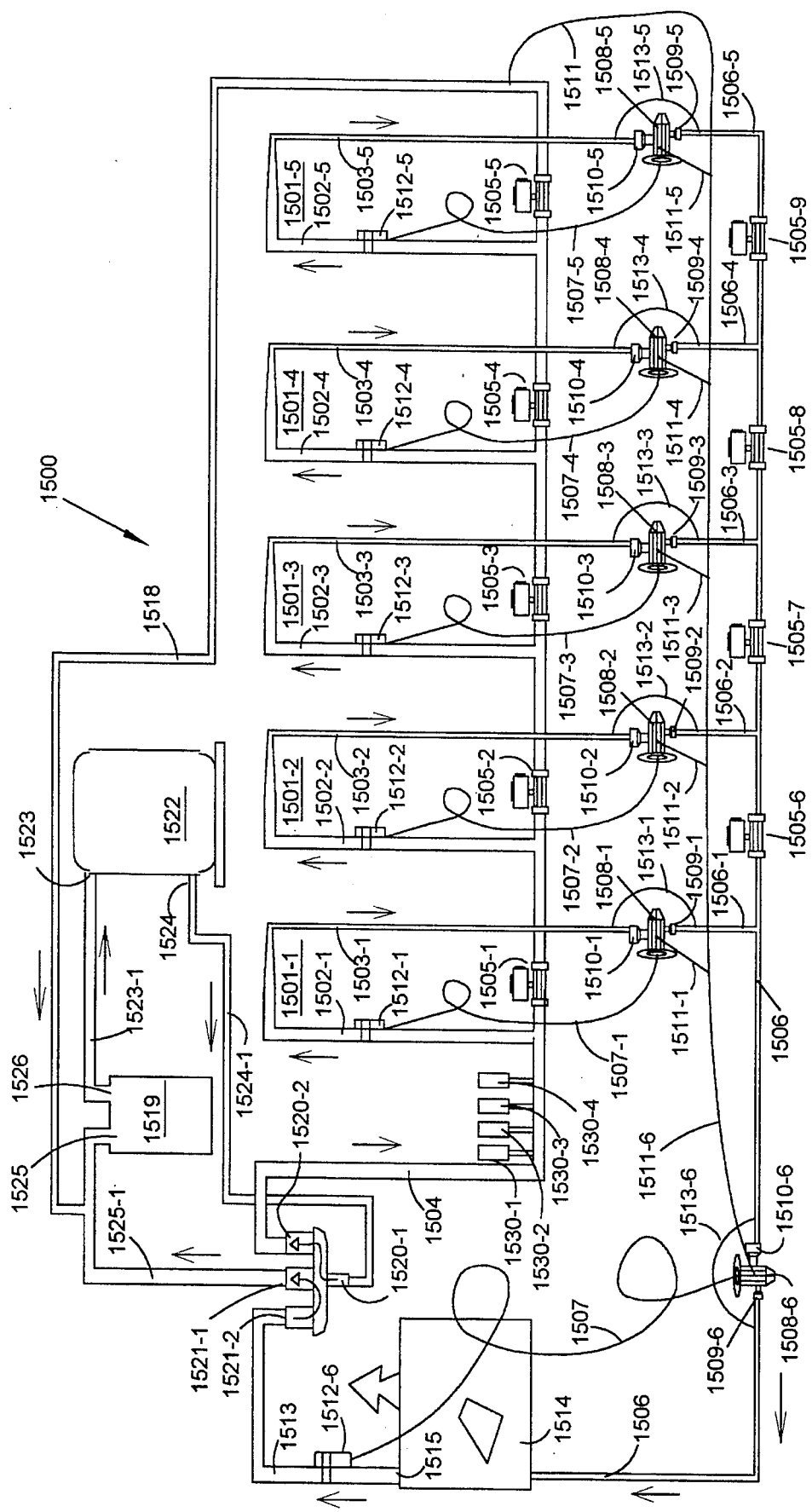
FIG. 16 is a schematic representation of the embodiment of the present invention shown in FIG. 15, i.e., a 5 ton/5 loop system, using individual "TX" valve metering, for staged cooling, in the cooling mode.

Description of FIGS. 15 and 16

FIGS. 15 and 16 show yet another preferred embodiment of the present invention, i.e., 5 ton/5 loop system which used individual "TX" valve metering in the heating mode and employs a staged condenser cooling mode, FIG. 15 being the configuration for the heating mode and FIG. 16 being the configuration for the cooling mode.

As seen in FIGS. 15 and 16, the system 1500 includes five ground loops, namely a first loop 1501-1 including a refrigerant vapor suction/hot gas line 1502-1 and a liquid line 1503-1, as well as a second loop 1501-2, a third loop 1501-3, a fourth loop 1501-4 and a fifth loop 1501-5, each such loop, second, third, fourth and fifth including a suction/hot gas line 1502-2, 1502-3, 1502-4, 1502-5, and a liquid line 1503-2, 1503-3, 1503-4, 1503-5, respectively. Each loop 1501-1, 1501-2, 1501-3, 1501-4, 1501-5 is adapted to be buried underground in heat exchange relationship with the earth. A refrigerant vapor header 1504 is provided with a first pressure sensing device 1530-1 and with second, third and fourth pressure sensing devices 1530-2, 1530-2 and 1530-4, respectively. In addition, the refrigerant vapor header 1504 is provided with five solenoid valves 1505-1, 1505-2, 1505-3, 1505-4, 1505-5. The refrigerant vapor line 1502-1 of the first loop 1501-1 is connected to the refrigerant vapor header 1504 upstream of the first solenoid valve 1505-1. The refrigerant vapor line 1502-2 of the second loop 1501-2 is connected to the refrigerant vapor header 1504 upstream of the second solenoid valve 1505-2. Similarly, the refrigerant vapor line 1502-3 of the third loop 1501-3 is connected to the refrigerant vapor header 1504 upstream of the third solenoid valve 1505-3. Similarly, the refrigerant vapor line 1502-4 of the fourth loop 1501-4 is connected to the refrigerant vapor header 1504 upstream of the fourth solenoid valve 1505-4. Similarly, the refrigerant vapor line 1502-5 of the fifth loop 1501-5 is connected to the refrigerant vapor header 1504 upstream of the fifth solenoid valve 1505-5.

The refrigerant liquid line header 1506 is provided with a cooling "TX" valve 1508-6. Cooling "TX" valve 1508-6 has one inlet 1509-6 and one outlet 1510-6, an equalizer line 1511-6 leading from an equalizer port, and a connection 1507 to a gas-filled controlling bulb 1512-6. A capillary tube bypass 1513-6 bypasses the inlet 1509-6 and the outlet 1510-6 of the cooling "TX" valve 1508-6. Five heating "TX" valves, namely, 1508-1, 1508-2, 1508-3, 1508-4, 1508-5 are installed in liquid lines 1506-1, 1506-2, 1506-3, 1506-4, 1506-5 and provide refrigerant metering in the heating mode, each "TX" valve 1508-1, 1508-2, 1508-3, 1508-4, 1508-5 having one inlet 1509-1, 1509-2, 1509-3, 1509-4, 1509-5, one outlet 1510-1, 1510-2, 1510-3, 1510-4, 1510-5, a heating equalizer line 1511-1, 1511-2, 1511-3, 1511-4, 1511-5, leading to a respective equalizer port, and a connection to a gas-filled controlling bulb 1512-1, 1512-2, 1512-3, 1512-4, 1512-5 respectively. A capillary tube bypass 1513-1, 1513-2, 1513-3, 1513-4, 1513-5 by passes lines 1506-1, 1506-2, 1506-3, 1506-4, 1506-5, between the inlet 1509-1, 1509-2, 1509-3, 1509-4, 1509-5, and the outlet 1510-1, 1510-2, 1510-3, 1510-4, 1510-5, of each of the heating "TX" valves 1508-1, 1508-2, 1508-3, 1508-4, 1508-5.

The inlet 1509-1 of the first heating "TX" valve 1508-1 is connected by liquid line 1506-1 to the refrigerant liquid line header 1506 downstream of the cooling "TX" valve 1508-6. The outlet 1510-1 of that "TX" valve 1508-1 is connected to the liquid line 1503-1 of the first loop 1501-1. The equalizer line 1511-1 from its associated equalization port of that "TX" valve 1508-1 is connected to the equalization port of cooling "TX" valve 1508-6 via line 1511. The controlling bulb 1512-1 connected to that "TX" valve 1508-1 is placed in thermal contact with the refrigerant vapor line 1502-1 of the first loop 1501-1 a short distance from its connection to refrigerant vapor header 1504.

Similarly, the inlet 1509-2 of the second heating "TX" valve 1508-2 is connected by liquid line 1506-2 to the refrigerant liquid line header 1506 downstream of the solenoid valve 1505-6. The outlet 1510-2 of that "TX" valve 1508-2 is connected to the liquid line 1503-2 of the second loop 1501-2. The equalizer line 1511-2 from its associated equalization port of that "TX" valve 1508-2 is connected to the equalization port of cooling "TX" valve 1508-6 via line 1511. The controlling bulb 1512-2 connected to that "TX"

valve 1508-2 is placed in thermal contact with the refrigerant vapor line 1502-2 of the second loop 1501-2 a short distance from its connection to refrigerant vapor header 1504.

Also, similarly, the inlet 1509-3 of the third heating "TX" valve 1508-3 is connected by liquid line 1506-3 to the refrigerant liquid line header 1506 downstream of the solenoid valve 1505-7. The outlet 1510-3 of that "TX" valve 1508-3 is connected to the liquid line 1503-3 of the third loop 1501-3. The equalizer line 1511-3 from its associated equalization port of that "TX" valve 1508-3 is connected to the equalization port of cooling "TX" valve 1508-6 via line 1511. The controlling bulb 1512-3 connected to that "TX" valve 1508-3 is placed in thermal contact with the refrigerant vapor line 1502-3 of the third loop 1501-3 a short distance from its connection to refrigerant vapor header 1504.

Still further, similarly, the inlet 1509-4 of the fourth heating "TX" valve 1508-4 is connected by liquid line 1506-4 to the refrigerant liquid line header 1506 downstream of the solenoid valve 1505-8. The outlet 1510-4 of that "TX" valve 1508-4 is connected to the liquid line 1503-4 of the fourth loop 1501-4. The equalizer line 1511-4 from its associated equalization port of that "TX" valve 1508-4 is connected to the equalization port of cooling "TX" valve 1508-6 via line 1511. The controlling bulb 1512-4 connected to that "TX" valve 1508-4 is placed in thermal contact with the refrigerant vapor line 1502-4 of the fourth loop 1501-4 a short distance from its connection to refrigerant vapor header 1504.

Finally, similarly, the inlet 1509-5 of the fifth heating "TX" valve 1508-5 is connected by liquid line 1506-5 to the refrigerant liquid line header 1506 downstream of the solenoid valve 1505-9. The outlet 1510-5 of that "TX" valve 1508-5 is connected to the liquid line 1503-5 of the fifth loop 1501-5. The equalizer line 1511-5 from its associated equalization port of that "TX" valve 1508-5 is connected to the equalization port of cooling "TX" valve 1508-6 via line 1511. The controlling bulb 1512-5 connected to that "TX" valve 1508-5 is placed in thermal contact with the refrigerant vapor line 1502-4 of the fifth loop 1501-5 a short distance from its connection to refrigerant vapor header 1504.

Line 1506-2 leading from liquid line 1506 to the liquid line 1503-2 of the second loop 1501-2 is connected to a sixth solenoid valve 1505-6. Similarly, line 1506-3 leading from liquid line 1506 to the liquid line 1503-3 of the third loop 1501-3 is connected to a seventh solenoid valve 1505-7. Also, similarly, line 1506-4 leading from liquid line 1506 to the liquid line 1503-4 of the fourth loop 1501-4 is connected to an eighth solenoid valve 1505-8. Finally, similarly, line 1506-5 leading from liquid line 1506 to the liquid line 1503-5 of the fifth loop 1501-b is connected to a ninth solenoid valve 1505-9.

As seen in FIGS. 15 and 16, and as previously described, cooling "TX" valve 1508-6 provides refrigerant metering in the cooling mode (shown explicitly in FIG. 15). As previously described, cooling "TX" valve 1508-6 has one inlet 1509-6 and one outlet 1510-6, a cooling equalizer line 1511-6 leading to a cooling equalization port and a line 1507 connected to a gas-filled controlling bulb 1512-6. All equalizer lines 1511-1, 1511-2, 1511-3, 1511-4, 1511-5 are interconnected by means of cooling equalizer line 1511. The controller bulb 1512-6 connected to the cooling "TX" valve 1508-6 is placed in thermal contact with the refrigerant vapor line 1513 of the refrigerant/air heat exchanger coil 1514 a short distance from the outlet 1515 of the refrigerant/air heat exchanger coil 1514.

A scavenging line 1518 is connected between the refrigerant vapor header 1504 downstream of the third solenoid valve 1505-3 and an accumulator 1519. Cooling equalizer line 1511 is also connected to scavenger line 1518. A compressor 1522 in the system has a suction inlet 1523 and a discharge outlet 1524. A reversing valve 1520 is connected between outlet line 1524-1 of compressor 1522 and inlet line 1525-1 of accumulator 1519, reversing valve 1520 having two inlets 1520-1, 1520-2 and two outlets 1521-1, 1521-2. The discharge outlet 1524 to line 1524-1 is connected to the hot gas inlet 1520-1 of the reversing valve 1520. The accumulator 1519 in the system has an inlet 1525 connected to line 1525-1 and an outlet 1526 leading to line 1523-1. The outlet 1526 is connected to the suction inlet 1523 of the compressor 1522 via line 1523-1. The hot gas outlet 1521-1 of the reversing valve 1520 is connected to the inlet 1515 of the air coil 1514 by line 1513. The common suction outlet 1521-2 of the reversing valve 1520 is connected to the inlet 1525 of the accumulator 1519 via line 1525-1. The suction inlet 1520-2 of the reversing valve 1520 is connected to the refrigerant vapor header 1504 downstream of the first solenoid valve 1505-1.

Operation of the System of FIGS. 3 and 4 in the Heating Mode

In the operation of the system of a first embodiment of the invention provided in the above-identified patent application Ser. No. 08/053,050 filed Apr. 23, 1993, in the heating mode shown in FIGS. 3 and 4, it is seen that there are three (3) circuits, i.e., three loops 13, 14 and 15, operational as an evaporator in the heating mode. During typical operation, each loop 13, 14 and 15 would be approximately 25% full of liquid refrigerant. The conventional ⅝" OD copper tubing used in the exchanger provides sufficient velocity to entrain the oil, whether the loops 13, 14 and 15 are installed vertically or horizontally. As shown in FIG. 4, the solenoid valve 37 is open and allows liquid refrigerant to be metered down all three liquid lines 33-1, 33-2, and 33-3 where it is vaporized by the warm and returns via the three suction lines 31-1, 31-2 and 31-3 and to suction header 28. Check valve 29 is sited after (i.e. upstream) of loop 13 and before (i.e. downstream) of loops 14 and 15 in the main refrigerant vapor header 28. This configuration allows warmed gas from all three lines, 31-1, 31-2, 31-3, to proceed to the accumulator 21 and thence to the compressor 46. Line 41 is a conventional ½" OD copper line which serves no useful purpose in the heating mode as described herein but is absolutely imperative to the system in the cooling mode. Line 41 must be placed upstream of the check valve 28 as shown so that it will be able to evacuate loops 14 and 15 in the cooling mode. The placement of solenoid valve 37 and check valve 28 are technically important so that loop 13 can be separated from loops 14 and 15 during the cooling mode.

Operation of the System of FIGS. 5 and 6 in the Cooling Mode

The operation of the system of a first embodiment of the invention provided in the above-identified patent application Ser. No. 08/053,050 filed Apr. 23, 1993, in the cooling mode as shown in FIG. 5, is such that, during the cooling mode, solenoid valve 37 is closed, preventing liquid refrigerant from entering loops 14 and 15. Check valve 28 insures that hot refrigerant gas enters only the cooling loop 13. Line 41 begins to scavenge any refrigerant in loops 14 and 15 since they are open to the suction side of the compressor 46. The extra refrigerant is quickly pumped to loop 13 which is the only active cooling loop. The extra refrigerant from loops 14 and 15 fills the single condenser loop 13 to such a level as will allow the heat pump to reject its heat to the ground at a head pressure high enough to force the liquid refrigerant back to the single ⅜" O.D. liquid line 33-1 to the expansion valve 36, into the air evaporator 80 and exiting via outlet line 54 back to the accumulator 21 via the reversing valve 48, thus establishing continuity in the process.

Operation of The Second Embodiment of FIG. 7 in the Heating Mode

In the operation of a second embodiment in the heating mode, the liquid line solenoid valve 713 is opened. The bypass check valve 716 around capillary tube 711-1 is maintained closed by high pressure liquid. The "TX" valve 709 is allowed to meter liquid refrigerant to the refrigerant liquid line header 710 controlled by a signal of the controller bulb 720-1. The capillary tubes 711-1, 711-2, 7 11-3 are allowed to restrict the flow slightly so that equal pressure is maintained on the inlet side 712-1, 712-2, 712-3 of each capillary tube 711-1, 711-2, 711-3. Liquid refrigerant is allowed to flow down the liquid lines 703-1, 703-2, 703-3. Vaporized refrigerant is allowed to flow upwardly in each of the suction lines 702-1, 702-2, 702-3 and the refrigerant vapor header 704 through the reversing valve 724 and thence to the accumulator 728 and to the compressor 731. Compressed refrigerant gas is then flowed from the compressor 731 through the reversing valve 724 to the air coil 707. Liquid refrigerant is then withdrawn from the air coil 707 through a liquid line 706 towards the "TX" valve 709 and refrigerant liquid line header 710.

Operation of The Second Embodiment of FIG. 8 in the Cooling Mode

In the operation of a second embodiment of the invention provided in the above-identified patent application Ser. No. 08/053,050 filed Apr. 23, 1993, in the cooling mode, the liquid line solenoid valve 713 is closed. The bypass check valve 716 around capillary tube 711-1 is maintained open by high pressure liquid. Residual liquid refrigerant is evaporated and scavenged from the idle suction lines 702-2, 702-3 by way of scavenger line 918 into the accumulator 728 and thence to the compressor. Compressed refrigerant is passed through the reversing valve 724 and into the hot gas line extension of the refrigerant vapor header 704 which is downstream of the check valve 705 on the refrigerant vapor header 704. The heat pump 11 is allowed to reject its heat to the ground at a pressure which is high enough to force liquid refrigerant up the liquid line 703-1. The liquid refrigerant is allowed to flow through the bypass line 715 and check valve and also through the parallel capillary tube 711-1 of ground loop 701-1 to inlet to the "TX" valve 709. The "TX" valve 709 meters liquid refrigerant to the air coil 707 as per the signal of the controller bulb 720. Warmed refrigerant gas is withdrawn from the air coil 707 into the suction line and through the reversing valve 724 and through the common suction outlet 723 into the accumulator 728 and thence to the suction inlet 732 of the compressor 731.

Operation of The Preferred Embodiment of the Invention of FIG. 9 in the Heating Mode The operation of this embodiment of the present invention in the heating mode, using the described heating mode technique is as follows: All solenoid valves 905-1, 905-2, 905-3, 905-4 and 905-5 are initially allowed to be in their normally open state. The cooling "TX" valve 908-6 is maintained fully open by indirect connection of its equalizer tube to the common suction line 925 upstream of the accumulator 919 and through connection of its controlling bulb 912-4 to the refrigerant vapor connection 913 of the refrigerant/air condenser 914 which is hot in the heating mode. Liquid refrigerant is allowed to flow into the refrigerant liquid line header 906 directly to heating "TX" valve 908-1 and through solenoid valves 905-8 and 905-9 to heating "TX" valves 908-2 and 908-3, respectively. The heating "TX" valves 908-1, 908-2, 908-3 are allowed to meter liquid refrigerant down each of the three loops 901-1, 901-2, 901-3 by way of the signal of the respective controller bulbs 912-1, 912-2, 912-3. Vaporized refrigerant is allowed to flow upwardly in each of the suction lines 902-1, 902-2, 902-3 to the refrigerant vapor header 904, through open solenoid valves 905-1, 905-2, 905-3 as required, through the reversing valve 920 and thence to the accumulator 919 and to the compressor 922. Compressed refrigerant gas is allowed to flow from the compressor 922 through the reversing valve 920 to the refrigerant/air condenser coil 914. Finally, liquid refrigerant is withdrawn from the refrigerant/air condenser coil 914 through refrigerant liquid line header 906.

Operation of The Preferred Embodiment of the Invention of FIG. 10 in the Cooling Mode The operation of this embodiment of the present invention in the cooling mode using the described staged condenser cooling mode technique is in three stages as follows:

In the first stage, initial activation is accomplished by an electric signal from the room thermostat which instructs the "DX" heat pump to be placed in cooling mode. Solenoid valves 905-1 and 905-8 are closed and solenoid valves 905-2, 905-3, 905-9 remain open. Hot refrigerant vapor is allowed to enter only loop 901-1. Heating "TX" valve 908-1 is maintained open by indirect connection of its equalizer tube to the common suction line 925 ahead of the accumulator 919 and by connection of its controller bulb 912-1 to the vapor line 902-1 of loop 901-1 which is hot in the cooling mode. Hot compressed refrigerant is passed from the compressor outlet 924 through line 924-1 and through the reversing valve 920 and into the hot gas line 904 which is upstream of closed solenoid valve 905-1. The heat pump 900 is allowed to reject its heat to the ground at a pressure which is high enough to force liquid refrigerant through the liquid refrigerant line 903-1 and through heating "TX" valve 908-1 and on to the refrigerant liquid line header 906 connected to the inlet port 910-6 of the cooling "TX" valve 908-6. Liquid line solenoid valve 905-8 is closed, thereby preventing liquid refrigerant from entering the two loops 903-2, 903-3 which are downstream of the solenoid valve 905-8. Residual liquid refrigerant is evaporated and scavenged from the liquid refrigerant lines which are downstream of the refrigerant vapor header solenoid valve 905-1, through solenoid valves 905-2, 905-3 via scavenger line 918 to the accumulator 919 and then to the compressor 922. The cooling "TX" valve 908-6 is allowed to meter the correct amount of liquid refrigerant into the air evaporator 914 by indirect connection of its equalizer tube to the common suction line 925-1 ahead of the accumulator 919 and by connection of its controlling bulb 912-6 a short distance from the refrigerant vapor outlet 915. Finally, warmed refrigerant gas is withdrawn from the air evaporator 914 into the suction line 913 and through the reversing valve 920 into the accumulator 919 and thence to the compressor suction inlet 923.

In the second stage, solenoid valve 905-9 is actuated by means of a first pressure sensing device 930-1 placed on the refrigerant vapor header 904 upstream of solenoid valve 905-1. When the pressure reaches a predefined point which is sufficient to override the electric signal sent by the room thermostat and thereby to operate the internal switch of the pressure devices which activates and closes the loop solenoid valves 905-9, 905-2. Solenoid valves 905-1, 905-8 are opened and solenoid valves 903-2, 903-9 are closed. Solenoid valve 905-1 is opened and solenoid valve 905-2 is then closed to allow hot gas to flow to loops 901-1, 901-2. Heating "TX" valves 908-1, 908-2 are maintained open by indirect connection of their respective equalizer tubes to the common suction line 925 upstream of the accumulator 919, and by connection of their respective controller bulbs 912-1, 912-2 to vapor lines 902-1, 902-2 of loops 901-1, 901-2, respectively, which are hot in this second stage cooling mode. Hot compressed refrigerant is passed from the compressor outlet 924 through line 924-1 and through the reversing valve 920 and refrigerant vapor header 904 into the hot gas lines 902-1, 902-2 of loops 901-1, 901-2 which are upstream of closed solenoid valve 905-2. The heat pump 900 is allowed to reject its heat to the ground at a pressure which is high enough to force liquid refrigerant through the liquid refrigerant lines 903-1, 903-2 of loops 901-1, 901-2, through heating "TX" valves 908-1, 908-2 and into the refrigerant liquid line header 906 which is connected to the inlet port 910-6 of the cooling "TX" valve 908-6. Liquid line solenoid valve 905-9 is closed, thereby preventing liquid refrigerant from entering loop 901-3 which is downstream of the solenoid valve 905-9. Residual liquid refrigerant is evaporated and scavenged from the liquid refrigerant lines which are downstream of the refrigerant vapor header solenoid valve 905-2, through solenoid valve 905-3 via scavenger line 918 to the accumulator 919 and then to the compressor 922. The cooling "TX" valve 908-6 is allowed to meter the correct amount of liquid refrigerant into the air evaporator 914 by virtue of the indirect connection of its equalizer tube to the common suction line 925-1 which is upstream of the accumulator 919 and by connection of its controlling bulb 912-6 a short distance from the refrigerant vapor outlet 915. Finally, warmed refrigerant gas is withdrawn from the air evaporator 914 into the suction line 913 and through the reversing valve 920 into the accumulator 919 and thence to the suction inlet 723 of the compressor 922.

In the third stage, all solenoid valves 905-1, 905-2, 905-3, 905-4, 905-5 and individual loop connections 901-1, 901-2, 901-3 to the header 904 are actuated by a second pressure sensing device 930-2 placed on the refrigerant vapor header 904 upstream thereof, until the pressure reaches a predefined point sufficient to override the electric signal sent by the room thermostat and by the first pressure sensing device 930-1, and thereby to operate the internal switch of the pressure devices which activates the loop solenoid valves by allowing solenoid valves 905-1, 905-2, 905-8, 905-9 to be open while closing solenoid valve 905-3. Solenoid valves 905-1, 905-2 are open to allow hot gas to flow to loops 901-1, 901-2, 901-3. Heating "TX" valves 908-1, 908-2, 908-3 are maintained open by indirect connection of their respective equalizer tubes to the common suction line 925-1 ahead of the accumulator 919, and by connection of their respective controller bulbs to the vapor lines 902-1, 902-2, 902-3 of loops 901-1, 901-2, 901-3 respectively which are hot in the third stage cooling mode. Hot compressed refrigerant is then passed from the compressor outlet 924 through line 924-1 and through the reversing valve 920 and refrigerant vapor header 904 into the hot gas lines which are upstream of closed solenoid valve 905-3. The heat pump 900 is allowed to reject its heat to the ground at a pressure which is high enough to force liquid refrigerant through the liquid refrigerant lines 903-1, 903-2 and 903-3, through heating "TX" valves 908-1, 908-2, 908-3 and through open solenoids valves 905-8, 905-9 and into to the refrigerant liquid line header 906 which is connected to the inlet port 910-6 of the cooling "TX" valve 908-6. The cooling "TX" valve 908-6 is allowed to meter the correct amount of liquid refrigerant into the air evaporator 914 by indirect connection of its equalizer tube to the common suction line 925-1 ahead of the accumulator 919 and by connection of its controlling bulb 912-6 a short distance from the refrigerant vapor outlet 915. Finally, warmed refrigerant gas is withdrawn from the air evaporator 914 into the suction line 913 and through the reversing valve 920 into the accumulator 919 and thence to the compressor suction inlet 923.

Operation of the Preferred Embodiment of the Invention of FIG. 11 in the Heating Mode In the heating mode, using the described heating mode technique is as follows: All solenoid valves 1105-1, 1105-2, 1105-9 are initially allowed to be in their normally open state and all circuits are active. The cooling "TX" valve 1108-6 is maintained fully open by indirect connection of its equalizer tube to the common suction line 1125-1 upstream of the accumulator 1119 and through connection of its controlling bulb 1112-6 to the refrigerant vapor line 1113 of the refrigerant/air condenser 1114 which is hot in the heating mode. Liquid refrigerant is allowed to flow into the refrigerant liquid line header 1106 directly to heating "TX" valve 1108-6 and through solenoid valve 1105-9 to heating "TX" valve 1108-2. The heating "TX" valves 1108-1, 1108-2 are allowed to meter liquid refrigerant down each of the two loops 1101-1, 1101-2 by way of the signal of the respective controller bulbs 1112-1, 1112-2. Vaporized refrigerant is allowed to flow upwardly in each of the suction lines 1102-1, 1102-2 to the refrigerant vapor header 1104, through open solenoid valves 1105-1, 1105-2, through the reversing valve 1120 and thence to the accumulator 1119 and to the compressor 1122. Compressed refrigerant gas is allowed to flow from the compressor 1122 through the reversing valve 1120 to the refrigerant/air condenser coil 1114. Finally, liquid refrigerant is withdrawn from the refrigerant/air condenser coil 1114 through refrigerant liquid line header 1106.

Operation of the Preferred Embodiment of the Invention of FIG. 12 in the Cooling Mode The cooling mode using the described staged condenser cooling mode technique in this embodiment of the invention is in two stages as follows:

In the first stage, initial activation is accomplished by an electric signal from the room thermostat which instructs the "DX" heat pump to be placed in cooling mode. Solenoid valves 1105-1, 1105-9 are closed and solenoid valve 1105-2 is opened. Since solenoid valve 1105-1 is closed, hot refrigerant vapor is allowed to enter only loop 1101-1. Heating "TX" valve 1108-1 is maintained open by indirect connection of its equalizer tube to the common suction line 1125-1 ahead of the accumulator 1119, and by connection of its controller bulb 1112-1 to the vapor line 1102-1 of first loop 1101-1 which is hot in the cooling mode. Hot compressed refrigerant is passed from the compressor outlet 1124 through the reversing valve 1120 and into the hot gas header 1104 which is downstream of closed solenoid valve 1105-1. The heat pump 1100 is allowed to reject its heat to the ground at a pressure which is high enough to force liquid refrigerant through the liquid refrigerant line 1103-1 and through heating "TX" valve 1108-1 into the refrigerant liquid line header 1106 connected to the inlet port 1110-6 of the cooling "TX" valve 1108-6. Liquid line solenoid valve 1105-9 is closed, thereby preventing liquid refrigerant from entering loop 1101-2 which is downstream of the solenoid valve 1105-9. Residual liquid refrigerant is evaporated and scavenged from the liquid refrigerant line which is downstream of the refrigerant vapor header solenoid valve 1105-1, through solenoid valve 1105-2 via scavenger line 1118 to the accumulator 1119 and then to the compressor 1122. The cooling "TX" valve 1108-6 is allowed to meter the correct amount of liquid refrigerant into the air evaporator 1114 by indirect connection of its equalizer tube to the common suction line 1125 ahead of the accumulator 1119, and by connection of its controlling bulb 1112-6 a short distance from the refrigerant vapor outlet 1115. Finally, warmed refrigerant gas is withdrawn from the air evaporator 1114 into the suction line 1113 and through the reversing valve 1120 into the accumulator 1119 and thence to the suction inlet 1127 of the compressor 1122.

In the second stage, solenoid valves 1105-1, 1105-2, 1105-9 and individual loop connections 1101-1, 1101-2 to the header 1104 are actuated by pressure sensing device 1130-1 placed on the refrigerant vapor header 1104, until the pressure reaches a predefined point sufficient to override the electric signal sent by the room thermostat and thereby to operate the internal switch of the pressure devices which activates the loop solenoid valves by allowing solenoid valves 1105-1, 1105-9 to be open while closing solenoid valve 1105-2. Solenoid valve 1105-1 is open to allow hot gas to flow to loops 1101-1, 1101-2. Heating "TX" valves 1108-1, 1108-2 are maintained open by indirect connection of their respective equalizer tubes to the common suction line 1125-1 ahead of the accumulator 1119, and by connection of their respective controller bulbs to the vapor lines 1102-1, 1102-2 of loops 1101-1, 1101-2 which are hot in this cooling mode. Hot compressed refrigerant is then passed from the compressor outlet 1125 through the reversing valve 1120 and refrigerant vapor header 1104 into the hot gas lines which are upstream of closed solenoid valve 1105-2. The heat pump 1100 is allowed to reject its heat to the ground at a pressure which is high enough to force liquid refrigerant through the liquid refrigerant lines 1103-1, 1103-2, through heating "TX" valves 1108-1, 1108-3 and through open solenoid valve 1105-2, and on to the refrigerant liquid line header 1106 which is connected to the inlet port 1110-4 of the cooling "TX" valve 1108-6. The cooling "TX" valve 1108-6 is allowed to meter the correct amount of liquid refrigerant into the air evaporator 1114 by indirect connection of its equalizer tube 1107 to the common suction line 1125-1 ahead of the accumulator 1119 and by connection of its controlling bulb 1112-6 a short distance from the refrigerant vapor outlet 1115. Finally, warmed refrigerant gas is withdrawn from the air evaporator 1114 into the suction line 1113 and through the reversing valve 1120 into the accumulator 1119 and thence to the suction inlet 1127 of the compressor 1122.

Operation of the Preferred Embodiment of the Invention of FIG. 13 in the Heating Mode The heating mode using the described heating mode technique of this embodiment of the invention is as follows:

All solenoid valves 1305-1, 1305-2, 1305-3, 1305-4, 1305-7, 1305-8, 1305-9 are initially allowed to be in their normally open state, and all circuits are active. The cooling "TX" valve 1308-6 is maintained fully open by indirect connection of its equalizer tube to the common suction line 1325-1 upstream of the accumulator 1319 and through connection of its controlling bulb 1312-6 to the refrigerant vapor connection 1313 of the refrigerant/air condenser 1314 which is hot in the heating mode. Liquid refrigerant is allowed to flow into the refrigerant liquid line header 1306 directly to heating "TX" valve 1308-1 and through solenoid valves 1305-7, 1305-8, 1305-9 to heating "TX" valves 1308-2, 1308-3, 1308-4, respectively. The heating "TX" valves 1308-1, 1308-2, 1308-3, 1308-4 are allowed to meter liquid refrigerant down each of the four loops 1303-1, 1303-2, 1303-3, 1303-4 by way of the signal of the respective controller bulbs 1312-1, 1312-2, 1312-3, 1312-4. Vaporized refrigerant is allowed to flow upwardly in each of the suction lines 1302-1, 1302-2, 1302-3, 1302-4 to the refrigerant vapor header 1304, through open solenoid valves 1305-1, 1305-2, 1305-3, 1305-4, through the reversing valve 1320 and thence to the accumulator 1319 and to the compressor 1322. Compressed refrigerant gas is allowed to flow from the compressor 1322 through the reversing valve 1320 to the refrigerant/air condenser coil 1314. Finally, liquid refrigerant is withdrawn from the refrigerant/air condenser coil 1314 through refrigerant liquid line header 1306.

Operation of the Preferred Embodiment of the Invention of FIG. 14 in the Cooling Mode The cooling mode using the described staged condenser cooling mode technique of this embodiment of the invention is in four stages as follows:

In the first stage, initial activation is accomplished by an electric signal from the room thermostat which instructs the "DX" heat pump to be placed in cooling mode. Solenoid valves 1305-1, 1305-7 are closed and solenoid valves 1305-2, 1305-3, 1305-4, 1305-8, 1305-9 are opened. Since solenoid valve 1305-1 is closed, hot refrigerant vapor is allowed to enter only first loop 1301-1. Heating "TX" valve 1308-1 is maintained open by indirect connection of its equalizer tube to the common suction line 1325-1 ahead of the accumulator 1319, and by connection of its controller bulb 1312-1 to the vapor line 1302-1 of loop 1301-1 which is hot in the cooling mode. Hot compressed refrigerant is passed from the compressor outlet 1324 through the reversing valve 1320 and into the hot gas line 1304 which is upstream of closed solenoid valve 1305-1. The heat pump 1300 is allowed to reject its heat to the ground at a pressure which is high enough to force liquid refrigerant through the liquid refrigerant line 1303-1 and through heating "TX" valve 1308-1 and into the refrigerant liquid line header 1306 connected to the inlet port 1310-6 of the cooling "TX" valve 1308-6. Liquid line solenoid valves 1305-1, 1305-7 are closed, thereby preventing liquid refrigerant from entering the three loops 1303-2, 1303-3, 1303-4 which are downstream of such solenoid valves. Residual liquid refrigerant is evaporated and scavenged from the liquid refrigerant lines which are downstream of the refrigerant vapor header solenoid valve 1305-1, through solenoid valves 1305-2, 1305-3, 1305-4 via scavenger line 1318 to the accumulator 1319 and then to the compressor 1322. The cooling "TX" valve 1308-6 is allowed to meter the correct amount of liquid refrigerant into the air evaporator 1314 by indirect connection of its equalizer tube to the common suction line 1325-1 ahead of the accumulator 1319 and by connection of its controlling bulb 1312-6 a short distance from the refrigerant vapor outlet 1315. Finally, warmed refrigerant gas is withdrawn from the air evaporator 1314 into the suction line 1313 and through the reversing valve 1320 into the accumulator 1319 and thence to the suction inlet 1323 of compressor 1322.

In the second stage, all solenoid valves 1305-1, 1305-2, 1305-3, 1305-4, 1305-5, 1305-7, 1305-8, 1305-9 and individual loop connections 1301-1, 1301-2, 1301-3, 1301-4 to the header 1304 are controlled by means of a first pressure sensing device 1330-1 placed on the refrigerant vapor header 1304 upstream of solenoid valve 1305-1 until the pressure reaches a predefined point which is sufficient to override the electric signal sent by the room thermostat and thereby to operate the internal switch of the pressure devices which activates the loop solenoid valves 1305-2, 1305-8. Solenoid valves 1305-1, 1305-3, 1305-4, 1305-7, 1305-9 are opened and solenoid valves 1303-2, 1303-8 are closed. Solenoid valve 1305-1 is opened and solenoid valve 1305-2 is closed to allow hot gas to flow to loops 1301-1, 1301-2. Heating "TX" valves 1308-1, 1308-2 are maintained open by indirect connection of their respective equalizer tubes to the common suction line 1325-1 upstream of the accumulator 1319, and by connection of their respective controller bulbs 1312-1, 1312-2 to vapor lines 1302-1, 1302-2 of loops 1301-1, 1301-2, respectively, which are hot in this cooling mode. Hot compressed refrigerant is passed from the compressor outlet 1324 through the reversing valve 1320 and refrigerant vapor header 1304 into the hot gas lines 1302-1, 1302-2 which are upstream of closed solenoid valve 1305-2. The heat pump 1300 is allowed to reject its heat to the ground at a pressure which is high enough to force liquid refrigerant through the liquid refrigerant lines 1303-1, 1303-2 through heating "TX" valves 1308-1, 1308-2 and into the refrigerant liquid line header 1306 which is connected to the inlet port 1310-6 of the cooling "TX" valve 1308-6. Liquid line solenoid valve 1305-8 is closed, thereby preventing liquid refrigerant from entering loops 1301-3, 1301-4 which are downstream of the solenoid valve 1305-8. Residual liquid refrigerant is evaporated and scavenged from the liquid refrigerant lines which are downstream of the refrigerant vapor header solenoid valve 1305-2, through solenoid valves 1305-3, 1305-4, via scavenger line 1318 to the accumulator 1319 and then to the compressor 1322. The cooling "TX" valve 1308-6 is allowed to meter the correct amount of liquid refrigerant into the air evaporator 1314 by virtue of the indirect connection of its equalizer tube to the common suction line 1325-1 which is upstream of the accumulator 1319, and by connection of its controlling bulb 1312-6 a short distance from the refrigerant vapor outlet 1315. Finally, warmed refrigerant gas is withdrawn from the air evaporator into the suction line 1313 and through the reversing valve 1320 into the accumulator 1319 and thence to the suction inlet 1323 of compressor 1322.

In the third stage, all solenoid valves 1305-1, 1305-2, 1305-3, 1305-4, 1305-5, 1305-7, 1305-8, 1305-9 and individual loop connections 1301-1, 1301-2, 1301-3, 1301-4 to the header 1304 are controlled by a second pressure sensing device 1330-2 placed in the refrigerant vapor header 1304, until the pressure reaches a predefined point sufficient to override the electric signal sent by the room thermostat and by the first pressure sensing device 1330-1, and thereby to operate the internal switch of the pressure devices which activates the loop solenoid valves by allowing solenoid valves 1305-1, 1305-2, 1305-4, 1305-5, 1305-7, 1305-8 to be open while closing solenoid valves 1305-3, 1305-9. Solenoid valves 1305-1, 1305-2, are open to allow hot gas to flow to loops 1301-1, 1301-2, 1301-3. Heating "TX" valves 1308-1, 1308-2, 1308-3 are maintained open by indirect connection of their respective equalizer tubes to the common suction line 1325-1 ahead of the accumulator 1319, and by connection of their respective controller bulbs 1312-1, 1312-2, 1312-3 to the vapor lines 1302-1, 1302-2, 1302-3 of loops 1301-1, 1301-2, 1301-3 which are hot in this cooling mode. Hot compressed refrigerant is then passed from the compressor outlet 1324 through the reversing valve 1320 and refrigerant vapor header 1304 into the hot gas lines which are upstream of closed solenoid valve 1305-3. The heat pump 1300 is allowed to reject its heat to the ground at a pressure which is high enough to force liquid refrigerant through the liquid refrigerant lines 1303-1, 1303-2, 1303-3, through heating "TX" valves 1308-1, 1308-2, 1308-3, and through open solenoid valves 1305-7, 1305-8 and on to the refrigerant liquid line header 1306 which is connected to the inlet port 1310-6 of the cooling "TX" valve 1308-6. Residual liquid refrigerant is evaporated and scavenged from the liquid refrigerant lines which are downstream of the refrigerant vapor header solenoid valve 1305-3, through solenoid valve 1305-4 via scavenger line 1318 to the accumulator 1319 and then to the compressor 1322. The cooling "TX" valve 1308-6 is allowed to meter the correct amount of liquid refrigerant into the air evaporator 1314 by indirect connection of its equalizer tube to the common suction line 1325-1 ahead of the accumulator 1319 and by connection of its controlling bulb 1312-6 a short distance from the refrigerant vapor outlet 1315. Finally, warmed refrigerant gas is withdrawn from the air evaporator 1314 into the suction line 1313 and through the reversing valve 1320 into the accumulator 1319 and thence to the suction inlet 1323 of compressor 1324.

In the fourth stage, all solenoid valves 1305-1, 1305-2, 1305-3, 1305-4, 1305-5, 1305-7, 1305-8, 1305-9 and individual loop connections 1301-1, 1301-2, 1301-3, 1301-4 to the header 1304 are controlled by a third pressure sensing device 1330-3 placed in the refrigerant vapor header 1304, until the pressure reaches a predefined point sufficient to override the electric signal sent by the room thermostat and by the first and second pressure sensing devices 1330-1, 1330-2 and thereby to operate the internal switch of the pressure devices which activates the loop solenoid valves by allowing solenoid valves 1305-1, 1305-2, 1305-3, 1305-7, 1305-8, 1305-9 to be open while closing solenoid valve 1305-4. Solenoid valves 1305-1, 1305-2, 1305-3 are open to allow hot gas to flow to loops 1301-1, 1301-2, 1301-3, 1301-4. Heating "TX" valves 1305-1, 1305-2, 1305-3, 1305-4 are maintained open by indirect connection of their respective equalizer tubes to the common suction line 1325-1 ahead of the accumulator 1319, and by connection of their respective controller bulbs 1312-1, 1312-2, 1312-3, 1312-4, to the vapor lines 1302-1, 1302-2, 1302-3, 1302-4 of loops 1301-1, 1301-2, 1301-3, 1301-4 which are hot in this cooling mode. Hot compressed refrigerant is then passed from the compressor outlet 1324 through the reversing valve 1320 and refrigerant vapor header 1304 into the hot gas lines which are upstream of closed solenoid valve 1305-4. The heat pump 1300 is allowed to reject its heat to the ground at a pressure which is high enough to force liquid refrigerant through the liquid refrigerant lines 1303-1, 1303-2, 1303-3, 1303-4, through heating "TX" valves 1308-1, 1308-2, 1308-3, 1308-4 and through open solenoid valves 1305-7, 1305-8, 1305-9 and into the refrigerant liquid line header 1306 which is connected to the inlet port 1310-6 of the cooling "TX" valve 1308-6. The cooling "TX" valve 1308-6 is allowed to meter the correct amount of liquid refrigerant into the air evaporator 1314 by indirect connection of its equalizer tube to the common suction line 1325-1 ahead of the accumulator 1319, and by connection of its controlling bulb 1312-6 a short distance from the refrigerant vapor outlet 1315. Finally, warmed refrigerant gas is withdrawn from the air evaporator 1314 into the suction line 1313 and through the reversing valve 1320 into the accumulator 1319 and thence to the suction inlet 1323 of the compressor 1322.

Operation of the Preferred Embodiment of the
Invention of FIG. 15 in the Heating Mode The heating mode using the described heating mode technique of this embodiment of the invention is as follows: All solenoid valves 1505-1, 1505-2, 1505-3, 1505-4, 1505-5, 1505-6, 1505-7, 1505-8, 1505-9 are initially allowed to be in their normally open state and all circuits are active. The cooling "TX" valve 1508-6 is maintained fully open by indirect connection of its equalizer tube to the common suction line 1525-1 upstream of the accumulator 1519, and through connection of its controlling bulb 1512-6 to the refrigerant vapor connection 1513 of the refrigerant/air condenser 1514 which is hot in the heating mode. Liquid refrigerant is allowed to flow into the refrigerant liquid line header 1506 directly to heating "TX" valve 1508-1 and through solenoid valves 1505-6, 1505-7, 1505-8, 1505-9 to heating "TX" valves 1508-2, 1508-3, 1508-4, 1508-5 respectively. The heating "TX" valves 1508-1, 1508-2, 1508-3, 1508-4, 1508-5 are allowed to meter liquid refrigerant down each of the five loops 1501-1, 1501-2, 1501-3, 1501-4, 1501-5 by way of the signal of the respective controller bulbs 1512-1, 1512-2, 1512-3, 1512-4, 1512-5. Vaporized refrigerant is allowed to flow upwardly in each of the suction lines 1502-1, 1502-2, 1502-3, 1502-4, 1502-5 to the refrigerant vapor header 1504, through open solenoid valves 1505-1, 1505-2, 1505-3, 1505-4, 1505-5 through the reversing valve 1520 and thence to the accumulator 1519 and to the compressor 1522. Compressed refrigerant gas is allowed to flow from the compressor 1522 through the reversing valve 1520 to the refrigerant/air condenser coil 1514. Finally, liquid refrigerant is withdrawn from the refrigerant/air condenser coil 1514 through refrigerant liquid line header 1506.

Operation of the Preferred Embodiments of the
Invention of FIG. 16 in the Cooling Mode The cooling mode using the described staged condenser cooling mode technique of this embodiment of the invention is in five stages as follows:

In the first stage, initial activation is accomplished by an electric signal from the room thermostat which instructs the "DX" heat pump to be placed in cooling mode. Solenoid valves 1505-1, 1505-6 are closed while solenoid valves 1505-2, 1505-3, 1505-4, 1505-5, 1505-7, 1505-8, 1505-9 are opened. Since solenoid valve 1505-1 is closed, hot refrigerant vapor is allowed to enter only first loop 1501-1. Heating "TX" valve 1508-1 is maintained open by indirect connection of its equalizer tube to the common suction line 1525-1 ahead of the accumulator 1519, and by connection of its controller bulb 1512-1 to the vapor line 1502-1 of first loop 1501-1 which is hot in the cooling mode. Hot compressed refrigerant is passed from the compressor outlet 1524 through the reversing valve 1520 and into the hot gas line 1504 which is upstream of closed solenoid valve 1505-1. The heat pump 1500 is allowed to reject its heat to the ground at a pressure which is high enough to force liquid refrigerant through the liquid refrigerant line 1503-1, and through heating "TX" valve 1508-1 and into the refrigerant liquid line header 1510-6 connected to the inlet port 1509-6 of the cooling "TX" valve 1508-6. Liquid line solenoid valve 1505-6 is closed, thereby preventing liquid refrigerant from entering loops 1501-1, 1501-3, 1501-4, 1501-5 which are downstream of the solenoid valve 1505-6. Residual liquid refrigerant is evaporated and scavenged from the liquid refrigerant lines which are downstream of the refrigerant vapor header solenoid valve 1505-1, through solenoid valves 1505-2, 1505-3, 1505-4, 1505-5 via scavenger line 1518 to the accumulator 1519, and then to the compressor 1522. The cooling "TX" valve 1508-6 is allowed to meter the correct amount of liquid refrigerant into the air evaporator 1514 by indirect connection of its equalizer tube to the common suction line 1525-1 ahead of the accumulator 1519 and by connection of its controlling bulb 1512-6 a short distance from the refrigerant vapor outlet 1513. Finally, warmed refrigerant gas is withdrawn from the air evaporator 1514 into the suction line 1515 and through the reversing valve 1520 into the accumulator 1519 and thence to the suction inlet 1523 of the compressor 1522.

In the second stage, all solenoid valves 1505-1, 1505-2, 1505-3, 1505-4, 1505-5, 1505-6, 1505-7, 1505-8, 1505-9 and individual loop connections 1501-1, 1501-2, 1501-3, 1501-4, 1501-5 to the header 1504 are controlled by means of a first pressure sensing device 1530-1 placed in the refrigerant vapor header 1504 upstream of solenoid valve 1505-1 until the pressure reaches a predefined point which is sufficient to override the electric signal sent by the room thermostat and thereby to operate the internal switch of the pressure devices which activates the loop solenoid valves 1505-6. Solenoid valves 1505-1, 1505-3, 1505-4, 1505-5, 1505-6, 1505-8, 1505-9 are open and solenoid valves 1505-2, 1505-7 are closed. Solenoid valve 1505-1 is open and solenoid valve 1505-2 is closed to allow hot gas to flow to loops 1501-1, 1501-2. Heating "TX" valves 1508-1, 1508-2 are maintained open by indirect connection of their respective equalizer tubes to the common suction line 1525-1 upstream of the accumulator 1519, and by connection of their respective controller bulbs 1512-1, 1512-2 to vapor lines 1502-1, 1502-2 of loops 1501-1, 1501-2, respectively, which are hot in this cooling mode. Hot compressed refrigerant is passed from the compressor outlet 1524 through the reversing valve 1520 and refrigerant vapor header 1504 into the hot gas lines 1502-1, 1502-2 which are upstream of closed solenoid valve 1505-2. The heat pump 1500 is allowed to reject its heat to the ground at a pressure which is high enough to force liquid refrigerant through the liquid refrigerant lines 1503-1, 1503-2, through heating "TX" valves 1508-1, 1508-2 and into the refrigerant liquid line header 1506 which is connected to the inlet port 1510-6 of the cooling "TX" valve 1508-6. Liquid line solenoid valve 1505-7 is closed, thereby preventing liquid refrigerant from entering loops 1501-3, 1501-4, 1501-5 which are downstream of the solenoid valve 1505-7. Residual liquid refrigerant is evaporated and scavenged from the liquid refrigerant lines which are downstream of the refrigerant vapor header solenoid valve 1505-2, through solenoid valves 1505-3, 1505-4, 1505-5 via scavenger line 1518 to the accumulator 1519 and then to the compressor 1522. The cooling "TX" valve 1508-6 is allowed to meter the correct amount of liquid refrigerant into the air evaporator 1514 by virtue of the indirect connection of its equalizer tube to the common suction line 1525-1 which is upstream of the accumulator 1519, and by connection of its controlling bulb 1512-6 a short distance from the refrigerant vapor outlet 1515.

Finally, warmed refrigerant gas is withdrawn from the air evaporator 1514 into the suction line 1513 and through the reversing valve 1520 into the accumulator 1519 and thence to the suction inlet 1523 of the compressor 1522.

In the third stage, all solenoid valves 1505-1, 1505-2, 1505-3, 1505-4, 1505-5, 1505-6, 1505-7, 1505-8, 1505-9 and individual loop connections 1501-1, 1501-2, 1501-3, 1501-4, 1501-5 to the header 1504 are controlled by a second pressure sensing device 1530-2 placed in the refrigerant vapor header 1504, until the pressure reaches a predefined point sufficient to override the electric signal sent by the room thermostat and by the first pressure sensing device 1530-1 and thereby to operate the internal switch of the pressure devices which activates the loop solenoid valves by allowing solenoid valves 1505-1, 1505-2, 1505-4, 1505-5, 1505-6, 1505-7, 1505-9 to be open while closing solenoid valves 1505-3, 1505-8. Solenoid valves 1505-1, 1505-2 are open to allow hot gas to flow to loops 1501-1, 1501-2, 1501-3. Heating "TX" valves 1505-1, 1505-2, 1505-3 are maintained open by indirect connection of their respective equalizer tubes to the common suction line 1525-1 ahead of the accumulator 1519 and by connection of their respective controller bulbs 1512-1, 1512-2, 1512-3 to the vapor lines 1502-1, 1502-2, 1502-3 of loops 1501-1, 1501-2, 1501-3, which are hot in this cooling mode. Hot compressed refrigerant is then passed from the compressor outlet 1525 through the reversing valve 1520 and refrigerant vapor header 1504 into the hot gas lines which are upstream of closed solenoid valve 1505-3. The heat pump 1500 is allowed to reject its heat to the ground at a pressure which is high enough to force liquid refrigerant through the liquid refrigerant lines 1503-1, 1503-2, 1503-3, through heating "TX" valves 1508-1, 1508-2, 1508-3, and through open solenoids valves 1505-6, 1505-7 and into the refrigerant liquid line header 1506 which is connected to the inlet port 1510-6 of the cooling "TX" valve 1508-6. Residual liquid refrigerant is evaporated and scavenged from the liquid refrigerant lines which are downstream of the refrigerant vapor header solenoid valve 1505-3, through solenoid valves 1505-4, 1505-5 via scavenger line 918 to the accumulator 919 and then to the compressor 922. The cooling "TX" valve 1508-6 is allowed to meter the correct amount of liquid refrigerant into the air evaporator 1514 by indirect connection of its equalizer tube to the common suction line 1525-1 ahead of the accumulator 1519, and by connection of its controlling bulb 1512-6 a short distance from the refrigerant vapor outlet 1515. Finally, warmed refrigerant gas is withdrawn from the air evaporator 1514 into the suction line 1513 and through the reversing valve 1520 into the accumulator 1519 and thence to the suction inlet 1523 of the compressor 1522.

In the fourth stage, all solenoid valves 1505-1, 1505-2, 1505-3, 1505-4, 1505-5, 1505-6, 1505-7, 1505-8, 1505-9 and individual loop connections 1501-1, 1501-2, 1501-3, 1501-4, 1501-5 to the header 1504 are controlled by a third pressure sensing device 1530-3 placed in the refrigerant vapor header 1504, until the pressure reaches a predefined point sufficient to override the electric signal sent by the room thermostat and by the first and second pressure sensing device 1530-1, 1530-2 and thereby to operate the internal switch of the pressure devices which activates the loop solenoid valves by allowing solenoid valves 1505-1, 1505-2, 1505-3, 1505-5, 1505-6, 1505-7, 1505-8 to be open while closing solenoid valves 1505-4, 1505-9. Solenoid valves 1505-1, 1505-2, 1505-3 are open to allow hot gas to flow to loops 1501-1, 1501-2, 1501-3, 1501-4. Heating "TX" valves 1505-1, 1505-2, 1505-3, 1505-4 are maintained open by indirect connection of their respective equalizer tubes to the common suction line 1525-1 ahead of the accumulator 1519, and by connection of their respective controller bulbs 1512-1, 1512-2, 1512-3, 1512-4 to the vapor lines 1502-1, 1502-2, 1502-3, 1502-4 of loops 1501-1, 1501-2, 1501-3, 1501-4 which are hot in this cooling mode. Hot compressed refrigerant is then passed from the compressor outlet 1525 through the reversing valve 1520 and refrigerant vapor header 1504 into the hot gas lines which are upstream of closed solenoid valve 1505-4. The heat pump 1500 is allowed to reject its heat to the ground at a pressure which is high enough to force liquid refrigerant through the liquid refrigerant lines 1503-1, 1503-2, 1503-3, 1503-4, through heating "TX" valves 1508-1, 1508-2, 1508-3, 1508-4, and through open solenoids valves 1505-6, 1505-7, 1505-8, and into the refrigerant liquid line header 1506 which is connected to the inlet port 1510-6 of the cooling "TX" valve 1508-6. Residual liquid refrigerant is evaporated and scavenged from the liquid refrigerant lines which are downstream of the refrigerant vapor header solenoid valve 1505-4, through solenoid valve 1505-5 via scavenger line 1518 to the accumulator 1519 and then to the compressor 1522. The cooling "TX" valve 1508-6 is allowed to meter the correct amount of liquid refrigerant into the air evaporator 1514 by indirect connection of its equalizer tube to the common suction line 1525-1 ahead of the accumulator 1519 and by connection of its controlling bulb 1512-6 a short distance from the refrigerant vapor outlet 1515. Finally, warmed refrigerant gas is withdrawn from the air evaporator 1514 into the suction line 1513 and through the reversing valve 1520 into the accumulator 1519 and thence to the suction inlet 1523 of the compressor 1522.

In the fifth stage, all solenoid valves 1505-1, 1505-2, 1505-3, 1505-4, 1505-5, 1505-6, 1505-7, 1505-8, 1505-9 and individual loop connections 1501-1, 1501-2, 1501-3, 1501-4, 1501-5 to the header 1504 are controlled by a fourth pressure sensing device 1530-4 placed in the refrigerant vapor header 1504, until the pressure reaches a predefined point sufficient to override the electric signal sent by the room thermostat and the first, second and third pressure sensing devices 1530-1, 1530-2, 1530-3 and thereby to operate the internal switch of the pressure devices which activates the loop solenoid valves by allowing solenoid valves 1505-1, 1505-2, 1505-3, 1505-4, 1505-6, 1505-7, 1505-8, 1505-9 to be open while closing solenoid valve 1505-5. Solenoid valves 1505-1, 1505-2, 1505-3, 1505-4 are open to allow hot gas to flow to loops 1501-1, 1501-2, 1501-3, 1501-4, 1501-5. Heating "TX" valves 1505-1, 1505-2, 1505-3, 1505-4, 1505-5 are maintained open by indirect connection of their respective equalizer tubes to the common suction line 1525-1 ahead of the accumulator 1519 and by connection of their respective controller bulbs 1512-1, 1512-2, 1512-3, 1512-4, 1512-5 to the vapor lines 1502-1, 1502-2, 1502-3, 1502-4, 1502-5 of loops 1501-1, 1501-2, 1501-3, 1501-4, 1501-5 which are hot in this cooling mode. Hot compressed refrigerant is then passed from the compressor outlet 1525 through the reversing valve 1520 and refrigerant vapor header 1504 into the hot gas lines which are upstream of closed solenoid valve 1505-5. The heat pump 1500 is allowed to reject its heat to the ground at a pressure which is high enough to force liquid refrigerant through the liquid refrigerant lines 1503-1, 1503-2, 1503-3, 1503-4, 1503-5, through heating "TX" valves 1508-1, 1508-2, 1508-3, 1508-4, 1508-5 and through open solenoids valves 1505-6, 1505-7, 1505-8, 1505-9 and into the refrigerant liquid line header 1506 which is connected to the inlet port 1510-6 of the cooling "TX" valve 1508-6. The cooling "TX" valve 1508-6 is allowed to meter the correct amount of liquid refrigerant into the air evaporator 1514 by indirect connection of its equalizer tube to the common suction line 1525 ahead of the accumulator 1519 and by connection of its controlling bulb 1512-6 a short distance from the refrigerant vapor outlet 1515. Finally, warmed refrigerant gas is withdrawn from the air evaporator 1514 into the suction line 1513 and through the reversing valve 1520 into the accumulator 1519 and thence to the suction inlet 1523 of compressor 1522.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A loop system for use in combination with a direct expansion heat pump system comprising:
   a) at least two loops, each of a first said loop, and at least a second said loop including a suction/hot gas line and a liquid line, each said loop being adapted to be buried underground in heat exchange relationship with the earth;
   b) a refrigerant vapor header connected in series to each of said at least two suction/hot gas lines, said refrigerant vapor header being provided with a first solenoid valve positioned between the junction of said suction/hot gas line of said first said loop with said refrigerant vapor header and the junction of said suction/hot gas line of said at least second said loop with said refrigerant vapor header and at least a second solenoid valve positioned remote from the junction of said suction/hot gas line of said at least second said loop with said refrigerant vapor header;
   c) a refrigerant liquid line header provided with a cooling thermostatic expansion valve, said refrigerant liquid line header further being provided with a first solenoid valve positioned between the junction of the liquid line of said first said loop with said refrigerant liquid line header and the junction of said liquid line of said at least second said loop with said refrigerant liquid line header;
   d) a first connecting line and at least a second connecting line connecting said cooling thermostatic expansion valve to an associated one of said liquid line of said first said loop and said liquid line of said at least second said loop;
   e) a first heating expansion valve operatively associated with said first said connecting line and at least a second heating expansion valve operatively associated with said at least second said connecting line;
   f) at least one solenoid valve operatively associated with said refrigerant liquid line header and also operatively associated with said at least second said connecting line; and
   g) at least one pressure sensing device operatively associated with said refrigerant vapor header.

2. A loop system for use in combination with a direct expansion heat pump system comprising:
   a) two loops, each of a first said loop, and a second said loop including a suction/hot gas line and a liquid line, each said loop being adapted to be buried underground in heat exchange relationship with the earth;
   b) a refrigerant vapor header connected in series to each of said two suction/hot gas lines, said refrigerant vapor header being provided with a first solenoid valve positioned between the junction of said suction/hot gas line of said first said loop with said refrigerant vapor header and the junction of said suction/hot gas line of said second said loop with said refrigerant vapor header and a second solenoid valve positioned remote from the junction of said suction/hot gas line of said second said loop with said refrigerant vapor header;
   c) a refrigerant liquid line header provided with a cooling thermostatic expansion valve, said refrigerant liquid line header further being provided with a first solenoid valve positioned between the junction of the liquid line of said first said loop with said refrigerant liquid line header and the junction of said liquid line of said second said loop with said refrigerant liquid line header;
   d) a first connecting line and a second connecting line connecting said cooling thermostatic expansion valve to an associated one of said liquid line of said first said loop and said liquid line of said second said loop, respectively;
   e) a first heating expansion valve operatively associated with said first connecting said line and a second heating expansion valve operatively associated with said second said connecting line;
   f) one solenoid valve operatively associated with said refrigerant liquid line header and also operatively associated with said second said connecting line; and
   g) one pressure sensing device operatively associated with said refrigerant vapor header.

3. The loop system of claim 2 including an accumulator, and a scavenging line connected between said refrigerant vapor header and said accumulator.

4. The loop system of claim 3 including: a compressor connected to said accumulator, said compressor being selectively connected to said refrigerant liquid line header or to said refrigerant vapor header.

5. The loop system of claim 4 including a reversing valve, which is selectively actuatable to effect said selected connection of said compressor to said refrigerant liquid line header and to said refrigerant vapor header.

6. The loop system of claim 5 including an air/refrigerant heat exchanger coil interposed between said refrigerant liquid line header and said refrigerant vapor header.

7. A loop system for use in combination with a direct expansion heat pump system comprising:
   a) three loops, each of a first said loop, a second said loop and a third said loop including a suction/hot gas line and a liquid line, each said loop being adapted to be buried underground in heat exchange relationship with the earth;
   b) a refrigerant vapor header connected in series to each of said three suction/hot gas lines, said refrigerant vapor header being provided with a first solenoid valve positioned between the junction of said suction/hot gas line of said first said loop with said refrigerant vapor header and the junction of said suction/hot gas line of said second said loop with said refrigerant vapor header, a second solenoid valve positioned between the junction of said suction/hot gas line of said second said loop with said refrigerant vapor header and the junction of said suction/hot gas line of said third said loop with said refrigerant vapor header and a third solenoid valve situated remote from the junction of said suction/hot gas line of said third said loop with said refrigerant vapor header;

c) a refrigerant liquid line header provided with a cooling thermostatic expansion valve, said refrigerant liquid line header further being provided with a first solenoid valve positioned between the junction of the liquid line of said first said loop with said refrigerant liquid line header and the junction of said liquid line of said second said loop with said refrigerant liquid line header, and a second solenoid valve positioned between the junction of the liquid line of said second said loop with said refrigerant liquid line header and the junction of said liquid line of said third said loop with said refrigerant liquid line header;

d) a first connecting line, a second connecting line and a third connecting line connecting said cooling thermostatic expansion valve to an associated one of said liquid line of said first said loop, said liquid line of said second said loop, and said liquid line of said third said loop, respectively;

e) a first heating expansion valve operatively associated with said first said connecting line, a second heating expansion valve operatively associated with said second said connecting line, and a third heating expansion valve operatively associated with said third said connecting line;

f) a first solenoid valve operatively associated with said refrigerant liquid line header and also operatively associated with said second said connecting line, and a second solenoid valve operatively associated with said refrigerant liquid line header and also operatively associated with said third said connecting line; and g) two pressure sensing devices, each being operatively associated with said refrigerant vapor header.

8. The loop system of claim 7 including an accumulator, and a scavenging line connected between said refrigerant vapor header and said accumulator.

9. The loop system of claim 8 including: a compressor connected to said accumulator, said compressor being selectively connected to said refrigerant liquid line header or to said refrigerant vapor header.

10. The loop system of claim 9 including a reversing valve, which is selectively actuatable to effect said selected connection of said compressor to said refrigerant liquid line header and to said refrigerant vapor header.

11. The loop system of claim 10 including an air/refrigerant heat exchanger coil interposed between said refrigerant liquid line header and said refrigerant vapor header.

12. A loop system for use in combination with a direct expansion heat pump system comprising:

a) four loops, each of a first said loop, a second said loop, a third said loop and a fourth said loop including a suction/hot gas line and a liquid line, each said loop being adapted to be buried underground in heat exchange relationship with the earth;

b) a refrigerant vapor header connected in series to each of said four suction/hot gas lines, said refrigerant vapor header being provided with a first solenoid valve positioned between said junction of said suction/hot gas line of said first said loop with said refrigerant vapor header and the junction of said suction/hot gas line of said second said loop with said refrigerant vapor header, a second solenoid valve positioned between the junction of said suction/hot gas line of said second said loop with said refrigerant vapor header and the junction of said suction/hot gas line of said third loop with said refrigerant vapor header, a third solenoid valve positioned between the junction of said suction/hot gas line of said third said loop with said refrigerant vapor header and the junction of said suction/hot gas line of said fourth said loop with said refrigerant vapor header, and a fourth solenoid valve situated remote from the junction of said suction/hot gas line of said fourth said loop with said refrigerant vapor header;

c) a refrigerant liquid line header provided with a cooling thermostatic expansion valve, said refrigerant liquid line header further being provided with a first solenoid valve positioned between the junction of said liquid line of said first said loop with said refrigerant liquid line header and the junction of said liquid line of said second said loop with said refrigerant liquid line header, a second solenoid valve positioned between the junction of said liquid line of said second said loop with said refrigerant liquid line header and the junction of said liquid line of said third said loop with said refrigerant liquid line header, and a third solenoid valve positioned between the junction of said liquid line of said third said loop with said refrigerant liquid line header and the junction of said liquid line of said fourth said loop with said refrigerant liquid line header;

d) a first connecting line, a second connecting line, a third connecting line and a fourth connecting line connecting said cooling thermostatic expansion valve to an associated one of said liquid line of said first said loop, said liquid line of said second said loop, said liquid line of said third said loop and said liquid line of said fourth said loop, respectively;

e) a first heating expansion valve operatively associated with said first connecting said line, a second heating expansion valve operatively associated with said second said connecting line, a third heating expansion valve operatively associated with said third said connecting line and a fourth heating expansion valve operatively associated with said fourth said connecting line;

f) a first solenoid valve operatively associated with said refrigerant liquid line header and also operatively associated with said second said connecting line, a second solenoid valve operatively associated with said refrigerant liquid line header and also operatively associated with said third said connecting line, and a third solenoid valve operatively associated with said refrigerant liquid line header and also operatively associated with said fourth said connecting line; and g) three pressure sensing devices, each being operatively associated with said refrigerant vapor header.

13. The loop system of claim 12 including an accumulator, and a scavenging line connected between said refrigerant vapor header and said accumulator.

14. The loop system of claim 13 including: a compressor connected to said accumulator, said compressor being selectively connected to said refrigerant liquid line header or to said refrigerant vapor header.

15. The loop system of claim 14 including a reversing valve, which is selectively actuatable to effect said selected connection of said compressor to said refrigerant liquid line header and to said refrigerant vapor header.

16. The loop system of claim 15 including an air/refrigerant heat exchanger coil interposed between said refrigerant liquid line header and said refrigerant vapor header.

47

17. A loop system for use in combination with a direct expansion heat pump system comprising:
- a) five loops, each of a first said loop, a second said loop, a third said loop, a fourth said loop and a fifth said loop including a suction/hot gas line and a liquid line, each said loop being adapted to be buried underground in heat exchange relationship with the earth;
- b) a refrigerant vapor header connected in series to each of said five suction/hot gas lines, said refrigerant vapor header being provided with a first solenoid valve positioned between the junction of said suction/hot gas line of said first said loop with said refrigerant vapor header and the junction of said suction/hot gas line of said second said loop with said refrigerant vapor header, a second solenoid valve positioned between the junction of said suction/hot gas line of said second said loop with said refrigerant vapor header, and the junction of said suction/hot gas line of said third said loop with said refrigerant vapor header, a third solenoid valve positioned between the junction of said suction/hot gas line of said third said loop with said refrigerant vapor header and the junction of said suction/hot gas line of said fourth said loop with said refrigerant vapor header, a fourth solenoid valve positioned between the junction of said suction/hot gas line of said fourth said loop with said refrigerant vapor header and the junction of said suction/hot gas line of said fifth said loop with said refrigerant vapor header, and a fifth solenoid valve situated remote from said junction of said suction/hot gas line of said fifth said loop with said refrigerant vapor header;
- c) a refrigerant liquid line header provided with a cooling thermostatic expansion valve, said refrigerant liquid line header further being provided with a first solenoid valve positioned between the junction of said liquid line of said first said loop with said refrigerant liquid line header and the junction of said liquid line of said second said loop with said refrigerant liquid line header, a second solenoid valve positioned between the junction of said liquid line of said second said loop with said refrigerant liquid line header and the junction of said liquid line of said third said loop with said refrigerant liquid line header, a third solenoid valve positioned between the junction of said liquid line of said third said loop with said refrigerant liquid line header and said junction of said liquid line of said fourth said loop with said refrigerant liquid line header, and a fourth solenoid valve positioned between the junction of the liquid line of said fourth said loop with said refrigerant liquid line header and the junction of said liquid line of said fifth said loop with said refrigerant liquid line header;
- d) a first connecting line, a second connecting line, a third connecting line, a fourth connecting line connecting line and a fifth connecting line connecting said cooling thermostatic expansion valve to an associated one of said liquid line of said first said loop, said liquid line of said second said loop, said liquid line of said third said loop, said liquid line of said fourth said loop, and said liquid line of said fifth said loop, respectively;
- e) a first heating expansion valve operatively associated with said first said connecting line, a second heating expansion valve operatively associated with second said connecting line, a third heating expansion valve operatively associated with said third said connecting line, a fourth heating expansion valve operatively associated with said fourth said connecting line and a fifth heating expansion valve operatively associated with said fifth said connecting line;
- f) a first solenoid valve operatively associated with said refrigerant liquid line header and also operatively associated with said second said connecting line, a second solenoid valve operatively associated with said refrigerant liquid line header and also operatively associated with said third said connecting line, a third solenoid valve operatively associated with said refrigerant liquid line header and also operatively associated with said fourth said connecting line and a fourth solenoid valve operatively associated with said refrigerant liquid line header and also operatively associated with said fifth said connecting line; and
- g) four pressure sensing devices, each being operatively associated with said refrigerant vapor header.

18. The loop system of claim 17 including an accumulator, and a scavenging line connected between said refrigerant vapor header and said accumulator.

19. The loop system of claim 18 including: a compressor connected to said accumulator, said compressor being selectively connected to said refrigerant liquid line header or to said refrigerant vapor header.

20. The loop system of claim 19 including a reversing valve, which is selectively actuatable to effect said selected connection of said compressor to said refrigerant liquid line header and to said refrigerant vapor header.

21. The loop system of claim 20 including an air/refrigerant heat exchanger coil interposed between said refrigerant liquid line header and said refrigerant vapor header.

22. A staged cooling, direct expansion heat pump comprising:
- a) at least two loops, each of a first said loop, and at least a second said loop including a suction/hot gas line and a liquid line, each said loop being adapted to be buried underground in heat exchange relationship with the earth;
- b) a refrigerant vapor header connected in series to each of said at least two suction/hot gas lines, said refrigerant vapor header being provided with a first solenoid valve positioned between the junction of said suction/hot gas line of said first said loop with said refrigerant vapor header and the junction of said suction/hot gas line of said at least second said loop with said refrigerant vapor header and at least a second solenoid valve positioned remote from the junction of said suction/hot gas line of said at least second said loop with said refrigerant vapor header;
- c) a refrigerant liquid line header provided with a cooling thermostatic expansion valve, said refrigerant liquid line header further being provided with a first solenoid valve positioned between the junction of said liquid line of said first said loop with said refrigerant liquid line header and the junction of said liquid line of said at least second said loop with said refrigerant liquid line header, said cooling thermostatic expansion valve being adapted to provide refrigerant metering in the cooling mode, said cooling thermostatic expansion valve having one inlet, one outlet, an equalization port, and a gas-filled controlling bulb;
- d) a first connecting line and at least a second connecting line connecting said cooling thermostatic expansion valve to an associated one of said liquid line of said first said loop and said liquid line of said at least second said loop;

e) a first heating expansion valve operatively associated with said first connecting said line and at least a second heating expansion valve operatively associated with said at least second said connecting line, and each said heating expansion valve being adapted to provide refrigerant metering in the heating mode, each said valve having one inlet, and one outlet, an equalization port, and a gas-filled controlling bulb;

(f) capillary line means for providing a capillary tube by-pass around said cooling thermostatic expansion valve;

(g) capillary line means for providing a capillary tube bypass around said inlet and said outlet of each of said first and at least said second heating expansion valves;

(h) at least one pressure sensing device operatively associated with said refrigerant vapor header;

(i) an accumulator having an inlet and an outlet;

(j) a suction line having an inlet connected to said accumulator and an outlet;

(k) a scavenger line interconnecting said refrigerant vapor header and said accumulator;

(l) equalization tube means interconnecting said cooling thermostatic expansion valve, said first heating thermostatic expansion valve, said at least second heating thermostatic expansion valve and said scavenger line;

(m) capillary line means for placing a controlling bulb of said first heating expansion valve in thermal contact with said suction/hot gas line of said first said loop a short distance from the connection of said suction/hot gas line to said refrigerant vapor header;

(n) capillary line means for placing a controlling bulb of said at least second heating expansion valve into thermal contact with said suction/hot gas line of said at least second said loop a short distance from the connection of said suction/hot gas line to said refrigerant vapor header;

(o) an air/refrigerant heat exchanger coil having two access ports;

(p) a reversing valve having two inlets and two outlets;

(q) line means connecting a port of said air/refrigerant heat exchanger coil to said refrigerant liquid line header;

(r) line means connecting a port of said air/refrigerant heat exchanger coil to said reversing valve;

(s) line means connecting said outlet of said compressor to an inlet of said reversing valve;

(t) line means connecting said outlet of said accumulator to said inlet of said compressor;

(u) line means connected between said reversing valve and said inlet of said accumulator;

(v) line means connected between said reversing valve and said refrigerant vapor header; and (w) capillary line means for placing a controlling bulb of said cooling thermostatic expansion valve in thermal contact with said line means connecting a port of said air/refrigerant heat exchanger to said reversing valve.

23. A staged cooling, direct expansion heat pump comprising:

a) two loops, each of a first said loop, and a second said loop including a suction/hot gas line and a liquid line, each said loop being adapted to be buried underground in heat exchange relationship with the earth;

b) a refrigerant vapor header connected in series to each of said two suction/hot gas lines, said refrigerant vapor header being provided with a first solenoid valve positioned between the junction of said suction/hot gas line of said first said loop with said refrigerant vapor header and the junction of said suction/hot gas line of said second said loop with said refrigerant vapor header and a second solenoid valve positioned remote from the junction of said suction/hot gas line of said second said loop with said refrigerant vapor header;

c) a refrigerant liquid line header provided with a cooling thermostatic expansion valve, said refrigerant liquid line header further being provided with a first solenoid valve positioned between the junction of said liquid line of said first said loop with said refrigerant liquid line header and the junction of said liquid line of said second said loop with said refrigerant liquid line header, said cooling thermostatic expansion valve being adapted to provide refrigerant metering in the cooling mode, said cooling thermostatic expansion valve having one inlet, one outlet, an equalization port, and a gas-filled controlling bulb;

d) a first connecting line and a second connecting line connecting said cooling thermostatic expansion valve to an associated one of said liquid line of said first said loop and said liquid line of said second said loop, respectively;

e) a first heating expansion valve operatively associated with said first said connecting line and a second heating expansion valve operatively associated with said second said connecting line, and each said heating expansion valve being adapted to provide refrigerant metering in the heating mode, each said valve having one inlet, and one outlet, an equalization port, and a gas-filled controlling bulb;

(f) capillary line means for providing a capillary tube by-pass around said cooling thermostatic expansion valve;

(g) capillary line means for providing a capillary tube bypass around said inlet and said outlet of each of said first and said second heating expansion valves;

(h) one pressure sensing device operatively associated with said refrigerant vapor header;

(i) an accumulator having an inlet and an outlet;

(j) a suction line having an inlet connected to said accumulator and an outlet;

(k) a scavenger line interconnecting said refrigerant vapor header and said accumulator;

(l) equalization tube means interconnecting said cooling thermostatic expansion valve, said first heating thermostatic expansion valve, said second heating thermostatic expansion valve and said scavenger line;

(m) capillary line means for placing a controlling bulb of said first heating expansion valve in thermal contact with said suction/hot gas line of said first said loop a short distance from the connection of said suction/hot gas line to said refrigerant vapor header;

(n) capillary line means for placing a controlling bulb of said second heating expansion valve into thermal contact with said suction/hot gas line of said second said loop a short distance from the connection of said suction/hot gas line to said refrigerant vapor header;

(o) an air/refrigerant heat exchanger coil having two access ports;

(p) a reversing valve having two inlets and two outlets;

(q) line means connecting a port of said air/refrigerant heat exchanger coil to said refrigerant liquid line header;

(r) line means connecting a port of said air/refrigerant heat exchanger coil to said reversing valve;

(s) line means connecting said outlet of said compressor to an inlet of said reversing valve;

(t) line means connecting said outlet of said accumulator to said inlet of said compressor;

(u) line means connected between said reversing valve and said inlet of said accumulator;

(v) line means connected between said reversing valve and said refrigerant vapor header; and (w) capillary line means for placing a controlling bulb of said cooling thermostatic expansion valve in thermal contact with said line means connecting a port of said air/refrigerant heat exchanger to said reversing valve.

24. A staged cooling, direct expansion heat pump comprising:

a) three loops, each of a first said loop, a second said loop and a third said loop including a suction/hot gas line and a liquid line, each said loop being adapted to be buried underground in heat exchange relationship with the earth;

b) a refrigerant vapor header connected in series to each of said three suction/hot gas lines, said refrigerant vapor header being provided with a first solenoid valve positioned between the junction of said suction/hot gas line of said first said loop with said refrigerant vapor header and the junction of said suction/hot gas line of said second said loop with said refrigerant vapor header, a second solenoid valve positioned between the junction of said suction/hot gas line of said second said loop with said refrigerant vapor header and the junction of said suction/hot gas line of said third said loop with said refrigerant vapor header and a third solenoid valve situated remote from the junction of said suction/hot gas line of said third said loop with said refrigerant vapor header;

c) a refrigerant liquid line header provided with a cooling thermostatic expansion valve, said refrigerant liquid line header further being provided with a first solenoid valve positioned between the junction of said liquid line of said first said loop with said refrigerant liquid line header and the junction of said liquid line of said second said loop with said refrigerant liquid line header, and a second solenoid valve positioned between the junction of said liquid line of said second said loop with said refrigerant liquid line header and the junction of said liquid line of said third said loop with said refrigerant liquid line header, said cooling thermostatic expansion valve being adapted to provide refrigerant metering in the cooling mode, said cooling thermostatic expansion valve having one inlet, one outlet, an equalization port, and a gas-filled controlling bulb;

d) a first connecting line, a second connecting line and a third connecting line connecting said cooling thermostatic expansion valve to an associated one of said liquid line of said first said loop, said liquid line of said second said loop, and said liquid line of said third said loop, respectively;

e) a first heating expansion valve operatively associated with said first said connecting line, a second heating expansion valve operatively associated with said second said connecting line, and a third heating expansion valve operatively associated with said third said connecting line, and each said heating expansion valve being adapted to provide refrigerant metering in the heating mode, each said valve having one inlet, and one outlet, an equalization port, and a gas-filled controlling bulb;

(f) capillary line means for providing a capillary tube by-pass around said cooling thermostatic expansion valve;

(g) capillary line means for providing a capillary tube bypass around said inlet and said outlet of each of said first, said second and said third heating expansion valves;

(h) two pressure sensing devices, each being operatively associated with said refrigerant vapor header;

(i) an accumulator having an inlet and an outlet;

(j) a suction pump having an inlet connected to said accumulator and an outlet;

(k) a scavenger line interconnecting said refrigerant vapor header and said accumulator;

(l) equalization tube means interconnecting said cooling thermostatic expansion valve, said first heating thermostatic expansion valve, said second heating thermostatic expansion valve, said third thermostatic expansion valve and said scavenger line;

(m) capillary line means for placing a controlling bulb of said first heating expansion valve in thermal contact with said suction/hot gas line of said first said loop a short distance from the connection of said suction/hot gas line to said refrigerant vapor header;

(n) capillary line means for placing a controlling bulb of said second heating expansion valve into thermal contact with said suction/hot gas line of said second said loop a short distance from the connection of said suction/hot gas line to said refrigerant vapor header;

(o) capillary line means for placing a controlling bulb of said third heating expansion valve into thermal contact with said suction/hot gas line of said third said loop a short distance from the connection of said suction/hot gas line to said refrigerant vapor header;

(p) an air/refrigerant heat exchanger coil having two access ports;

(q) a reversing valve having two inlets and two outlets;

(r) line means connecting a port of said air/refrigerant heat exchanger coil to said refrigerant liquid line header;

(s) line means connecting a port of said air/refrigerant heat exchanger coil to said reversing valve;

(t) line means connecting said outlet of said compressor to an inlet of said reversing valve;

(u) line means connecting said outlet of said accumulator to said inlet of said compressor;

(v) line means connected between said reversing valve and said inlet of said accumulator;

(w) line means connected between said reversing valve and said refrigerant vapor header; and (x) capillary line means for placing a controlling bulb of said cooling thermostatic expansion valve in thermal contact with said line means connecting a port of said air/refrigerant heat exchanger to said reversing valve.

25. A staged cooling, direct expansion heat pump comprising:

a) four loops, each of a first said loop, a second said loop, a third said loop and a fourth said loop including a suction/hot gas line and a liquid line, each said loop being adapted to be buried underground in heat exchange relationship with the earth;

b) a refrigerant vapor header connected in series to each of said four suction/hot gas lines, said refrigerant vapor header being provided with a first solenoid valve positioned between the junction of said suction/hot gas line of the first said loop with said refrigerant vapor header and the junction of said suction/hot gas line of said second said loop with said refrigerant vapor header, a second solenoid valve positioned between the junction of said suction/hot gas line of said second said loop with said refrigerant vapor header and the junction of said suction/hot gas line of said third said loop with said refrigerant vapor header, a third solenoid valve positioned between the junction of said suction/hot gas line of said third said loop with said refrigerant vapor header and the junction of said suction/hot gas line of said fourth said loop with said refrigerant vapor header and a fourth solenoid valve situated remote from the junction of said suction/hot gas line of said fourth said loop with said refrigerant vapor header;

c) a refrigerant liquid line header provided with a cooling thermostatic expansion valve, said refrigerant liquid line header further being provided with a first solenoid valve positioned between the junction of said liquid line of said first said loop with said refrigerant liquid line header and the junction of said liquid line of said second said loop with said refrigerant liquid line header, a second solenoid valve positioned between the junction of said liquid line of said second said loop with said refrigerant liquid line header and the junction of said liquid line of said third said loop with said refrigerant liquid line header, and a third solenoid valve positioned between the junction of said liquid line of said third said loop with said refrigerant liquid line header and the junction of said liquid line of said fourth said loop with said refrigerant liquid line header, said cooling thermostatic expansion valve being adapted to provide refrigerant metering in the cooling mode, said cooling thermostatic expansion valve having one inlet, one outlet, an equalization port, and a gas-filled controlling bulb;

d) a first connecting line, a second connecting line, a third connecting line and a fourth connecting line connecting said cooling thermostatic expansion valve to an associated one of said liquid line of said first said loop, said liquid line of said second said loop, said liquid line of said third said loop and said liquid line of said fourth said loop, respectively;

e) a first heating expansion valve operatively associated with said first said connecting line, a second heating expansion valve operatively associated with said second said connecting line, a third heating expansion valve operatively associated with said third said connecting line and a fourth heating expansion valve operatively associated with said fourth said connecting line, and each said heating expansion valve being adapted to provide refrigerant metering in the heating mode, each said valve having one inlet, and one outlet, an equalization port, and a gas-filled controlling bulb;

(f) capillary line means for providing a capillary tube by-pass around said cooling thermostatic expansion valve;

(g) capillary line means for providing a capillary tube bypass around said inlet and said outlet of each of said first, said second, said third and said fourth heating expansion valves;

(h) three pressure sensing devices, each being operatively associated with said refrigerant vapor header;

(i) an accumulator having an inlet and an outlet;

(j) a suction line having an inlet connected to said accumulator and an outlet;

(k) a scavenger line interconnecting said refrigerant vapor header and said accumulator;

(l) equalization tube means interconnecting said cooling thermostatic expansion valve, said first heating thermostatic expansion valve, said second heating thermostatic expansion valve, said third heating thermostatic expansion valve, said fourth thermostatic expansion valve and said scavenger line;

(m) capillary line means for placing a controlling bulb of said first heating expansion valve in thermal contact with said suction/hot gas line of said first said loop a short distance from the connection of said suction/hot gas line to said refrigerant vapor header;

(n) capillary line means for placing a controlling bulb of said second heating expansion valve into thermal contact with said suction/hot gas line of said second said loop a short distance from the connection of said suction/hot gas line to said refrigerant vapor header;

(o) capillary line means for placing a controlling bulb of said third heating expansion valve into thermal contact with said suction/hot gas line of said third said loop a short distance from the connection of said suction/hot gas line to said refrigerant vapor header;

(p) capillary line means for placing a controlling bulb of said fourth heating expansion valve into thermal contact with said suction/hot gas line of said fourth said loop a short distance from the connection of said suction/hot gas line to said refrigerant vapor header;

(q) an air/refrigerant heat exchanger coil having two access ports;

(r) a reversing valve having two inlets and two outlets;

(s) line means connecting a port of said air/refrigerant heat exchanger coil to said refrigerant liquid line header;

(t) line means connecting a port of said air/refrigerant heat exchanger coil to said reversing valve;

(u) line means connecting said outlet of said compressor to an inlet of said reversing valve;

(v) line means connecting said outlet of said accumulator to said inlet of said compressor;

(w) line means connected between said reversing valve and said inlet of said accumulator;

(x) line means connected between said reversing valve and said refrigerant vapor header; and (y) capillary line means for placing a controlling bulb of said cooling thermostatic expansion valve in thermal contact with said line means connecting a port of said air/refrigerant heat exchanger to said reversing valve.

26. A staged cooling, direct expansion heat pump comprising:

a) five loops, each of a first said loop, a second said loop, a third said loop, a fourth said loop and a fifth said loop including a suction/hot gas line and a liquid line, each said loop being adapted to be buried underground in heat exchange relationship with the earth;

b) a refrigerant vapor header connected in series to each of said five suction/hot gas lines, said refrigerant vapor header being provided with a first solenoid valve positioned between the junction of said suction/hot gas line of said first said loop with said refrigerant vapor header and the junction of said suction/hot gas line of said second said loop with said refrigerant vapor header, a second solenoid valve positioned between the junction of said suction/hot gas line of said second said loop with said refrigerant vapor header, and the junction of said suction/hot gas line of said third said loop with said refrigerant vapor header, a third solenoid valve positioned between the junction of said suction/hot gas line of said third said loop with said refrigerant vapor header and the junction of said suction/hot gas line of said fourth said loop with said refrigerant vapor header, a fourth solenoid valve positioned between the junction of said suction/hot gas line of said fourth said loop with said refrigerant vapor header and the junction of said suction/hot gas line of said fifth said loop with said refrigerant vapor header, and a fifth solenoid valve situated remote from said junction of said suction/hot gas line of said fifth said loop with said refrigerant vapor header;

c) a refrigerant liquid line header provided with a cooling thermostatic expansion valve, said refrigerant liquid line header further being provided with a first solenoid valve positioned between the junction of said liquid line of said first said loop with said refrigerant liquid line header and the junction of said liquid line of said second said loop with said refrigerant liquid line header, a second solenoid valve positioned between the junction of said liquid line of said second said loop with said refrigerant liquid line header and the junction of said liquid line of said third said loop with said refrigerant liquid line header, a third solenoid valve positioned between the junction of said liquid line of said third said loop with said refrigerant liquid line header and the junction of said liquid line of said fourth said loop with said refrigerant liquid line header, and a fourth solenoid valve positioned between the junction of said liquid line of said fourth said loop with said refrigerant liquid line header and the junction of said liquid line of said fifth said loop with said refrigerant liquid line header, said cooling thermostatic expansion valve being adapted to provide refrigerant metering in the cooling mode, said cooling thermostatic expansion valve having one inlet, one outlet, an equalization port, and a gas-filled controlling bulb;

d) a first connecting line, a second connecting line, a third connecting line, a fourth connecting line connecting line and a fifth connecting line connecting said cooling thermostatic expansion valve to an associated one of said liquid line of said first said loop, said liquid line of said second said loop, said liquid line of said third said loop, said liquid line of said fourth said loop, and said liquid line of said fifth said loop, respectively;

e) a first heating expansion valve operatively associated with said first said connecting line, a second heating expansion valve operatively associated with said second said connecting line, a third heating expansion valve operatively associated with said third said connecting line, a fourth heating expansion valve operatively associated with said fourth said connecting line and a fifth heating expansion valve operatively associated with said fifth said connecting line, and each said heating expansion valve being adapted to provide refrigerant metering in the heating mode, each said valve having one inlet, and one outlet, an equalization port, and a gas-filled controlling bulb;

(f) capillary line means for providing a capillary tube by-pass around said cooling thermostatic expansion valve;

(g) capillary line means for providing a capillary tube bypass around said inlet and said outlet of each of said first, said second, said third, said fourth and said fifth heating expansion valves;

(h) four pressure sensing devices, each being operatively associated with said refrigerant vapor header;

(i) an accumulator having an inlet and an outlet;

(j) a suction pump having an inlet connected to said accumulator and an outlet;

(k) a scavenger line interconnecting said refrigerant vapor header and said accumulator;

(l) equalization tube means interconnecting said cooling thermostatic expansion valve, said first heating thermostatic expansion valve, said second heating thermostatic expansion valve, said third thermostatic expansion valve, said fourth thermostatic expansion valve, said fifth thermostatic expansion valve and said scavenger line;

(m) capillary line means for placing a controlling bulb of said first heating expansion valve in thermal contact with said suction/hot gas line of said first said loop a short distance from the connection of said suction/hot gas line to said refrigerant vapor header;

(n) capillary line means for placing a controlling bulb of said second heating expansion valve into thermal contact with said suction/hot gas line of said second said loop a short distance from the connection of said suction/hot gas line to said refrigerant vapor header;

(o) capillary line means for placing a controlling bulb of said third heating expansion valve into thermal contact with said suction/hot gas line of said third said loop a short distance from the connection of said suction/hot gas line to said refrigerant vapor header;

(p) capillary line means for placing a controlling bulb of said fourth heating expansion valve into thermal contact with said suction/hot gas line of said fourth said loop a short distance from the connection of said suction/hot gas line to said refrigerant vapor header;

(q) capillary line means for placing a controlling bulb of said fifth heating expansion valve into thermal contact with said suction/hot gas line of said fifth said loop a short distance from the connection of said suction/hot gas line to said refrigerant vapor header;

(r) an air/refrigerant heat exchanger coil having two access ports;

(s) a reversing valve having two inlets and two outlets;

(t) line means connecting a port of said air/refrigerant heat exchanger coil to said refrigerant liquid line header;

(u) line means connecting a port of said air/refrigerant heat exchanger coil to said reversing valve;

(v) line means connecting said outlet of said compressor to an inlet of said reversing valve;

(w) line means connecting said outlet of said accumulator to said inlet of said compressor;

(x) line means connected between said reversing valve and said inlet of said accumulator;

(y) line means connected between said reversing valve and said refrigerant vapor header; and (z) capillary line means for placing a controlling bulb of said cooling thermostatic expansion valve in thermal contact with said line means connecting a port of said air/refrigerant heat exchanger to said reversing valve.

* * * * *